(12) United States Patent
Shibata et al.

(10) Patent No.: US 8,799,283 B2
(45) Date of Patent: Aug. 5, 2014

(54) APPARATUS AND METHOD FOR PLAYLIST CREATION BASED ON LIKING OF PERSON SPECIFIED IN AN IMAGE

(75) Inventors: Mai Shibata, Kanagawa (JP); Masafumi Kato, Kanagawa (JP); Takashi Nishita, Tokyo (JP); Kazutaka Gogo, Tokyo (JP); Hiroshi Takagi, Tokyo (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 13/419,840

(22) Filed: Mar. 14, 2012

(65) Prior Publication Data
US 2012/0254168 A1 Oct. 4, 2012

(30) Foreign Application Priority Data
Mar. 29, 2011 (JP) ................................. 2011-073282

(51) Int. Cl.
*G06F 17/30* (2006.01)

(52) U.S. Cl.
USPC ............................ 707/736; 707/706; 382/118

(58) Field of Classification Search
CPC .............. G06F 19/345; G06F 19/3418; G06F 17/30032; G06F 17/30047; G06F 19/321; G06F 19/3437; G06F 17/30; G06F 17/30247; G06F 17/30864; G06F 19/322; G06F 19/3406; G06F 19/3456; G06F 19/3462
USPC ................................... 707/706, 736; 382/118
See application file for complete search history.

(56) References Cited

U.S. PATENT DOCUMENTS

| | | | |
|---|---|---|---|
| 6,556,775 B1* | 4/2003 | Shimada | 386/241 |
| 7,577,310 B2* | 8/2009 | Kinjo | 382/274 |
| 7,636,456 B2* | 12/2009 | Collins et al. | 382/118 |
| 7,711,145 B2* | 5/2010 | Gallagher | 382/103 |
| 8,094,891 B2* | 1/2012 | Andreasson | 382/118 |
| 8,218,033 B2* | 7/2012 | Oku et al. | 348/240.99 |
| 8,260,012 B2* | 9/2012 | Ogawa | 382/118 |
| 8,416,988 B2* | 4/2013 | Matsumoto et al. | 382/103 |
| 8,416,999 B2* | 4/2013 | Ogawa | 382/118 |
| 8,634,701 B2* | 1/2014 | Kang et al. | 386/248 |
| 2007/0098303 A1* | 5/2007 | Gallagher et al. | 382/305 |
| 2009/0027399 A1* | 1/2009 | Sato et al. | 345/467 |
| 2010/0321512 A1* | 12/2010 | Chevallier et al. | 348/222.1 |
| 2011/0058713 A1* | 3/2011 | Kogane et al. | 382/118 |
| 2011/0064319 A1* | 3/2011 | Momosaki | 382/224 |
| 2011/0099478 A1* | 4/2011 | Gallagher et al. | 715/735 |
| 2011/0142413 A1* | 6/2011 | Kang et al. | 386/234 |
| 2011/0216942 A1* | 9/2011 | Ogawa | 382/103 |
| 2011/0235858 A1* | 9/2011 | Hanson et al. | 382/103 |

FOREIGN PATENT DOCUMENTS

| | | |
|---|---|---|
| JP | 2007-200424 | 8/2007 |
| JP | 2009-117973 | 5/2009 |

\* cited by examiner

*Primary Examiner* — Debbie Le
(74) *Attorney, Agent, or Firm* — Sony Corporation

(57) ABSTRACT

Disclosed herein is a playlist creation apparatus including a person specification section, a liking extraction section, a searching section, and a playlist creation section. The person specification section is adapted to specify a person captured in an image based on image data. Also, the liking extraction section is adapted to extract a liking of the person specified by said person specification section. The searching section is adapted to search, based on the liking extracted by said liking extraction section, for sound data of sound conforming to the liking. In addition, the a playlist creation section is adapted to create a playlist which defines a reproduction order of the sound data searched out by said searching section during displaying of the image based on the image data.

17 Claims, 35 Drawing Sheets

FIG.4

| REPRODUCTION ORDER | IMAGE IDENTIFICATION INFORMATION |
|---|---|
| 1 | IMAGE IDENTIFICATION INFORMATION 1 |
| 2 | IMAGE IDENTIFICATION INFORMATION 2 |
| 3 | IMAGE IDENTIFICATION INFORMATION 3 |
| ⋮ | ⋮ |
| m | IMAGE IDENTIFICATION INFORMATION m |

| NAME | TELEPHONE NUMBER | MAIL ADDRESS | COMMENT | FACE PHOTOGRAPH | FACE CHARACTERISTIC AMOUNT |
|---|---|---|---|---|---|
| NAME 1 | TELEPHONE NUMBER 1 | MAIL ADDRESS 1 | SWEETHEART |  | FACE CHARACTERISTIC AMOUNT 1 |
| NAME 2 | TELEPHONE NUMBER 2 | MAIL ADDRESS 2 | FRIEND |  | FACE CHARACTERISTIC AMOUNT 2 |
| NAME 3 | TELEPHONE NUMBER 3 | MAIL ADDRESS 3 | FRIEND |  | FACE CHARACTERISTIC AMOUNT 3 |
| ⋮ | ⋮ | ⋮ | ⋮ | ⋮ | ⋮ |
| NAME n | TELEPHONE NUMBER n | MAIL ADDRESS n | FRIEND |  | FACE CHARACTERISTIC AMOUNT n |

FIG.6A

| IMAGE IDENTIFICATION INFORMATION | IMAGE PICKUP DATE AND TIME | NAME | TELEPHONE NUMBER | MAIL ADDRESS | COMMENT | FACE REGION POSITION |
|---|---|---|---|---|---|---|
| IMAGE IDENTIFICATION INFORMATION 1 | IMAGE PICKUP DATE AND TIME 1 | NAME 1 | TELEPHONE NUMBER 1 | MAIL ADDRESS 1 | SWEETHEART | FACE REGION POSITION 1 |

| IMAGE IDENTIFICATION INFORMATION | IMAGE PICKUP DATE AND TIME | NAME | TELEPHONE NUMBER | MAIL ADDRESS | COMMENT | FACE REGION POSITION |
|---|---|---|---|---|---|---|
| IMAGE IDENTIFICATION INFORMATION 2 | IMAGE PICKUP DATE AND TIME 2 | NAME 2 | TELEPHONE NUMBER 2 | MAIL ADDRESS 2 | FRIEND | FACE REGION POSITION 2 |
| | | NAME 3 | TELEPHONE NUMBER 3 | MAIL ADDRESS 3 | FRIEND | FACE REGION POSITION 3 |
| | | ... | ... | ... | ... | ... |
| | | NAME y | TELEPHONE NUMBER y | MAIL ADDRESS y | PERSON ITSELF | FACE REGION POSITION y |

40B

| IMAGE IDENTIFICATION INFORMATION | IMAGE PICKUP DATE AND TIME | IMAGE PICKUP OBJECT NAME | PLACE NAME OF LOCATION |
|---|---|---|---|
| IMAGE IDENTIFICATION INFORMATION 3 | IMAGE PICKUP DATE AND TIME 3 | IMAGE PICKUP OBJECT NAME 1<br>⋮<br>IMAGE PICKUP OBJECT NAME p | PLACE NAME 1 |

| IMAGE IDENTIFICATION INFORMATION | IMAGE PICKUP DATE AND TIME | NAME | TELEPHONE NUMBER | MAIL ADDRESS | COMMENT | FACE REGION POSITION | LIKING |
|---|---|---|---|---|---|---|---|
| IMAGE IDENTIFICATION INFORMATION 1 | IMAGE PICKUP DATE AND TIME 1 | NAME 1 | TELEPHONE NUMBER 1 | MAIL ADDRESS 1 | SWEETHEART | FACE REGION POSITION 1 | LIKING 1 |

40A

43A

F I G . 9

| IMAGE IDENTIFICATION INFORMATION | IMAGE PICKUP DATE AND TIME | NAME | TELEPHONE NUMBER | MAIL ADDRESS | COMMENT | FACE REGION POSITION | LIKING |
|---|---|---|---|---|---|---|---|
| | | | | | | | |
| IMAGE IDENTIFICATION INFORMATION 2 | IMAGE PICKUP DATE AND TIME 2 | NAME 2 | TELEPHONE NUMBER 2 | MAIL ADDRESS 2 | FRIEND | FACE REGION POSITION 2 | LIKING 2 |
| | | NAME 3 | TELEPHONE NUMBER 3 | MAIL ADDRESS 3 | FRIEND | FACE REGION POSITION 3 | LIKING 3 |
| | | ... | ... | ... | ... | ... | ... |
| | | NAME y | TELEPHONE NUMBER y | MAIL ADDRESS y | PERSON ITSELF | FACE REGION POSITION y | LIKING y |

FIG. 10

| | | | | | | 40B | | |
|---|---|---|---|---|---|---|---|---|
| IMAGE IDENTIFICATION INFORMATION | IMAGE PICKUP DATE AND TIME | NAME | TELEPHONE NUMBER | MAIL ADDRESS | COMMENT | FACE REGION POSITION | LIKING | |
| | | NAME 2 | TELEPHONE NUMBER 2 | MAIL ADDRESS 2 | FRIEND | FACE REGION POSITION 2 | LIKING 5 | |
| IMAGE IDENTIFICATION INFORMATION 2 | IMAGE PICKUP DATE AND TIME 2 | NAME 3 | TELEPHONE NUMBER 3 | MAIL ADDRESS 3 | FRIEND | FACE REGION POSITION 3 | LIKING 6 | |
| | | ... | ... | ... | ... | ... | | |
| | | NAME y | TELEPHONE NUMBER y | MAIL ADDRESS y | PERSON ITSELF | FACE REGION POSITION y | | |

| CONDITION ITEM | SEARCH CONDITION |
|---|---|
| LIKING | LIKING 1 |
| RANKING | ○ |
| RECOMMENDATION | ○ |
| REFERENCE PERIOD | ONE MONTH BEFORE AND AFTER IMAGE PICKUP DATE AND TIME |
| LAID-OPEN INFORMATION | LAID-OPEN CONTENT KEYWORD 1, · · · , LAID-OPEN CONTENT KEYWORD a |
| SEASON AT PRESENT | SEASON KEYWORD 1, · · · , SEASON KEYWORD a |
| EVENT PERIOD AT PRESENT | EVENT KEYWORD 1, · · · , EVENT KEYWORD a |
| TIME ZONE AT PRESENT | TIME ZONE KEYWORD 1, · · · , TIME ZONE KEYWORD a |
| WEATHER AT PRESENT | WEATHER KEYWORD 1, · · · , WEATHER KEYWORD a |
| BIRTHDAY | BIRTHDAY KEYWORD 1, · · · , BIRTHDAY KEYWORD a |
| ADDRESS | A PREFECTURE, B PREFECTURE |
| RELATIONSHIP | RELATIONSHIP KEYWORD 1, · · · , RELATIONSHIP KEYWORD a |

46A

FIG.12

| CONDITION ITEM | SEARCH CONDITION |
|---|---|
| LIKING | LIKING 1, LIKING 2, · · · , LIKING y |
| RANKING | O |
| RECOMMENDATION | O |
| REFERENCE PERIOD | ONE YEAR BEFORE AND AFTER IMAGE PICKUP DATE AND TIME |
| LAID-OPEN INFORMATION | LAID-OPEN CONTENT KEYWORD 3, · · · , LAID-OPEN CONTENT KEYWORD b |
| SEASON AT PRESENT | SEASON KEYWORD 1, · · · , SEASON KEYWORD a |
| EVENT PERIOD AT PRESENT | EVENT KEYWORD 1, · · · , EVENT KEYWORD a |
| TIME ZONE AT PRESENT | TIME ZONE KEYWORD 1, · · · , TIME ZONE KEYWORD a |
| WEATHER AT PRESENT | WEATHER KEYWORD 1, · · · , WEATHER KEYWORD a |
| BIRTHDAY | BIRTHDAY KEYWORD 1, · · · , BIRTHDAY KEYWORD a |
| ADDRESS | A PREFECTURE, B PREFECTURE |
| RELATIONSHIP | RELATIONSHIP KEYWORD 5, · · · , RELATIONSHIP KEYWORD b |

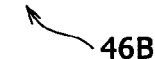
46B

FIG.13

| CONDITION ITEM | SEARCH CONDITION |
|---|---|
| IMAGE PICKUP OBJECT | IMAGE PICKUP OBJECT NAME 1, ···, IMAGE PICKUP OBJECT NAME p |
| PLACE NAME | PLACE NAME 1 |
| RANKING | O |
| RECOMMENDATION | O |
| REFERENCE PERIOD | THREE MONTHS BEFORE AND AFTER IMAGE PICKUP DATE AND TIME |
| SEASON AT PRESENT | SEASON KEYWORD 1, ···, SEASON KEYWORD a |
| EVENT PERIOD AT PRESENT | EVENT KEYWORD 1, ···, EVENT KEYWORD a |
| TIME ZONE AT PRESENT | TIME ZONE KEYWORD 1, ···, TIME ZONE KEYWORD a |
| WEATHER AT PRESENT | WEATHER KEYWORD 1, ···, WEATHER KEYWORD a |

| IMAGE IDENTIFICATION INFORMATION | IMAGE PICKUP DATE AND TIME | SEARCHED-OUT SOUND ATTRIBUTE INFORMATION | SEARCH REASON INFORMATION | SPECIFIED PERSON INFORMATION | FACE REGION POSITION |
|---|---|---|---|---|---|
| IMAGE IDENTIFICATION INFORMATION 1 | IMAGE PICKUP DATE AND TIME 1 | SEARCHED-OUT SOUND ATTRIBUTE INFORMATION 1 | SEARCH REASON 1 | | |
| | | SEARCHED-OUT SOUND ATTRIBUTE INFORMATION 2 | SEARCH REASON 1 | | |
| | | SEARCHED-OUT SOUND ATTRIBUTE INFORMATION 3 | SEARCH REASON 1 | SPECIFIED PERSON INFORMATION 1 | FACE REGION POSITION 1 |
| | | ... | ... | | |
| | | SEARCHED-OUT SOUND ATTRIBUTE INFORMATION r | SEARCH REASON 1 | | |

| IMAGE IDENTIFICATION INFORMATION | IMAGE PICKUP DATE AND TIME | SEARCHED-OUT SOUND ATTRIBUTE INFORMATION | SEARCH REASON INFORMATION | SPECIFIED PERSON INFORMATION | FACE REGION POSITION |
|---|---|---|---|---|---|
| IMAGE IDENTIFICATION INFORMATION 1 | IMAGE PICKUP DATE AND TIME 1 | SEARCHED-OUT SOUND ATTRIBUTE INFORMATION 1 | SEARCH REASON 1 | | |
| | | SEARCHED-OUT SOUND ATTRIBUTE INFORMATION 2 | SEARCH REASON 1 | | |
| | | SEARCHED-OUT SOUND ATTRIBUTE INFORMATION 5 | SEARCH REASON 3 | SPECIFIED PERSON INFORMATION 1 | FACE REGION POSITION 1 |
| | | ... | ... | | |
| | | SEARCHED-OUT SOUND ATTRIBUTE INFORMATION s | SEARCH REASON 2 | | |

| IMAGE IDENTIFICATION INFORMATION | IMAGE PICKUP DATE AND TIME | SEARCHED-OUT SOUND ATTRIBUTE INFORMATION | SEARCH REASON INFORMATION | SPECIFIED OBJECT INFORMATION |
|---|---|---|---|---|
| IMAGE IDENTIFICATION INFORMATION 3 | IMAGE PICKUP DATE AND TIME 3 | SEARCHED-OUT SOUND ATTRIBUTE INFORMATION 10 | SEARCH REASON 10 | |
| | | SEARCHED-OUT SOUND ATTRIBUTE INFORMATION 11 | SEARCH REASON 11 | |
| | | SEARCHED-OUT SOUND ATTRIBUTE INFORMATION 12 | SEARCH REASON 10 | SPECIFIED OBJECT INFORMATION 1 |
| | | ... | ... | |
| | | SEARCHED-OUT SOUND ATTRIBUTE INFORMATION t | SEARCH REASON 12 | |

| REPRODUCTION ORDER | SEARCHED-OUT SOUND ATTRIBUTE INFORMATION | SEARCH REASON INFORMATION | SPECIFIED OBJECT INFORMATION | FACE REGION POSITION | IMAGE IDENTIFICATION INFORMATION | IMAGE PICKUP DATE AND TIME |
|---|---|---|---|---|---|---|
| 1 | SEARCHED-OUT SOUND ATTRIBUTE INFORMATION 1 | SEARCH REASON 1 | SPECIFIED OBJECT INFORMATION 1 | FACE REGION POSITION 1 | IMAGE IDENTIFICATION INFORMATION 1 | IMAGE PICKUP DATE AND TIME 1 |
| 2 | SEARCHED-OUT SOUND ATTRIBUTE INFORMATION 5 | SEARCH REASON 1 | | | | |
| 3 | SEARCHED-OUT SOUND ATTRIBUTE INFORMATION 10 | SEARCH REASON 1 | | | | |
| ... | ... | ... | | | | |
| t | SEARCHED-OUT SOUND ATTRIBUTE INFORMATION r | SEARCH REASON 1 | | | | |

| REPRODUCTION ORDER | SEARCHED-OUT SOUND ATTRIBUTE INFORMATION | SEARCH REASON INFORMATION | SPECIFIED OBJECT INFORMATION | FACE REGION POSITION | IMAGE IDENTIFICATION INFORMATION | IMAGE PICKUP DATE AND TIME |
|---|---|---|---|---|---|---|
| 1 | SEARCHED-OUT SOUND ATTRIBUTE INFORMATION 21 | SEARCH REASON 20 | SPECIFIED OBJECT INFORMATION 2 | FACE REGION POSITION 2 | | |
| 2 | SEARCHED-OUT SOUND ATTRIBUTE INFORMATION 25 | SEARCH REASON 21 | SPECIFIED OBJECT INFORMATION 3 | FACE REGION POSITION 3 | IMAGE IDENTIFICATION INFORMATION 2 | IMAGE PICKUP DATE AND TIME 2 |
| 3 | SEARCHED-OUT SOUND ATTRIBUTE INFORMATION 27 | SEARCH REASON 20 | SPECIFIED OBJECT INFORMATION 4 | FACE REGION POSITION 4 | | |
| ... | ... | ... | ... | ... | | |
| t | SEARCHED-OUT SOUND ATTRIBUTE INFORMATION u | SEARCH REASON 22 | SPECIFIED OBJECT INFORMATION y | FACE REGION POSITION y | | |

| REPRODUCTION ORDER | SEARCHED-OUT SOUND ATTRIBUTE INFORMATION | SEARCH REASON INFORMATION | SPECIFIED OBJECT INFORMATION | FACE REGION POSITION | IMAGE IDENTIFICATION INFORMATION | IMAGE PICKUP DATE AND TIME |
|---|---|---|---|---|---|---|
| 1 | SEARCHED-OUT SOUND ATTRIBUTE INFORMATION 31 | SEARCH REASON 31 | SPECIFIED OBJECT INFORMATION 2 | FACE REGION POSITION 2 | IMAGE IDENTIFICATION INFORMATION | IMAGE PICKUP DATE AND TIME |
| 2 | SEARCHED-OUT SOUND ATTRIBUTE INFORMATION 35 | SEARCH REASON 32 | SPECIFIED OBJECT INFORMATION 3 | FACE REGION POSITION 3 | | |
| 3 | SEARCHED-OUT SOUND ATTRIBUTE INFORMATION 37 | SEARCH REASON 31 | SPECIFIED OBJECT INFORMATION 4 | FACE REGION POSITION 4 | IMAGE IDENTIFICATION INFORMATION 2 | IMAGE PICKUP DATE AND TIME 2 |
| ⋯ | ⋯ | ⋯ | ⋯ | ⋯ | | |
| t | SEARCHED-OUT SOUND ATTRIBUTE INFORMATION v | SEARCH REASON 35 | SPECIFIED OBJECT INFORMATION y | FACE REGION POSITION y | | |

| REPRODUCTION ORDER | SEARCHED-OUT SOUND ATTRIBUTE INFORMATION | SEARCH REASON INFORMATION | SPECIFIED OBJECT INFORMATION | IMAGE IDENTIFICATION INFORMATION | IMAGE PICKUP DATE AND TIME |
|---|---|---|---|---|---|
| 1 | SEARCHED-OUT SOUND ATTRIBUTE INFORMATION 10 | SEARCH REASON 10 | | | |
| 2 | SEARCHED-OUT SOUND ATTRIBUTE INFORMATION 15 | SEARCH REASON 10 | | | |
| 3 | SEARCHED-OUT SOUND ATTRIBUTE INFORMATION 19 | SEARCH REASON 11 | SPECIFIED OBJECT INFORMATION 1 | IMAGE IDENTIFICATION INFORMATION 3 | IMAGE PICKUP DATE AND TIME 1 |
| ... | ... | ... | | | |
| v | SEARCHED-OUT SOUND ATTRIBUTE INFORMATION t | SEARCH REASON 12 | | | |

51D

13

APPARATUS AND METHOD FOR PLAYLIST CREATION BASED ON LIKING OF PERSON SPECIFIED IN AN IMAGE

BACKGROUND

This present disclosure relates to a playlist creation apparatus, a playlist creation method and a playlist creating program and is suitably applied, for example, to a content reproduction system which creates a playlist which defines a reproduction order of sound data to be reproduced during display of a photograph image.

When an image pickup object is imaged to create an image such as a still picture or a moving picture, a reproduction apparatus in the past stores the created image as an image file with date and time information added thereto which represents the date and time of photographing.

Further, the reproduction apparatus takes in a music file to which date and time information representative of the date and time of creation or publication of music from the outside and records the music file into a memory.

Furthermore, when an image of an image file is to be displayed, the reproduction apparatus searches the memory for a music file to which date and time information at least part of which coincides with date and time information added to the image file is applied. Then, the reproduction apparatus creates a reproduction music list indicative of the searched out music file.

Then, while the reproduction apparatus reproduces the image file, it reproduces the music file indicated by the reproduction music list so that music conforming to the age of the image is reproduced while an image is displayed for enjoyment. The reproduction apparatus of the type described is disclosed, for example, in Japanese Patent Laid-Open No. 2009-117973, particularly on pages 7, 8 and 9.

Meanwhile, a content reproduction apparatus in the past records an image file created by photographing an image pickup object in an associated relationship with image attribute information such as a keyword set arbitrarily for the image pickup date or the image on a hard disk.

Further, the content reproduction apparatus records a music file in an associated relationship with music attribute information such as a keyword set arbitrarily for the year of release of the music or for the music on the hard disk.

Furthermore, if memory or an impression of a user in the past is designated as a year, month and day or a keyword, then the content reproduction apparatus uses the image attribute information to search for an image file corresponding to the designated year, month and day or keyword. Then, the content reproduction apparatus creates an image list indicating the searched out image file.

Further, the content reproduction apparatus uses the music attribute information to search for a music file corresponding to the designated year, month and day or keyword and creates a music list indicating the searched out music file. Further, the content reproduction apparatus associates the searched out music file with the image file of the image list.

Then, the content reproduction apparatus simultaneously reproduces the image file and the music file associated with each other in accordance with the image list and the music list so that the image and the music associated with the memory or impression in the past of the user are enjoyed simultaneously by the user. A content reproduction apparatus of the type described is disclosed, for example, in Japanese Patent Laid-Open No. 2007-200424, particularly on pages 7, 15 and 27.

SUMMARY

However, the reproduction apparatus and the content reproduction apparatus in the past are not configured such that, while an image in which a person is captured is displayed, sound conforming to a liking of the person is reproduced so as to be enjoyed by the person.

The reproduction apparatus and the content reproduction apparatus in the past have a problem in that they may not be able to provide a novel way of enjoyment of an image and sound.

Therefore, it is desirable to provide a playlist creation apparatus, a playlist creation method and a playlist creating program which can provide a novel way of enjoyment of an image and sound.

According to the technology disclosed herein, a playlist creation apparatus, a playlist creation method and a playlist creating program are configured such that a person captured in an image based on image data is specified and then a liking of the specified person is extracted, whereafter, based on the extracted liking, sound data of sound conforming to the liking is searched for, and a playlist which defines a reproduction order of the searched-out sound data during display of the image based on the image data is created.

Accordingly, in the playlist creation apparatus, playlist creation method and playlist creating program, while image data is reproduced and an image in which a person is captured is displayed, it is possible to reproduce sound data in accordance with a playlist so that sound conforming to the liking of the person captured in the image can be provided for enjoyment of the person.

In the disclosed technology, a person captured in an image based on image data is specified and then a liking of the specified person is extracted. Then, based on the extracted liking, sound data of sound conforming to the liking is searched for, and a playlist which defines a reproduction order of the searched-out sound data during display of the image based on the image data is created. Therefore, with the disclosed technology, while image data is reproduced and an image in which a person is captured is displayed, it is possible to reproduce sound data in accordance with a playlist so that sound conforming to the liking of the person captured in the image can be provided for enjoyment of the person. Consequently, according to the disclosed technology, a playlist creation apparatus, a playlist creation method and a playlist creating program which can provide a novel way of enjoyment of an image and sound can be implemented.

BRIEF DESCRIPTION OF THE DRAWINGS

FIG. 4 is a view illustrating a configuration of an image playlist;

FIG. 5 is a view illustrating a configuration of telephone directory data;

FIGS. 6A and 6B are views illustrating a configuration of specified person lists;

FIGS. 8, 9 and 10 are views illustrating different configurations of an added liking person list;

FIGS. 11, 12 and 13 are views illustrating different configurations of a search condition list;

FIGS. 14, 15 and 16 are views illustrating different configurations of a searched-out sound list;

FIGS. 17, 18, 19 and 20 are views illustrating different configurations of a sound playlist;

DETAILED DESCRIPTION OF THE PREFERRED EMBODIMENTS

In the following, embodiments of the disclosed technology are described with reference to the accompanying drawings. It is to be noted that the description is given in the following order.

1. Outline of Embodiments
2. First Embodiment
3. Second Embodiment
4. Modification 1. Outline of Embodiments First, a general configuration of the embodiments is described. After the general configuration is described, first and second embodiments which are particular embodiments of the disclosed technology are described.

Figure 1:
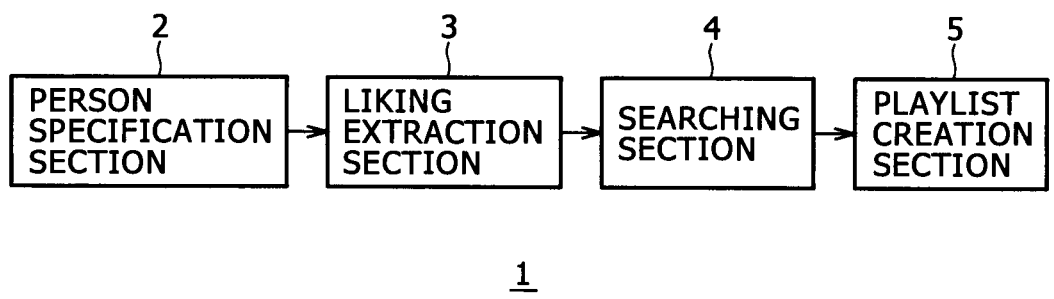
FIG. 1 is a block diagram showing a general configuration of a playlist creation apparatus to which the disclosed technology is applied.

Referring first to FIG. 1, there is shown a general configuration of a playlist creation apparatus according to the embodiments of the disclosed technology. The playlist creation apparatus 1 includes a person specification section 2 which specifies a person captured in an image based on image data.

The playlist creation apparatus 1 further includes a liking extraction section 3 which extracts a liking of a person specified by the person specification section 2. The playlist creation apparatus 1 further includes a searching section 4 which searches, based on the liking extracted by the liking extraction section 3, for sound data of sound conforming to the liking.

The playlist creation apparatus 1 further includes a playlist creation section 5 which creates a playlist which defines a reproduction order of sound data searched out by the searching section 4 during display of an image based on image data.

The playlist creation apparatus 1 having the configuration described above reproduces, while reproducing image data and displaying an image in which a person is captured, sound data in accordance with a playlist so that sound conforming to a liking of the person captured in the image can be enjoyed by the person. Therefore, the playlist creation apparatus 1 can provide novel enjoyment of an image and sound.

2. First Embodiment 2-1. Configuration of the Content Reproduction System

Figure 2:
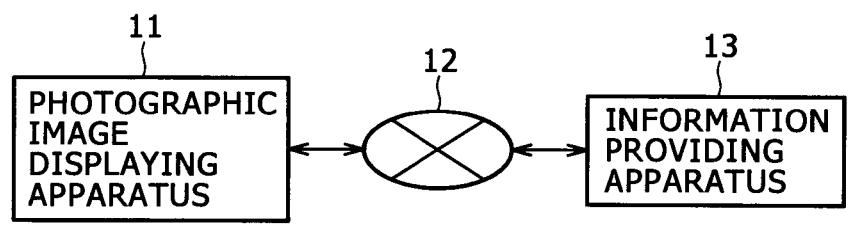
FIG. 2 is a block diagram showing a configuration of a content reproduction system according to a first embodiment.

Referring now to FIG. 2, there is shown a general configuration of a content reproduction system according to a first embodiment of the disclosed technology. The content reproduction system 10 includes a photograph image displaying apparatus 11 called digital photo frame which is a particular example of the playlist creation apparatus 1 described hereinabove.

In the content reproduction system 10, the photograph image displaying apparatus 11 can communicate with an information providing apparatus 13 through a network 12.

The photograph image displaying apparatus 11 has an image-only reproduction function of reproducing only photograph image data, a sound-only reproduction function of reproducing only sound data, a telephoning function, a transmission/reception function of an electronic mail or e-mail, and an access function to a site on the network 12.

The photograph image displaying apparatus 11 creates, based on one or a plurality of photograph image data of a reproduction object and various pieces of information provided from the information providing apparatus 13, a playlist which defines a reproduction order of the sound data during display of a photograph image based on the one or plural photograph image data. Incidentally, in the following description, a playlist which defines a reproduction order of sound data is referred to also as a sound playlist.

The photograph image displaying apparatus 11 further has an image and sound reproduction function of reproducing sound data in accordance with a playlist while one or plural photograph image data of an object of reproduction are reproduced, that is, while a photograph image based on the photograph image data is displayed.

2-2. Hardware Configuration According to the Functional Circuit Blocks of the Photograph Image Display Apparatus Now, a hardware configuration according to functional circuit blocks of the photograph image displaying apparatus 11 is described with reference to FIG. 3.

The photograph image displaying apparatus 11 includes a main controlling section 20 which executes various processes and controls the entire photograph image displaying apparatus 11 in accordance with the processes.

If an image file is transferred from an external apparatus not shown such as a personal computer or a digital camera connected to an external apparatus interface 21, then the main controlling section 20 takes in the image file through the external apparatus interface 21. Then, the main controlling section 20 signals the image file to an image storage section 22 so as to be stored into the image storage section 22.

The image file here is created, for example, by a digital camera which photographs an image pickup object and is configured from a header part and a main body part.

In the main body part of the image file, one photograph image data produced by photographing an image pickup object such as one or a plurality of persons such as acquaintances, a natural object or objects such as a mountain, a river or a sea, an artificial object such as a building or exhibited items using a digital camera is stored.

In the header part of the image file, header data produced, for example, in accordance with the Exif (Exchangeable image file format) when the image pickup object is photographed by the digital camera is stored as attribute information of the photograph image data in the main body part.

Further, in the header part of the image file, thumbnail image data produced, for example, by carrying out a reduction process by sampling out of pixels for the photograph image data when the image pickup object is photographed by the digital camera is stored as attribute information of the photograph image data in the main body part.

Incidentally, a thumbnail image based on the thumbnail image data has a picture pattern substantially same as that of the photograph image although the size thereof is smaller than that of a photograph image based on the photograph image data. Therefore, the thumbnail image can be used as an index to the photograph image.

The header data is identification information with which the photograph image data in the main body part together with the image file can be identified individually such as, for example, a file name. Thus, the identification information is hereinafter referred to also as image identification information. Further, the header data includes various kinds of information representative of image pickup conditions when the image pickup object is photographed.

The header data further includes, as information representative of an image pickup condition, information representative of the position of the digital camera and detected through communication with artificial satellites for the GPS (Global Positioning System) when the image pickup object is photographed by the digital camera.

It is to be noted that the position detected when the digital camera photographs the image pickup object is represented by a latitude and an altitude. Thus, in the following description, the position detected when the digital camera photographs the image pickup object is referred to also as camera position, and information representative of the camera position as an image pickup condition included in the header data is referred to also as camera position information.

Further, the header data includes, as information representative of an image pickup condition, also information detected using an azimuth sensor when the image pickup object is photographed by the digital camera and representative of the azimuth in which the image pickup lens of the digital camera is directed to the image pickup object for photographing.

It is to be noted that the azimuth detected when the digital camera photographs the image pickup object is represented by a cardinal direction. In the following description, the azimuth detected when the digital camera photographs an image pickup object is referred to also as image pickup direction, and information representative of the image pickup direction as an image pickup condition included in the header data is referred to also as image pickup direction information.

Further, the header data includes, as information representative of an image pickup condition, information representative of the date and time of image pickup detected using a clock which counts the date and time at present when the image pickup object is photographed by the digital camera. Such information is hereinafter referred to also as image pickup date and time information.

The main controlling section 20 takes in, every time an image file is transferred thereto from an external apparatus, the image file through the external apparatus interface 21 and stores the image file into the image storage section 22.

Consequently, the main controlling section 20 can accumulate a plurality of image files, in which photograph image data are stored individually, into the image storage section 22.

Then, if the image-only reproduction function is selected through an operation section 23 by the user, then the main controlling section 20 enters an image-only reproduction mode.

Thereupon, the main controlling section 20 reads out thumbnail image data and image identification information stored in regard to a plurality of image files from the image storage section 22.

The main controlling section 20 creates image selection screen data for selecting photograph image data of a reproduction object based on the plural thumbnail image data.

Then, the main controlling section 20 signals the image selection screen data to a display section 25 through a display controlling section 24 so that an image selection screen not shown is displayed on the display section 25.

In this instance, the image selection screen includes a plurality of thumbnail images disposed, for example, in a matrix. The image selection screen further includes a selection part for allowing the user to arbitrarily select display time of a photograph image, for example, from among time indications in a unit of a minute from several minutes to several hundreds minutes. Incidentally, in the following description, display time selected for display of a photograph image is referred to particularly also as selection display time.

Consequently, the main controlling section 20 notifies the user of reproducible photograph images, that is, displayable photograph images, as corresponding thumbnail images through the image selection screen.

If one or a plurality of photograph image data of a reproduction object are selected as thumbnail images on the image selection screen through the operation section 23 by the user, then the main controlling section 20 creates such an image playlist 26 which defines a reproduction order of the selected one or plural photograph image data as illustrated in FIG. 4.

Incidentally, in the following description, the image playlist 26 which defines a reproduction order of photograph image data is referred to also as the image playlist 26.

In this instance, the main controlling section 20 lines up the image identification information of the one or plural photograph image data selected as a reproduction object and registers the lined up image identification information in the selected order into the image playlist 26.

Consequently, in the image playlist 26, the main controlling section 20 indicates the one or plural photograph image data of a reproduction object in the image identification information and defines the reproduction order of the one or plural photograph image data, for example, as a lined up order of the image identification information, that is, as the order in which the photograph image data are selected.

Further, if selection display time is selected on the image selection screen through the operation section 23 by the user, then the main controlling section 20 signals the image playlist 26 together with the selection time information representative of the selected selection reproduction time to a setting information storage section 27 so as to be stored into the setting information storage section 27.

Consequently, the main controlling section 20 sets the photograph image data of the reproduction object so as to be reproduced in accordance with the image playlist 26.

Further, if photograph image data is reproduced in accordance with the image playlist 26, then the main controlling section 20 sets a photograph image based on the photograph image data so as to be displayed continuously for a period of the selection display time.

Incidentally, the main controlling section 20 allows arbitrary selection of one selection display time on the image selection screen. Therefore, if a plurality of photograph image data are selected as a reproduction object, then the main controlling section 20 sets the display time for photograph images based on the plural photograph image data uniformly to the selection display time.

In this state, the main controlling section 20 reads out an image file in which the photograph image data to be reproduced first is stored from the image storage section 22 in accordance with the image playlist 26, that is, based on the image identification information in the image playlist 26.

Then, the main controlling section 20 takes in photograph image data from the image file and signals the taken in photograph image data to the display section 25 through the display controlling section 24. Consequently, the main controlling section 20 controls the display section 25 to display a photograph image based on the photograph image data.

After the display of a photograph image is started by the display section 25, the main controlling section 20 starts time counting by means of an internal timer not shown.

Consequently, for a period before the time counted by the timer (the time is hereinafter referred to as counted time) reaches the selection display time, the main controlling section 20 continues the display of the photograph image by the display section 25.

Then, when the counted time reaches the selection display time, the main controlling section 20 decides whether or not photograph image data to be reproduced next, that is, image identification information of the photograph image data to be reproduced next, is registered in the image playlist 26.

If photograph image data to be reproduced next is registered in the image playlist 26, then the main controlling section 20 reads out an image file in which the photograph image data to be reproduced next is stored from the image storage section 22 in accordance with the image playlist 26.

Then, the main controlling section 20 takes out the photograph image data from the image file and signals the taken out photograph image data to the display section 25 through the display controlling section 24.

Consequently, the main controlling section 20 controls the display section 25 to display a photograph image based on the photograph image data signaled newly in place of the photograph image which has been displayed till then.

Also in this instance, the main controlling section 20 starts time counting by means of the internal timer in response to the start of the display of the new photograph image by the display section 25.

Then, the main controlling section 20 continues the display of the new photograph image by the display section 25 for a period before the counted time reaches the selection display time. Further, when the counted time reaches the selection display time, the main controlling section 20 carries out processing similar to that described above.

On the other hand, if photograph image data to be reproduced next is not registered in the image playlist 26, then the main controlling section 20 stops signaling of photograph image data to the display section 25 to end the display of a photograph image by the display section 25.

In this manner, the main controlling section 20 controls the display section 25 to suitably change over a photograph image based on one or a plurality of photograph image data selected as a reproduction object to successively display the photograph images for each selection display time.

Consequently, the main controlling section 20 displays only one photograph image at a time on the display section 25 and successively and switchably displays a plurality of photograph images as in a slideshow.

On the other hand, if a sound file is transferred to the photograph image displaying apparatus 11, for example, from an external apparatus connected to the external apparatus interface 21, then the main controlling section 20 takes in the sound file through the external apparatus interface 21. Further, the main controlling section 20 signals the sound file to a sound storage section 28 so as to be stored into the sound storage section 28.

The sound file here is configured from a header part and a main body part. In the main body part of the sound file, one sound data created by converting music, sound in the nature such as sound of waves, murmuring of the river, singing of a bird or chirping of an insect, or sound of comic story or reading into digital data is stored.

In the header part of the sound file, header data representative of attribute information of the sound data in the main body part is stored. Incidentally, the header data includes identification information with which the sound data in the main body part can be identified individually together with the sound file. The identification information may be information applied arbitrarily by a creation company of the sound data and is hereinafter referred to also as sound identification information.

Further, the header data includes various kinds of information such as information of a title or an artist of sound based on the sound data in the main body part, a genre to which the sound belongs, a year of the release, and reproduction time of the sound data as well.

Every time a sound file is transferred from an external apparatus to the photograph image displaying apparatus 11, the main controlling section 20 takes in the sound file through the external apparatus interface 21 and stores the sound file into the sound storage section 28.

Further, if a request for acquisition of a sound purchase page image is received through the operation section 23 from the user, then the main controlling section 20 signals page image request data, for example, to the information providing apparatus 13 on the network 12 successively through a communication controlling section 29 and a network interface 30.

Thereupon, the information providing apparatus 13 sends back page image data of the sound purchase page image in response to reception of the page image request data to the photograph image displaying apparatus 11.

Thus, when the page image data is sent back from the information providing apparatus 13 in response to the transmission of the page image request data, the main controlling section 20 receives the page image data successively through the network interface 30 and the communication controlling section 29.

Then, the main controlling section 20 signals the page image data to the display section 25 through the display controlling section 24 so that a sound purchase page image based on the page image data is displayed on the display section 25.

If, in this state, sound data which the user wants to purchase is selected on the sound purchase page image through the operation section 23 by the user, then the main controlling section 20 creates purchase request data for the request for the purchase of the selected sound data.

Then, the main controlling section 20 transmits the purchase request data to the information providing apparatus 13 on the network 12 successively through the communication controlling section 29 and the network interface 30.

Thereupon, the information providing apparatus 13 executes an accounting process for the purchase of the sound data selected for the purchase by the user in response to reception of the purchase request data.

Then, after the accounting process is completed, the information providing apparatus 13 sends back a sound file of a similar configuration to that described hereinabove in which the sound data is stored to the photograph image displaying apparatus 11.

Therefore, when the sound file is sent back from the information providing apparatus 13 after the transmission of the purchase request data, the main controlling section 20 receives the sound file successively through the network interface 30 and the communication controlling section 29. Further, the main controlling section 20 signals the received sound file to the sound storage section 28 so as to be stored into the sound storage section 28.

In this manner, every time a request for purchase of sound data is issued from the user, the main controlling section 20 can utilize the information providing apparatus 13 to purchase sound data and store the sound data into the sound storage section 28.

In this manner, the main controlling section 20 can utilize the external apparatus or the information providing apparatus 13 to store a plurality of sound files in which sound data are stored into the sound storage section 28.

Then, if the sound-only reproduction function is selected by the user through the operation section 23, then the main controlling section 20 enters a sound-only reproduction mode.

Thereupon, the main controlling section 20 reads out the header data stored in a plurality of sound files, that is, attribute information of the sound data, from the sound storage section 28.

Further, the main controlling section 20 creates sound selection screen data for selecting sound data of a reproduction object based, for example, on the titles included in the plural head data.

Then, the main controlling section 20 signals the sound selection screen data to the display section 25 through the display controlling section 24 so that a sound selection screen not shown is displayed on the display section 25 based on the sound selection screen data.

In this instance, the titles of sound based on the plural sound data are disposed in a list on the sound selection screen.

Consequently, the main controlling section 20 notifies the user of the reproducible sound data, that is, sound which can be outputted, as corresponding titles through the sound selection screen.

If, in this state, one or a plurality of sound data of a reproduction object are selected as titles on the sound selection screen through the operation section 23 by the user, then the main controlling section 20 creates a sound playlist which defines a reproduction order of the selected one or plural sound data.

In this instance, the main controlling section 20 registers lined up attribute information including at least the sound identification information of the one or plural sound data selected as a reproduction object in the sound playlist and registers the lined up attribute information in the selected order.

Consequently, the main controlling section 20 indicates the one or plural sound data of the reproduction object in the sound playlist and defines a reproduction order of the one or plural sound data as an order in which the attribute information is lined up, that is, in the order in which the sound data are selected.

After the sound playlist is created, the main controlling section 20 signals the sound playlist to the setting information storage section 27 so as to be stored into the setting information storage section 27 thereby to set the sound data of the reproduction object so as to be reproduced in accordance with the sound playlist.

Then, the main controlling section 20 reads out the sound file in which sound data to be reproduced first is stored from the sound storage section 28 in accordance with the sound playlist, that is, based on the sound identification information in the sound playlist.

Then, the main controlling section 20 takes out the sound data from the sound file and signals the taken out sound data to a reproduction section 32 through a reproduction controlling section 31.

Consequently, the reproduction section 32 carries out a predetermined reproduction process for the sound data and outputs resulting sound, that is, sound based on the sound data.

Further, the main controlling section 20 decides, when the preproduction process for one sound data by the reproduction section 32 comes to an end, whether or not sound data to be reproduced next, that is, sound identification information of the sound data to be reproduced next, is registered in the sound playlist.

If the main controlling section 20 decides that sound data to be reproduced next is registered in the sound playlist, then it reads out a sound file in which the sound data to be reproduced next is stored from the sound storage section 28 in accordance with the sound playlist.

Then, the main controlling section 20 takes out the sound data from the sound file and signals the taken out sound data to the reproduction section 32 through the reproduction controlling section 31.

Consequently, the reproduction section 32 carries out a predetermined reproduction process for the sound data to be reproduced next and outputs resulting sound, that is, sound based on the sound data to be reproduced next, continuously to the sound which has been outputted till then.

Also in this instance, when the reproduction process for the sound data by the reproduction section 32 comes to an end, the main controlling section 20 carries out processing similarly as described hereinabove.

On the other hand, if sound data to be reproduced next is not registered in the sound playlist, then the main controlling section 20 ends the outputting of sound without signaling new sound data to the reproduction section 32.

In this manner, the main controlling section 20 controls the reproduction section 32 to suitably and switchably output sound based on one or a plurality of sound data selected as the reproduction object.

Consequently, the main controlling section 20 allows the user to enjoy only one sound or continuously enjoy a plurality of sounds through the reproduction section 32.

Incidentally, the main controlling section 20 stores, for example, in a telephone directory storage section 33, data of a telephone directory (such data are hereinafter referred to also as telephone directory data) of families, friends and so forth of the user who utilize the photograph image displaying apparatus 11. Such families, friends and so forth are hereinafter referred to collectively as acquaintances.

Referring to FIG. 5, the telephone directory data include, for each of a plurality of acquaintances, the name, a telephone number, a mail address, a comment, image data of an image of the face and a characteristic amount of the image detected from the image of the face registered in an associated relationship with each other.

It is to be noted that, in the following description, the image data of the face of an acquaintance is referred to also as acquaintance face image data, and an image based on the acquaintance face image data is referred to also as acquaintance face image. Further, in the following description, a characteristic amount of the image extracted from the acquaintance face image is referred to also as acquaintance face characteristic amount.

Actually, if a request for registration of an acquaintance into the telephone directory is received from the user through the operation section 23, then the main controlling section 20 executes a registration process of the acquaintance into the telephone directory.

Thereupon, the main controlling section 20 urges, for example, the user to input the name, a telephone number, a mail address and a comment representative of, for example, a relationship of the acquaintance to the user such as a sweetheart, a friend or the mother through the operation section 23.

Then, the main controlling section 20 signals the inputted name, telephone number, mail address and comment of the acquaintance to the telephone directory storage section 33 so as to be stored into the telephone directory storage section 33 thereby to register the name, telephone number, mail address and comment of the acquaintance into the telephone directory data.

For example, if a request for display of an image selection screen is received from the user through the operation section 23, then the main controlling section 20 reads out thumbnail image data and image identification information stored in a plurality of image files in an associated relationship with each other from the image storage section 22.

Further, the main controlling section 20 creates image selection screen data for selecting photograph image data based on the plural thumbnail image data and image identification information.

Then, the main controlling section 20 signals the image selection screen data to the display section 25 through the display controlling section 24 so that a plurality of thumbnail images are displayed in a list as an image selection screen not shown based on the image selection screen data on the display section 25.

Then, if, in this state, a photograph image in which the face of an acquaintance is selected as a thumbnail image on the image selection screen by the user through the operation section 23, then the main controlling section 20 reads out the image file from the image storage section 22 based on image identification information corresponding to the thumbnail image.

In particular, the main controlling section 20 reads out, based on the image identification information corresponding to the selected thumbnail image, an image file in which photograph image data of a photograph image selected as the thumbnail image by the user is stored from the image storage section 22.

Then, the main controlling section 20 takes out the photograph image data from the image file and signals the taken out photograph image data to an image analysis section 34.

The image storage section 22 has stored therein in advance a rough luminance distribution of an image of the face of a person and face search data representative of a pattern of a rough structure.

Further, the image storage section 22 also has stored therein in advance face characteristic data representative of characteristic amounts of an image (such characteristic amounts are hereinafter referred to also as face detection characteristic amounts) to be used for detection of the face of a person captured in a photograph image.

Incidentally, a face detection characteristic amount is configured from the shape of the face, eyes, nose, mouth, eyebrows and so forth, a positional relationship of them and so forth. Further, a face detection characteristic amount is created by learning using the characteristic amounts of images of the face of a plurality of persons extracted from the images.

Thereupon, if photograph image data is received from the main controlling section 20, then the image analysis section 34 reads out the face search data and the face characteristic data from the image storage section 22.

Then, the image analysis section 34 searches a photograph image based on the photograph image data for a region in which it is supposed that the face of a person is captured. Such a region is hereinafter referred to also as a supposition region.

If the image analysis section 34 detects one or a plurality of supposition regions on the photograph image, then it extracts, as characteristic amounts of each image, for example, a shape of a plurality of contour lines, a positional relationship between the plural contour lines and a color from the detected one or plural supposition regions. Incidentally, in the following description, a characteristic amount of an image extracted from a supposition region of a photograph image is referred to also as a supposition region characteristic amount.

Further, the image analysis section 34 executes, for each supposition region of a photograph image, a predetermined arithmetic operation process based on a face detection characteristic amount indicated by face characteristic data and a supposition region characteristic amount extracted from the supposition region.

Consequently, for each supposition region of a photograph image, the image analysis section 34 calculates what degree of certainty an image pickup object captured in the supposition region has as the face of a person.

Further, the image analysis section 34 compares the degree of certainty calculated for each supposition region with a first threshold value selected in advance. If the degree of certainty calculated for each supposition region of the photograph image is equal to or higher than the first threshold value, then the image analysis section 34 estimates that the image pickup object captured in the supposition region of the photograph image is the face of a person.

In this manner, the image analysis section 34 detects a supposition region in which the face of a person is captured, that is, a supposition region in which a degree of certainty equal to or higher than the first threshold value is obtained, from among the one or plural supposition regions in the photograph image as a person face region.

If one or a plurality of person face regions are detected from among the one or plural supposition regions, then the image analysis section 34 extracts the supposition region characteristic amount extracted from each of the person face regions as a person face characteristic amount indicative of a characteristic amount of the image of the face of the person. Further, the image analysis section 34 creates face region position information indicative of the position of the person face region in the photograph image.

Further, the image analysis section 34 associates, for each of the person face regions detected in the photograph image, the person face characteristic amount and the region position information of the person face region with each other to create person face region information. Then, the image analysis section 34 signals the information of the one or plural person face regions to the main controlling section 20 together with the photograph image data.

When the information of one or plural person face regions is received from the image analysis section 34 together with the photograph image data, then the main controlling section 20 works the photograph image data based on the region position information indicated by the person face region information to create face presenting image data for presenting the detected face of the person.

Then, the main controlling section 20 signals the face presenting image data to the display section 25 through the display controlling section 24. Consequently, the main controlling section 20 controls the display section 25 to display a face presenting image in which the detected face of one or plural persons is surrounded by a frame line, that is, a frame line is superposed on the border of the person face region, based on the face presenting image data.

In this manner, the main controlling section 20 presents the face of one or a plurality of persons captured in the original photograph image, that is, including the face of an acquaintance, to the user through the face presenting image.

If, in this state, a person face region in which the face of an acquaintance is captured and which is surrounded by a frame line is selected on the face presenting image by the user through the operation section 23, then the main controlling section 20 cuts out the selected person face region from the face presenting image to create acquaintance face image data of the acquaintance face image.

Further, the main controlling section 20 determines the person face characteristic amount of the person face region selected by the user from among the person face characteristic amounts indicated by the information of one or plural person face regions as an acquaintance face characteristic amount.

Then, the main controlling section 20 signals the acquaintance face image data and the acquaintance face characteristic amount for the acquaintance to the telephone directory storage section 33 so as to be stored into the telephone directory storage section 33 and registers the acquaintance face image data and the acquaintance face characteristic amount in an associated relationship with the other information of the acquaintance such as the name into the telephone directory data.

In this manner, the main controlling section 20 registers the name, a telephone number, a mail address, a comment, acquaintance face image data and an acquaintance face characteristic amount of a plurality of acquaintances into the telephone directory data in response to an operation of the operation section 23 by the user.

Further, the main controlling section 20 has, stored in the telephone directory storage section 33 thereof as own station data, the name, telephone number, mail address, image data of an image of the face and a characteristic amount of an image extracted from the image of the face based on the image data of the user.

It is to be noted that, in the following description, image data of an image of the face of the user is referred to also as user face image data, and an image based on the user face image data is referred to also as user face image. Further, in the following description, a characteristic amount of the image extracted from the user face image is referred to also as user face characteristic amount.

Incidentally, the telephone number and the mail address of the user are those allocated to the photograph image displaying apparatus 11 used by the user.

Further, the main controlling section 20 acquires the user face image data and the user face characteristic amount included in the own station data in a similar manner as in the case in which acquaintance face image data and an acquaintance face characteristic amount are acquired as described above.

If a telephone number of an acquaintance is inputted directly through the operation section 23 or selected utilizing the telephone direction data by the user and then a call originating instruction is inputted, then the main controlling section 20 creates call origination data using part of the own station data together with the telephone number.

Then, the main controlling section 20 transmits the call origination data to a telephoning unit (not shown) of the acquaintance successively through the communication controlling section 29 and the network interface 30 to notify the acquaintance of the call origination from the user through the telephoning unit.

Then, if the acquaintance acknowledges the telephone call and communication with the telephoning unit of the acquaintance is established, then the main controlling section 20 collects voice of the user by means of a sound collection section 35 to produce telephone conversation voice data.

Then, the main controlling section 20 transmits the telephone conversation voice data to the telephoning unit of the acquaintance successively through the communication controlling section 29 and the network interface 30.

Then, if telephone conversation voice data transmitted from the telephoning unit of the acquaintance is received successively through the network interface 30 and the communication controlling section 29, then the main controlling section 20 signals the telephone conversation voice data to the reproduction section 32 through the reproduction controlling section 31.

Then, the reproduction section 32 carries out a predetermined reproduction process for the telephone conversation voice data received from the main controlling section 20 and outputs resulting voice of the acquaintance.

When communication with the telephoning unit of the acquaintance is established in accordance with the request for telephone call from the user in this manner, the main controlling section 20 can transmit and receive telephone conversation voice data of voice of the user and the acquaintance so that the user and the acquaintance can talk with each other.

Incidentally, if call termination data transmitted from the telephoning unit of the acquaintance is received successively through the network interface 30 and the communication controlling section 29, then the main controlling section 20 drives, for example, a ringer (not shown) to generate ringer sound based on the call termination data.

Further, the main controlling section 20 causes the display controlling section 24 to control the display section 25 to display the name, a telephone number or the like of the acquaintance who requests for telephone conversation based on the call termination data. The main controlling section 20 thereby notifies the user of the call termination from the acquaintance.

If, in this state, telephone conversation is authorized by the user through the operation section 23 and communication with the telephoning unit of the acquaintance is established, then the main controlling section 20 collects voice of the user by means of the sound collection section 35 to produce telephone conversation voice data.

Then, the main controlling section 20 transmits the telephone conversation voice data to the telephoning unit of the acquaintance successively through the communication controlling section 29 and the network interface 30.

Then, if telephone conversion voice data transmitted from the telephoning unit of the acquaintance is received successively through the network interface 30 and the communication controlling section 29, then the main controlling section 20 signals the telephone conversation voice data to the reproduction section 32 through the reproduction controlling section 31.

Then, the reproduction section 32 carries out a predetermined reproduction process for the telephone conversion voice data received from the main controlling section 20 and outputs resulting voice of the acquaintance.

In this manner, also when communication with the telephoning unit of the acquaintance is established in accordance with a request for telephone conversation from the acquaintance, the main controlling section 20 can transmit and receive telephone conversation voice data of voice of the user and the acquaintance so that the user and the acquaintance can talk with each other.

If a request for creation of an electronic mail is received from the user through the operation section 23, then the main controlling section 20 reads out mail creation screen data stored in advance, for example, from the telephone directory storage section 33.

Then, the main controlling section 20 signals the mail creation screen data to the display section 25 through the display controlling section 24 so that an electronic mail creation screen (not shown) is displayed based on the mail creation screen data on the display section 25.

Consequently, the main controlling section 20 can allow the user to input a mail text on the electronic mail creation screen through the operation section 23 and input a mail address of an acquaintance, which is to become a transmission opposing party of the electronic mail, directly or making use of the telephone directory data.

Then, if a transmission instruction of the electronic mail is inputted by the user through the operation section 23 in a state in which a mail address is inputted together with the mail text on the electronic main production screen, then the main controlling section 20 creates electronic mail data composed of the mail text and the mail address.

Further, the main controlling section 20 transmits the electronic mail data to the telephoning unit of the acquaintance successively through the communication controlling section 29 and the network interface 30 and further through a mail server not shown.

In this manner, the main controlling section 20 can send an electronic mail created by the user to an acquaintance to allow the acquaintance to open and read the electronic mail.

On the other hand, if electronic mail data transmitted from the telephoning unit of the acquaintance through the mail server is received successively through the network interface 30 and the communication controlling section 29, then the main controlling section 20 stores the electronic mail data, for example, into the telephone directory storage section 33 once.

Further, the main controlling section 20 notifies the user of the reception of the electronic mail, for example, through the display section 25, reproduction section 32 or the like.

Then, if an instruction to open the electronic mail is issued from the user through the operation section 23, then the main controlling section 20 reads out the electronic mail data from the telephone directory storage section 33 and signals the read out electronic mail data to the display section 25 through the display controlling section 24.

Consequently, the main controlling section 20 can control the display section 25 to display the mail address and so forth of the acquaintance together with the mail text of the electronic mail received from the acquaintance based on the electronic mail data so that the user can read them.

Further, if a request for accessing to a community site is issued from the user through the operation section 23, then the main controlling section 20 accesses a community side on the network 12 successively through the communication controlling section 29 and the network interface 30.

Incidentally, such a communication site as mentioned above is provided as a social networking service (SNS), for example, on the network 12.

If, in this state, various kinds of information are inputted and an instruction for uploading is issued from the user through the operation section 23, then the main controlling section 20 transmits the inputted information to the community site on the network 12 successively through the communication controlling section 29 and the network interface 30.

Consequently, the main controlling section 20 can lay open a profile, a photograph, a diary or the like of the user or send a message to an acquaintance making use of the community site on the network 12.

Further, if information for laying-open to the public, that is, a blog, is created by and an uploading instruction is issued from the user through the operation section 23, then the main controlling section 20 accesses a laid-open site on the network 12 successively through the communication controlling section 29 and the network interface 30.

Consequently, the main controlling section 20 can lay open a diary, a memorandum, a comment or the like of the user as a blog on the laid-open site on the network 12.

Now, the image and sound reproduction function implemented by the main controlling section 20 utilizing various kinds of information provided from the information providing apparatus 13 as described above is described.

In order to make it possible to utilize the information providing apparatus 13 to implement the image and sound reproduction function, the main controlling section 20 issues a request for registration of a user to the information providing apparatus 13.

Incidentally, in the following description, registration of a utilizer such as the user into the information providing apparatus 13 for making it possible to utilize the information providing apparatus 13, that is, for making it possible for the utilizer to receive provision of information from the information providing apparatus 13, is referred to also as user registration.

In particular, if a request for user registration into the information providing apparatus 13 is issued from the user through the operation section 23, then the main controlling section 20 transmits registration request data to the information providing apparatus 13 on the network 12 successively through the communication controlling section 29 and the network interface 30.

In response to reception of the registration request data, the information providing apparatus 13 sends back personal information inputting screen data for allowing personal information for registration of a user to be inputted to the photograph image displaying apparatus 11.

When the personal information inputting screen data is sent back from the information providing apparatus 13 in response to the transmission of the registration request data, the main controlling section 20 receives the personal information inputting screen data successively through the network interface 30 and the communication controlling section 29.

Then, the main controlling section 20 signals the personal information inputting screen data to the display section 25 through the display controlling section 24 so that a personal information inputting screen (not shown) based on the personal information inputting screen data is displayed on the display section 25.

The personal information inputting screen includes an entry field for allowing various kinds of information to be inputted as personal information for registration of a user.

Here, the personal information for user registration may be identification information unique to the user (such information is hereinafter referred to also as user identification information) and a password.

Further, the personal information for user registration may include information of the user itself such as the name, the date of birth, the address, a telephone number or a mail address or information which can be utilized for discrimination of personal information of the user.

Furthermore, the personal information for user registration may be information which can be utilized to extract a liking of the user such as a quantity of sound data for each kind or genre of sound data owned by the user such as rock-and-roll, jazz, Japanese music, or western music or each artist of sound data owned by the user. In the following description, the owned quantity of sound data owned by the user for each kind is referred to also as owned quantity by kind.

If personal information of the user is inputted on the personal information inputting screen by the user through the operation section 23 in a state in which the personal information inputting screen is displayed on the display section 25, then the main controlling section 20 creates user registration data in which the inputted personal information is stored.

Then, the main controlling section 20 transmits the user registration data to the information providing apparatus 13 on the network 12 successively through the communication controlling section 29 and the network interface 30.

In response to reception of the user registration data, the information providing apparatus 13 stores the personal information of the user included in the user registration data to carry out user registration of the user.

The information providing apparatus 13 thereby permits utilization of the information providing apparatus 13 by the user, that is, acquisition of various kinds of information for provision by the user.

Then, when the user registration of the user is completed, the information providing apparatus 13 sends back a registration completion notification for the notification of the completion of the user registration to the photograph image displaying apparatus 11.

When the user registration is completed and the registration completion notification data is transmitted from the information providing apparatus 13, the main controlling section 20 receives the registration completion notification data successively through the network interface 30 and the communication controlling section 29.

Then, the main controlling section 20 notifies the user of the completion of the user registration through the display section 25 and signals the user identification information and the password determined in the user registration by the user to the setting information storage section 27 so as to be stored into the setting information storage section 27.

After the user registration of the user into the information providing apparatus 13 is completed, the main controlling section 20 controls the information providing apparatus 13 to suitably update the personal information of the user.

In particular, for example, if a request for updating of personal information is issued by the user through the operation section 23, then the main controlling section 20 creates update request data in which the user identification information and the password are stored.

Then, the main controlling section 20 transmits the update request data to the information providing apparatus 13 on the network 12 successively through the communication controlling section 29 and the network interface 30.

In response to reception of the update request data, the information providing apparatus 13 discriminates the personal information of the user from the user identification information and the password in the update request data.

The information providing apparatus 13 creates personal information changing screen data in which at least part of various kinds of personal information of the discriminated user is described as changeable information, and transmits the produced personal information changing screen data to the photograph image displaying apparatus 11.

When the personal information changing screen data is transmitted from the information providing apparatus 13 in response to the transmission of the update request data, the main controlling section 20 receives the personal information changing screen data successively through the network interface 30 and the communication controlling section 29.

Then, the main controlling section 20 signals the personal information changing screen data to the display section 25 through the display controlling section 24 so that a personal information inputting screen (not shown) based on the personal information changing screen data is displayed on the display section 25.

On the personal information changing screen, an address, a telephone number, a mail address, an owned quantity for each kind of sound data and so forth are described as the changeable information.

If at least part of the changeable information is changed on the personal information inputting screen by the user through the operation section 23, then the main controlling section 20 creates personal information update data in which the unchanged information and the changed information from within the changeable information are stored together with the user identification information and the password. In the following description, the unchanged information and the changed information of the changeable information are collectively referred to also as update information.

Then, the main controlling section 20 transmits the personal information update data to the information providing apparatus 13 on the network 12 successively through the communication controlling section 29 and the network interface 30.

In response to reception of the personal information update data, the information providing apparatus 13 discriminates personal information of the user from the utilization identification information and the password from within the personal information update data.

Further, the information providing apparatus 13 replaces the changeable information in the various kinds of personal information of the discriminated user with the update information in the personal information update data to update the personal information of the user.

Further, for example, if information of the profile, diary or the like of the user is uploaded for laying-open to the public to a site on the network 12 as described hereinabove, then the main controlling section 20 detects the date and time when the information is uploaded based on the date and time at present counted by the internal clock.

In the following description, information of the profile, diary or the like of the user uploaded for laying-open to a site on the network 12 is referred to also as laid-open information, and the date and time when the laid-open information is updated is referred to also as laid-open date and time.

Further, the main controlling section 20 determines the detected laid-open date and time and the laid-open information updated thereupon as additional personal information. It is to be noted that, in the following description, the additional personal information is referred to also as additional information.

Furthermore, the main controlling section 20 creates personal information update data in which the additional information is stored together with the user identification information and the password.

Then, the main controlling section 20 transmits the personal information update data to the information providing apparatus 13 on the network 12 successively through the communication controlling section 29 and the network interface 30.

In response to reception of the personal information update data, the information providing apparatus 13 discriminates the personal information of the user from the user identification information and the password from within the personal information update data.

Then, the information providing apparatus 13 adds the additional information in the personal information update data to the various kinds of personal information of the discriminated user to update the personal information of the user.

Further, for example, if sound data is reproduced in the sound-only reproduction mode as described hereinabove, then the main controlling section 20 detects the date and time at the point of time at which the reproduction of the sound data is started based on the date and time at present counted by the internal clock. In the following description, the date and time at the point of time which reproduction of sound data is started is referred to also as reproduction date and time.

Further, the main controlling section 20 determines a reproduction history of sound data indicated by the detected date and time and attribute information such as the sound identification information, title, artist or genre corresponding to the sound data reproduced thereupon, as additional information.

Also in this instance, the main controlling section 20 produces personal information update data in which the additional information is stored together with the user identification information and the password.

Then, the information providing apparatus 13 transmits the personal information update data to the information providing apparatus 13 on the network 12 successively through the communication controlling section 29 and the network interface 30.

In response to reception of the personal information update data, the information providing apparatus 13 discriminates the personal information of the user from the user identification information and the password in the personal information update data.

Then, the information providing apparatus 13 adds the additional information in the personal information update data to the various kinds of personal information of the discriminated user to update the personal information of the user.

In this manner, also after the user is stored into user registration in the information providing apparatus 13, the main controlling section 20 can suitably update the personal information of the user.

Incidentally, in order to make it possible also for some other person (including an acquaintance) than the user to utilize the information providing apparatus 13 similarly as described above, the information providing apparatus 13 stores personal information of the person for user registration and suitably updates the personal information after such user registration.

Therefore, when the image and sound reproduction function is implemented, the main controlling section 20 receives provision of information and so forth regarding the user (including the user and an acquaintance) from the information providing apparatus 13 and creates a sound playlist utilizing the information and so forth.

If the image and sound reproduction function is actually selected by the user through the operation section 23, then the main controlling section 20 enters the image and sound reproduction mode.

Thereupon, the main controlling section 20 executes an image playlist creation process similarly as in the case of the image-only reproduction mode described hereinabove. Consequently, the main controlling section 20 controls the display section 25 to display an image selection screen and urges the user to select one or a plurality of photograph image data of a reproduction object together with the selection display time to create an image playlist 26.

After the image playlist 26 is created in this manner, the main controlling section 20 signals the image playlist 26 to the setting information storage section 27 together with selection time information representative of the selection display time so as to be stored into the setting information storage section 27.

Consequently, the main controlling section 20 carries out setting so that photograph image data are reproduced in accordance with the image playlist 26 similarly as described hereinabove.

Further, when the photograph image data of the reproduction object is reproduced in accordance with the image playlist 26, the main controlling section 20 carries out setting so that a photograph image based on the photograph image data continues to be displayed for the selection display time.

Then, the main controlling section 20 successively reads out an image file, in which the photograph image data of the reproduction object, that is, selected by the user at this time, are stored, from the image storage section 22 in accordance with the image playlist 26, and signals the read out image file to the image analysis section 34.

When the image file is received from the main controlling section 20, the image analysis section 34 executes an image analysis process. When the image analysis process is executed, the image analysis section 34 extracts photograph image data from the image file received from the main controlling section 20.

Further, the image analysis section 34 reads out face search data from the image storage section 22. Then, the image analysis section 34 searches for a supposition region in a photograph image based on the photograph image data based on the face search data.

If the image analysis section 34 detects one or a plurality of supposition regions in the photograph image, then the image analysis section 34 extracts, for each supposition region, a supposition region characteristic amount from the supposition region and creates region position information representative of the position of the supposition region in the photograph image.

Further, the image analysis section 34 associates, for each of the supposition regions detected in the photograph image, the supposition region characteristic amount and the region position information of the supposition region to create supposition region information.

After the image analysis section 34 analyzes the photograph image in this manner, it extracts header data from the image file corresponding to the photograph image.

Then, if thereupon one or a plurality of supposition regions are detected in the photograph image, then it signals the information of one or plural supposition regions to a person specification section 36 together with the header data.

On the other hand, if a supposition region is not detected in the photograph image, then the image analysis section 34 signals only the header data to the person specification section 36.

In this manner, when the image analysis process is executed, every time a photograph image is analyzed, the image analysis section 34 signals information of one or a plurality of supposition regions together with the header data or signals only the header data to the person specification section 36.

In this instance, the person specification section 36 executes an image pickup object specification process for specifying an image pickup object captured in the photograph image based on the photograph image data of the reproduction object.

When the person specification section 36 executes the image pickup object specification process, if information of one or a plurality of supposition regions is received from the image analysis section 34 together with the header data, then the person specification section 36 executes a person specification process for specifying a person as an image pickup object.

When the person specification section 36 executes the person specification process, it reads out the telephone directory data and own station data from the telephone directory storage section 33. Further, the person specification section 36 takes out all acquaintance face characteristic amounts from the telephone directory data and takes out the user face characteristic amounts from the own station data.

Then, the person specification section 36 uses the acquaintance face characteristic amounts and the user face characteristic amounts in order one by one to execute a predetermined arithmetic operation process based on the acquaintance face characteristic amount or the user face characteristic amount and a supposition region characteristic amount indicated by the supposition region information.

The person specification section 36 thereby calculates, for each supposition region, a plurality of degrees of certainty each indicative of to which degree of certainty the image pickup object captured in the supposition region has as the face of an acquaintance or the user. Further, the person specification section 36 compares the degrees of certainty calculated for each supposition region with a second threshold value selected in advance.

If one of the degrees of certainty calculated with regard to any of the supposition regions is equal to or higher than the second threshold value and the acquaintance face characteristic amount of an acquaintance is used for the calculation of the degree of certainty equal to or higher than the second threshold value, then the person specification section 36 estimates that the face captured in the supposition region is the face of the acquaintance.

Further, if one of the degrees of certainty calculated with regard to any of the supposition regions is equal to or higher than the second threshold vale and the user face characteristic amount of the user is used for the calculation of the degree of certainty equal to or higher than the second threshold value, then the person specification section 36 estimates that the face captured in the supposition region is the face of the user.

Furthermore, if a plurality of ones, that is, two or more ones, of the degrees of certainty calculated with regard to any of the supposition regions are equal to or higher than the second threshold value, then the person specification section 36 selects that one of the degrees of certainty equal to or higher than the second threshold value which exhibits the highest value.

Then, the person specification section 36 estimates the face captured in the supposition region as the face of the acquaintance or the face of the user in response to the acquaintance face characteristic amount or the user face characteristic amount used for the calculation of the highest value of the degree of certainty.

In this manner, the person specification section 36 specifies a person, that is, an acquaintance or the user, captured in a photograph image based on the face of the person captured in the photograph image.

It is to be noted that, in the following description, a photograph image in which a captured person, that is, an acquaintance or the user, is specified is particularly referred to also as specified person photograph image, and a person specified in the specified person photograph image, that is, an acquaintance or the user, is referred to also as specified person.

Thereupon, the person specification section 36 determines a supposition region in which the face of the specified person in the specified person photograph image as a face region and selects region position information indicative of the face region from within region position information indicated by information of one or a plurality of supposition regions as face region position information.

Then, the person specification section 36 uses the header data, face region position information, telephone directory data and own station data to produce such specified person lists 40A and 40B which indicate a specified person photograph image and the specified one or plural specified persons as shown in FIGS. 6A and 6B, respectively.

In this instance, the specified person lists 40A and 40B include image identification information and image pickup date and time information regarding the photograph image data of the specified person photograph image.

Further, the specified person lists 40A and 40B include a list of the name, a telephone number and a mail address of each of specified persons from which one or a plurality of specified persons such as an acquaintance and/or the user specified in the specified person photograph image and personal information of the specified person can be discriminated individually.

Incidentally, in the following description, the name, a telephone number and a mail address of a specified person from which the specified person itself or personal information of the specified person can be discriminated individually are collectively referred to also as person discrimination information.

The specified person lists 40A and 40B further include, in the person discrimination information for each specified person, a comment indicative of a relationship between the specified person and the user and face region position information indicative of the position of the face region in which the face of the specified person is captured in the specified person photograph image such that they are associated with each other.

It is to be noted that, in the following description, where there is no necessity to particularly distinguish the specified person lists 40A and 40B, which include different registered numbers of specified persons illustrated in FIGS. 6A and 6B, from each other, they are collectively referred to also as a specified person list 40 with the reference numeral 40 added.

After the person specification section 36 specifies persons, that is, acquaintances and/or the user, captured in the specified person photograph image to create the specified person list 40 in this manner, it signals the created specified person list 40 to a liking extraction section 41.

Incidentally, if all of the degrees of certainty calculated for each supposition region are lower than the second threshold value, then the person specification section 36 decides that the face of an acquaintance or the face of the user is not captured at all in the photograph image.

Thereupon, the person specification section 36 executes, subsequently to the person specification process, an image pickup object specification process for specifying an image pickup object other than a person such as a building, a display item or a landscape in a foreign country or in an own country as an image pickup object.

The image storage section 22 has stored therein in advance object specification use data to be used for the specification of an image pickup object captured in a photograph image.

In this instance, the object specification use data includes location information indicative of a location, for example, of a plurality of image pickup objects, indicated by a latitude and an altitude.

The object specification use data further includes place name information indicative of a place name of the location for each image pickup object in an associated relationship with location information indicative of the location of the image pickup object.

The object specification use data further includes image pickup object name information indicative of the name, also called image pickup object name, for each image pickup object in an associated relationship with the location information indicative of the location of the image pickup object.

When the person specification section 36 executes the image pickup object specification process, it reads out object specification use data from the image storage section 22. Further, the person specification section 36 extracts camera position information and image pickup direction information as attribute information from the header data received from the image analysis section 34.

Further, the person specification section 36 specifies one or a plurality of image pickup objects captured in the photograph image based on the camera position information and image pickup direction information and the object specification use data.

It is to be noted that, in the following description, a photograph image in which a specified image pickup object is captured is referred to also as specified object photograph image, and an image pickup object specified in the specified object photograph image is referred to also as specified image pickup object.

Figure 7:
FIG. 7 is a view illustrating a configuration of a specified object list.

Thus, the person specification section 36 uses the header data and the object specification use data to create such a specified object list 42 which indicates a specified object photograph image and one or a plurality of specified image pickup objects as illustrated in FIG. 7.

In this instance, the specified object list 42 includes image identification information and image pickup date and time information relating to the photograph image data of the specified object photograph image.

Further, the specified object list 42 includes an image pickup object name for each of specified image pickup objects capable of discriminating one or a plurality of specified image pickup objects and a place name of the location of the specified image pickup object in an associated relationship with each other.

After the person specification section 36 creates the specified object list 42 indicative of specified object photograph images and one or a plurality of specified image pickup objects, it signals the created specified object list 42 to the liking extraction section 41.

If only header data is received from the image analysis section 34, then the person specification section 36 executes only the image pickup object specification process without executing the person specification process.

In this instance, the person specification section 36 carries out processing similar to that described hereinabove to create a specified object list 42 and signals the created specified object list 42 to the liking extraction section 41.

In this manner, when the person specification section 36 executes the image pickup object specification process, every time header data and supposition region information or only header data is supplied thereto from the image analysis section 34, the person specification section 36 creates a specified person list 40 or a specified object list 42 and signals the created specified person list 40 or specified object list 42 to the liking extraction section 41.

Thereupon, the liking extraction section 41 executes a liking extraction process of extracting a liking of a specified person specified in the specified person photograph image.

When the liking extraction section 41 executes the liking extraction process, if the specified person list 40 is supplied thereto from the person specification section 36, then the liking extraction section 41 decides whether the number of specified persons registered in the specified person list 40 is one or two or more, that is, one or a plural number.

If only one specified person is registered in the specified person list 40A, then the liking extraction section 41 extracts the person discrimination information of the specified person, that is, an acquaintance or the user captured in the specified person photograph image, from the specified person list 40A.

The liking extraction section 41 creates person information request data having the person discrimination information stored therein and used to request for different personal information for provision other than at least the user identification information and the password from within the various kinds of personal information of the specified person. The different personal information for the provision is hereinafter referred to also as provision person information. Then, the liking extraction section 41 signals the person information request data to the main controlling section 20.

When the person information request data is received from the liking extraction section 41, the main controlling section 20 transmits the person information request data to the information providing apparatus 13 on the network 12 successively through the communication controlling section 29 and the network interface 30.

When the person information request data is received, the information providing apparatus 13 discriminates personal information of the specified person from the person discrimination information in the person information request data and creates provision person information data in which the provision person information from within the discriminated personal information is stored. Then, the information providing apparatus 13 transmits the provision person information data to the photograph image displaying apparatus 11.

Thereupon, the main controlling section 20 receives the provision person information data transmitted from the information providing apparatus 13 successively through the network interface 30 and the communication controlling section 29 and then signals the received provision person information data to the liking extraction section 41.

Then, the liking extraction section 41 extracts provision person information indicative of the owned number by kind for each kind of sound data as provision person information of the specified person, who is one specified person registered in the specified person list 40A, from the provision person information data.

The liking extraction section 41 thereby extracts a kind which exhibits the highest owned number by kind from among a plurality of kinds, for example, from among genres, of sound data as a liking with regard to sound of the specified person registered in the specified person list 40A.

Further, as shown in FIG. 8, the liking extraction section 41 creates an added liking person list 43A which includes, in addition to the specified person list 40A, liking information indicative of a liking of the specified person in an associated relationship with the person discrimination information of the specified person.

Then, the liking extraction section 41 signals the added liking person list 43A to a searching section 45 together with the provision person information data.

On the other hand, if two or more specified persons are registered in the specified person list 40B, then the liking extraction section 41 extracts person discrimination information of each of the plural specified persons, that is, acquaintances and the user captured in the specified person photograph image, from the specified person list 40B.

Then, the liking extraction section 41 creates person information request data in which the person discrimination information of the plural specified persons is stored and signals the person information request data to the main controlling section 20.

When the person information request data is received from the liking extraction section 41, the main controlling section 20 transmits the person information request data to the information providing apparatus 13 on the network 12 successively through the communication controlling section 29 and the network interface 30.

When the information providing apparatus 13 receives the person information request data, it uses the owned numbers by kind of sound data as personal information with regard to all users including the user and acquaintances who are registered till the present point of time to calculate an average value of the owned number by kind for each kind of the sound data.

Incidentally, in the following description, an average value of the owned number by kind calculated for each kind of the sound data using the owned numbers by kind of the sound data over all users who are registered as users is referred to also as an overall average owned number by kind.

Further, the information providing apparatus 13 decides personal information of each of the plural specified persons from a plurality of pieces of person discrimination information in the person information request data.

Further, the information providing apparatus 13 creates provision person information data in which provision person information from within personal information of a specified person is stored for a plural number of specified persons and also all average owned number information by kind indicative of the all average owned number by kind for each of the kinds of sound data is stored. Then, the information providing apparatus 13 transmits the provision person information data to the photograph image displaying apparatus 11.

Thus, the main controlling section 20 receives the provision person information data transmitted from the information providing apparatus 13 successively through the network interface 30 and the communication controlling section 29 and signals the received provision person information data to the liking extraction section 41.

The liking extraction section 41 extracts the provision person information indicative of the owned number by kind for each kind of sound data as the provision person information for each of the specified persons, that is, a plurality of specified persons registered in the specified person list 40B, from the provision person information data.

However, if two or more specified persons are registered in the specified person list 40B, then the liking extraction section 41 reads out selection time information stored together with the image playlist 26 from the setting information storage section 27 as information indicative of a situation at present of the photograph image displaying apparatus 11.

In particular, the liking extraction section 41 reads out the selection time information stored in the setting information storage section 27 for setting display time when a photograph image is to be displayed in accordance with the image playlist 26 from the setting information storage section 27 as information indicative of a situation at present of the photograph image displaying apparatus 11.

Then, the liking extraction section 41 compares selection display time indicated by the selection time information with a fourth threshold value which represents predetermined time selected in advance, for example, with such a reference that a plurality of sound data such as ten or more sound data can be reproduced continuously.

Then, if the selection display time is equal to or longer than the fourth threshold value and is comparatively long, then the liking extraction section 41 extracts, for each of the specified persons registered in the specified person list 40B, that one of the kinds of the sound data such as a genre which exhibits the highest owned number by kind as a liking with regard to the sound of the specified person.

Then, the liking extraction section 41 creates an added liking person list 43B wherein liking information indicative of a liking of each of the specified persons is added in an associated relationship with the person discrimination information of the specified person to the specified person list 40B as illustrated in FIG. 9.

Then, the liking extraction section 41 signals the added liking person list 43B to the searching section 45 together with the provision person information data.

On the other hand, if the selection display time is shorter than the fourth threshold valve and is comparatively short, then the liking extraction section 41 extracts all average owned number information by kind from the provision person information data.

Further, the liking extraction section 41 regards a plurality of specified persons registered in the specified person list 40B as one group. Furthermore, the liking extraction section 41 uses the owned number by kind of the plural specified persons for each of the kinds of the sound data to calculate an average value of the owned number by kind for each of the kinds of the sound data in the group.

Incidentally, in the following description, an average value of the owned number by kind calculated for each kind of the sound data in a group of a plurality of specified persons registered in the specified person list 40B is referred to also as a group average owned number by kind.

Then, the liking extraction section 41 compares, for each kind of the sound data, the group average owned number by kind and all average owned number by kind with each other to detect whether or not the plural kinds of sound data include a kind with regard to which the group average owned number by kind is equal to or greater than the all average owned number by kind.

If the plural kinds of sound data include a kind with regard to which the group average owned number by kind is equal to or greater than the all average owned number by kind, then the liking extraction section 41 extracts, from among the plural kinds of sound data, one or a plurality of kinds with regard to which the group average owned number by kind is equal to or greater than all average owned number by kind as a liking of the group of the plural specified persons with regard to the sound.

In particular, the liking extraction section 41 extracts, from among the plural kinds of sound data, one or a plurality of kinds with regard to which the group average owned number by kind is equal to or greater than the all average owned number by kind as a liking common to the plural specified persons registered in the specified person list 40B.

Further, the liking extraction section 41 creates an added liking person list 43C wherein liking information indicative of one or a plurality of common likings of the plural specified persons is added in an associated relationship with the person discrimination information of the plural specified persons to the specified person list 40B as illustrated in FIG. 10. Then, the liking extraction section 41 signals the added liking person list 43C to the searching section 45 together with the provision person information data.

However, if the group average owned number by kind is smaller than the all average owned number by kind with regard to any kinds of sound data, then the liking extraction section 41 extracts a liking for each of the specified persons registered in the specified person list 40B similarly as described above.

Then, the liking extraction section 41 creates an added liking person list 43B described hereinabove with reference to FIG. 9 and signals the created added liking person list 43B to the searching section 45 together with the provision person information data.

It is to be noted that, in the following description, in the case where there is no necessity to particularly distinguish the added liking person lists 43A to 43C which are different in the registration person number or the manner of association of liking information with the person discrimination information from one another illustrated in FIGS. 8 to 10, they are referred to collectively as added liking person list 43 with reference numeral 43 added.

Incidentally, if a specified object list 42 is received from the person specification section 36, then the liking extraction section 41 signals the specified object list 42 as it is to the searching section 45.

Thereupon, the searching section 45 executes a search condition list creation process for creating a search condition list which is used for the search of sound data.

When the searching section 45 executes the search condition list creation process, it creates present information request data for requesting for present information representative of a situation at present grasped by the information providing apparatus 13. Then, the searching section 45 signals the present information request data to the main controlling section 20.

When the present information request data is received from the searching section 45, the main controlling section 20 transmits the present information request data to the information providing apparatus 13 on the network 12 successively through the communication controlling section 29 and the network interface 30.

When the present information request data is received, the information providing apparatus 13 creates present information provision data in which the present information is stored.

Then, the information providing apparatus 13 signals the present information provision data to the photograph image displaying apparatus 11.

The present information here may include, for example, present date and time information indicative of the date and time at present. Further, the present information may include, for example, present weather information which indicates an address registered by user registration by the user and a weather at present in the proximity of the address of the user in an associated relationship with each other under the assumption that the photograph image displaying apparatus 11 is used at the address.

Further, the present information may include, for example, ranking information indicative of ranking of a predetermined number of comparatively great distribution numbers regarding sound data of a distribution object distributed by the information providing apparatus 13.

The ranking information is created by associating the sound identification information of sound data or attribute information such as the title, artist or genre with the ranks of the sound data.

Further, the present information may include, for example, recommendation information which indicates sound data recommended (or advertised) at present from among sound data of a distribution object to be distributed by the information providing apparatus 13 in terms of the sound identification information of the sound data or attribute information such as the title, artist or genre.

Thereupon, the main controlling section 20 receives the present information provision data transmitted from the information providing apparatus 13 successively through the network interface 30 and the communication controlling section 29 and signals the received present information provision data to the searching section 45.

Consequently, the searching section 45 acquires the present information provision data from the information providing apparatus 13 through the main controlling section 20. If, in this state, an added liking person list 43 and provision person information data are supplied from the liking extraction section 41, then the searching section 45 uses the received information and the present information provision data to create a search condition list indicative of search conditions of sound data to be reproduced during display of a specified person photograph image.

However, in the setting information storage section 27, a list creation template in which only a plurality of items of search conditions are described in advance for creation of a search condition list, for example, in the case where a specified person is specified but no particular search condition is described is stored.

Therefore, when present information provision data is received from the main controlling section 20, the searching section 45 reads out the list creation template from the setting information storage section 27.

Then, the searching section 45 registers search conditions corresponding to the condition items into the list creation template based on the provision person information data and the present information provision data to create a search condition list.

Here, creation of a search condition list 46A when, for example, the added liking person list 43A described hereinabove with reference to FIG. 8 in which only one specified person is registered is supplied from the liking extraction section 41 to the searching section 45 is described particularly with reference to FIG. 11.

The searching section 45 first extracts liking information of the specified person as a search condition from the added liking person list 43A and registers the liking information in an associated relationship with a condition item denoted as "liking" into the list creation template.

Further, the searching section 45 decides, for example, whether or not ranking information of sound data is included in the present information provision data.

If ranking information is included in the present information provision data, then the searching section 45 registers a flag indicating that the ranking information is used as a search condition into the list creation template in an associated relationship with a condition item of "ranking."

Further, the searching section 45 decides, for example, whether or not recommendation information is included in the present information provision data. If recommendation information is included in the present information provision data, then the searching section 45 registers a flag indicating that the recommendation information is used as a search condition into the list creation template in an associated relationship with a condition item of "recommendation."

It is to be noted that, in the following description, the flag indicating that the ranking information is used as a search condition is referred to also as a ranking use flag, and the flag indicating that the recommendation information is used as a search condition is referred to also as a recommendation use flag.

Further, the searching section 45 takes out, for example, the present date and time information from the present information provision data and takes out the image pickup date and time information from the added liking person list 43A. Further, the searching section 45 calculates elapsed time from the image pickup date and time to the present date and time based on the present date and time information and the image pickup date and time information.

Furthermore, the searching section 45 determines a reference period for referring to a reproduction history of sound data before and after the image pickup date and time as a search condition based on the elapsed time.

Then, the searching section 45 registers the determined reference period in an associated relationship with a condition item denoted as "reference period" into the list creation template.

Incidentally, in the case where additional information representative of laid-open information and laid-open date and time is added to the personal information of the user as described hereinabove, the information providing apparatus 13 extracts such one or a plurality of keywords that may represent the substance of the laid-open information.

It is to be noted that, in the following description, such a keyword extracted from laid-open information as representing the substance of the laid-open information is referred to also as a laid-open substance keyword.

Then, the information providing apparatus 13 determines also the one or plural laid-open substance keywords extracted from the laid-open information as additional information to the personal information of the user and adds the laid-open substance keywords to the personal information of the user in an associated relationship with the laid-open information and the laid-open date and time.

Therefore, the searching section 45 decides whether or not provision person information indicative of one or a plurality of laid-open substance keywords extracted from laid-open information is included in the provision person information data.

If provision person information indicative of one or a plurality of laid-open substance keywords extracted from laid-open information is included in the provision person information data, then the searching section 45 extracts the provision person information indicative of the one or plural laid-open substance keywords as a search condition.

Then, the searching section 45 registers the one or plural laid-open substance keywords indicated by the provision person information in an associated relationship with a condition item of "laid-open information" into the list creation template.

Further, the setting information storage section 27 stores in advance, for example, a keyword list in which a plurality of keywords representative of a season or a plurality of keywords representative of an impression of the season are stored in an associated relationship with various seasons of a year together with dates included in the seasons.

It is to be noted that, in the following description, a plurality of keywords representative of a season and a plurality of keywords representative of impressions of the season are collectively referred to also as season keywords, and a keyword list of the season keywords is referred to also as a season keyword list.

The setting information storage section 27 stores in advance, for example, also a keyword list in which a plurality of keywords representative of a period or a plurality of keywords representative of events held within the period or on a particulate date within the period are stored in an associated relationship with various periods of a year together with dates included in the periods.

Incidentally, in such keyword lists, also a plurality of keywords representative of impressions of events held within a period or on a particular date within the period are included in an associated relationship with various periods of a year.

It is to be noted that, in the following description, a plurality of keywords representative of events and a plurality of keywords representative of impressions of the events are collectively referred to also as event keywords, and a keyword list of the event keywords is referred to also as an event keyword list.

Further, in the following description, a period within which various events indicated by event keywords are carried out is referred to also as an event.

Furthermore, the setting information storage section 27 stores in advance also a keyword list created by associating, for example, with various time zones such as morning, daytime, evening, night, midnight, daybreak and so forth, a plurality of keywords representative of the time zones.

Incidentally, such keyword lists as described above include also a plurality of keywords representative of impressions of various time zones of one day in an associated relationship with the time zones.

It is to be noted that, in the following description, a plurality of keywords representative of time zones and a plurality of keywords representative of impressions of the time zones are collectively referred to also as time zone keywords, and a keyword list of the time zone keywords is referred to also as time zone keyword list.

Further, the setting information storage section 27 stores in advance therein, for example, also a keyword list created by associating, with various weathers such as fine weather, rain, cloudy weather and snow, a plurality of keywords representative of the weathers or a plurality of keywords representative of impressions of the weathers.

It is to be noted that, in the following description, a plurality of keywords representative of weathers and a plurality of keywords representative of impressions of the weathers are collectively referred to also as weather keywords, and a keyword list of the weather keywords is referred to also as weather keyword list.

Furthermore, the setting information storage section 27 stores in advance therein, for example, also a keyword list created by listing up a plurality of keywords representative of birthdays or a plurality of keywords representative of impressions of the birthdays.

It is to be noted that, in the following description, a plurality of keywords representative of birthdays and a plurality of keywords representative of impressions of the birthdays are collectively referred to also as birthday keywords, and a keyword list of the birthday keywords is referred to also as a birthday keyword list.

Further, the setting information storage section 27 stores in advance therein, for example, also a keyword list created by associating, with various relationships of the user with a specified person such as the user, a sweetheart, or a fellow member of a circle, a plurality of keywords representative of the relationships and a plurality of keywords representative of impressions of the relationships.

It is to be noted that, in the following description, a plurality of keywords representative of relationships and a plurality of keywords representative of impressions of the relationships are collectively referred to also as relationship keywords, and a keyword list of the relationship keywords is referred to also as relationship keyword list.

Therefore, if present date and time information is taken out from the present information provision data, then the searching section 45 reads out the season keyword list from the setting information storage section 27.

Further, the searching section 45 compares the various seasons registered in the season keyword list with the present date and time indicated by the present date and time information to detect the season at present, that is, the season which includes the present date and time.

Further, the searching section 45 detects a plurality of season keywords corresponding to the present season from the season keywords as a search condition.

Then, the searching section 45 registers the plural season keywords corresponding to the present season in an associated relationship with a condition item of "present season" into the list creation template.

Further, the searching section 45 thereupon reads out the event keyword list from the setting information storage section 27. Furthermore, the searching section 45 compares the various event periods registered in the event keyword list with the present date and time to detect an event period at present, that is, an event period which includes the present date and time.

Furthermore, the searching section 45 detects a plurality of event keywords corresponding to the present event period as a search condition from the event keywords.

Then, the searching section 45 registers the plural event keywords corresponding to the present event period in an associated relationship with a condition item of "present event period" into the list creation template.

Further, the searching section 45 reads out the time zone keyword list from the setting information storage section 27. Furthermore, the searching section 45 compares the plural time zones registered in the time zone keyword list with the present date and time to detect a time zone at present, that is, a time zone which includes the present date and time.

Further, the searching section 45 extracts a plurality of time zone keywords corresponding to the present time zone as a search condition from the time zone keyword list.

Then, the searching section 45 registers the plural time zone keywords corresponding to the present time zone in an associated relationship with a condition item of "present time zone" into the list creation template.

Further, the searching section 45 takes out the present weather information from the present information provision data and reads out the weather keyword list from the setting information storage section 27.

Further, the searching section 45 takes out, based on the present weather indicated by the present weather information, a plurality of weather keywords corresponding to the present weather as a search condition from the weather keyword list.

Then, the searching section 45 registers the plural weather keywords corresponding to the present weather in an associated relationship with a condition item of "present weather" into the list creation template.

Furthermore, the searching section 45 takes out the provision person information representative of the date of birth of the specified person from the provision person information data. Further, the searching section 45 compares the date of birth indicated by the provision person information with the present date and time to decide whether or not this day is the birthday of the specified person.

If this day is the birthday of the specified person, then the searching section 45 reads out a plurality of birthday keywords indicated by the birthday keyword list as a search condition from the setting information storage section 27.

Then, the searching section 45 registers the plural birthday keywords in an associated relationship with a condition item of "birthday" into the list creation template.

Furthermore, the searching section 45 decides, based on the comment registered in the added liking person list 43A, whether or not the specified person registered in the added liking person list 43A is any other person than the user.

If the specified person is any other person than the user, then the searching section 45 takes out the provision person information indicative of the address of the specified person from the provision person information data.

Further, the searching section 45 compares the address of the specified person indicated by the provision person information with the address of the user indicated by the present weather information taken out from the present information provision data.

If the address of the specified person and the address of the user, that is, the addresses of the two, belong to different prefectures, then the searching section 45 registers the names of the prefectures of the two persons as a search condition in an associated relationship with a condition item of "address" into the list creation template.

Furthermore, the searching section 45 reads out the relationship keyword list from the setting information storage section 27. The searching section 45 takes out, based on the comment registered in the added liking person list 43A, a plurality of relationship keywords corresponding to the relationship between the user and the specified person as a search condition from the relationship keyword list.

Then, the searching section 45 registers the plural relationship keywords corresponding to the relationship between the user and the specified person in an associated relationship with a condition item of "relationship" into the list creation template.

In this manner, the searching section 45 registers the search conditions of the condition items of "liking," "reference period," "present season," "present event period," "present time zone," "present weather" and "relationship" without fail into the list creation template.

Further, the searching section 45 suitably registers search conditions of condition items of "ranking," "recommendation," "laid-open information," "birthday" and "address" into the list creation template.

Then, the searching section 45 creates a search condition list 46A as a list creation template in which the various search conditions are registered by registering the various search conditions into the list creation template.

Consequently, the searching section 45 sets search conditions of condition items including at least the condition items of "liking," "reference period," "present season," "present event period," "present time zone," "present weather" and "relationship" which are used for search of sound data by the search condition list 46A.

Incidentally, if the added liking person list 43B described hereinabove with reference to FIG. 9 in which likings of a plurality of specified persons are registered is supplied from the liking extraction section 41, then the searching section 45 creates a number of search condition lists 46A of a configuration similar to that described hereinabove equal to the number of the specified persons.

In other words, the searching section 45 creates, for each of the specified persons, a search condition list 46A for searching for sound data conforming to the liking of the specified person.

Further, if the added liking person list 43C illustrated in FIG. 10 in which a liking common to a plurality of specified persons is registered is supplied from the liking extraction section 41, then the searching section 45 creates such one search condition list 46B as illustrated in FIG. 12 which has a basically similar configuration to that described hereinabove.

In particular, the searching section 45 extracts information of one or a plurality of likings common to a plurality of specified persons from the added liking person list 43C and registers the information of the one or plural likings in an associated relationship with the condition item of "liking" into the list creation template.

Further, the searching section 45 thereupon carries out similar processing to that described hereinabove also for the condition items of "reference period," "present season," "present event period," "present time zone," "present weather" and "relationship" and registers the search conditions into the list creation template.

Then, with regard to the condition items of "ranking," "recommendation," "laid-open information," "birthday" and "address" in the list creation template, the searching section 45 executes processing similar to that described hereinabove and suitably registers the search conditions.

However, as regards the search conditions of "laid-open information," "address" and "relationship" in the list creation template, the searching section 45 executes processing similar to that described hereinabove by a number of times equal to the number of the specified persons and registers the search conditions detected for the number of specified persons.

Further, as regards the condition item of "birthday" in the list creation template, the searching section 45 compares the birthdays of the plural specified persons with the present date and time. Then, if this day is a birthday of at least one of the specified persons, then the searching section 45 registers the plural birthday keywords.

In this manner, in the case where a liking common to a plurality of specified persons is extracted, the searching section 45 creates one search condition list 46B for searching for sound data conforming to the liking common to the plural specified persons.

Further, if the specified object list 42 is supplied from the liking extraction section 41, then the searching section 45 uses the present information provision data together with the specified object list 42 to create such one search condition list 46C indicative of search conditions for sound data to be reproduced during display of the specified object photograph image as illustrated in FIG. 13.

Actually, in the setting information storage section 27, the list creation template in which only a plurality of items of different search conditions are described in advance for creation of a search condition list, for example, in the case where an image pickup object is specified but no particular search condition is described is stored.

Therefore, the searching section 45 thereupon reads out the list creation template from the setting information storage section 27. Further, the searching section 45 takes out one or a plurality of image pickup object names as a search condition from the specified object list 42.

Then, the searching section 45 registers the one or plural image pickup object names in an associated relationship with a condition item of "image pickup object" into the list creation template.

Further, the searching section 45 takes out the place name of a location of the image pickup object as a search condition from the specified object list 42. Then, the searching section 45 registers the place name in an associated relationship with a condition item of "place name" into the list creation template.

Furthermore, if ranking information of the sound data is included in the present information provision data similarly as in the foregoing description, then the searching section 45 registers a ranking use flag in an associated relationship with a condition item of "ranking" into the list creation template.

Further, if recommendation information is included in the present information provision data similarly as in the foregoing description, then the searching section 45 registers a recommendation use flag in an associated relationship with a condition item of "recommendation" into the list creation template.

Furthermore, the searching section 45 determines a reference period for referring to a reproduction history of sound data before and after the image pickup date and time as a search condition similarly as in the foregoing description.

Then, the searching section 45 registers the determined reference period in an associated relationship with a condition item of "reference period" into the list creation template.

Further, the searching section 45 detects a season at present based on the present date and time and the season keyword list similarly as in the foregoing description. Furthermore, the searching section 45 takes out a plurality of season keywords corresponding to the present season as a search condition from the season keyword list.

Then, the searching section 45 registers the plural season keywords corresponding to the present season in an associated relationship with a condition item of "present season" into the list creation template.

Further, the searching section 45 detects an event period at present based on the present date and time and the event keyword list similarly as in the foregoing description.

Furthermore, the searching section 45 takes out a plurality of event keywords corresponding to the present event period as a search condition from the event keyword list.

Then, the searching section 45 registers the plural event keywords corresponding to the present event period in an associated relationship with a condition item of "present event period" into the list creation template.

Further, the searching section 45 detects a time zone at present based on the present date and time and the time zone keyword list similarly as in the foregoing description.

Furthermore, the searching section 45 takes out a plurality of time zone keywords corresponding to the present time zone as a search condition from the time zone keyword list.

Then, the searching section 45 registers the plural time zone keywords corresponding to the present time zone in an associated relationship with a condition item of "present time zone" into the list creation template.

Furthermore, the searching section 45 detects a weather at present similarly as described hereinabove and takes out a plurality of weather keywords corresponding to the present weather as a search condition from the weather keyword list.

Then, the searching section 45 registers the plural weather keywords corresponding to the present weather in an associated relationship with a condition item of "present weather" into the list creation template.

In this manner, the searching section 45 registers search conditions of the condition items of "image pickup object," "place name," "reference period," "present season," "present event period," "present time zone" and "present weather" without fail into the list creation template.

Further, the searching section 45 suitably registers search conditions of the condition items of "ranking" and "recommendation" into the list creation template.

Then, the searching section 45 creates a search condition list 46C as a list creation template into which the various search conditions are registered by registering the various search conditions into the list creation template in this manner.

Consequently, the searching section 45 sets search conditions of condition items including at least the condition items of "image pickup object," "place name," "reference period," "present season," "present event period," "present time zone" and "present weather" which are used for search of sound data by the search condition list 46C.

It is to be noted that, in the following description, where there is no necessity to particularly distinguish the search condition lists 46A to 46C described hereinabove with reference to FIGS. 11 to 13, they are collectively referred to also as a search condition list 46 with the reference numeral 46 added.

After the searching section 45 produces the search condition list 46 for searching for sound data in this manner, it subsequently executes a searching process.

When the searching process is executed, the searching section 45 creates attribute information request data for requesting for attribute information of a plurality of sound data to the information providing apparatus 13. Then, the searching section 45 signals the attribute information request data to the main controlling section 20.

When the attribute information request data is received from the searching section 45, the main controlling section 20 transmits the attribute information request data to the information providing apparatus 13 on the network 12 successively through the communication controlling section 29 and the network interface 30.

When the attribute information request data is received, the information providing apparatus 13 creates attribute information provision data in which attribute information of the plural sound data is stored. Then, the information providing apparatus 13 transmits the attribute information provision data to the photograph image displaying apparatus 11.

The attribute information of sound data here includes, for example, sound identification information of the sound data, a title, an artist, a genre, a year of release and reproduction time.

The attribute information of sound data may further include, for example, a keyword extracted from the title of sound data or words of sound such as lyrics, speech or statement reading by the information providing apparatus 13 as hereinafter described. Such a keyword as just described is hereinafter referred to also as a sound substance keyword.

Furthermore, as the attribute information of sound data, for example, also a keyword representative of an impression of sound obtained by an analysis of sound data by the information providing apparatus 13 as hereinafter described is available. The keyword just described is hereinafter referred to sometimes as sound impression keyword.

Thereupon, the main controlling section 20 receives the attribute information provision data transmitted from the information providing apparatus 13 successively through the network interface 30 and the communication controlling section 29 and then signals the received attribute information provision data to the searching section 45.

When the attribute information provision data is received from the main controlling section 20, the searching section 45 takes out all attribute information from the attribute information provision data.

Then, the searching section 45 executes a first stage searching process of using a particular search condition registered in the search condition list 46 together with a plurality of pieces of attribute information to actually search for sound data.

Consequently, the searching section 45 searches out a plurality of sound data satisfying the particular search condition as corresponding attribute information from among the plural sound data.

Subsequently, the searching section 45 executes a second stage searching process using a different search condition than the particular search condition from among the search conditions registered in the search condition list 46 together with the plural pieces of attribute information searched out by the first stage searching process.

Consequently, the searching section 45 searches out, from among a plurality of sound data searched out in the first stage searching process, one or a plurality of sound data which satisfies the different search condition in such a manner as to narrow down them to one or a plurality of sound data satisfying the different search condition as corresponding attribute information.

It is to be noted that, in the following description, sound data searched out by the first stage searching process and/or the second stage searching process is sometimes referred to also as searched-out sound data.

Here, the first stage searching process and the second stage searching process executed successively by the searching section 45 using the search condition list 46 are described particularly.

First, a case is described in which the searching section 45 successively executes the first stage searching process and the second stage searching process using the search condition lists 46A and 46B described hereinabove with reference to FIGS. 11 and 12 each of which is created in response to one specified person photograph image in which one or a plurality of specified persons are specified.

In this instance, when the first stage searching process is executed, the searching section 45 determines the liking information in the search condition lists 46A and 46B as a particular search condition.

Therefore, the searching section 45 searches for attribute information including a genre or an artist which coincides with one piece of liking information or at least one of a plurality of pieces of liking information registered in the search condition lists 46A and 46B from among a plurality of pieces of attribute information.

Consequently, the searching section 45 searches for a plurality of searched-out sound data conforming to the liking of one or a plurality of specified persons from among the plural sound data.

When the searching section 45 executes the second stage searching process, it uses the ranking use flag, recommendation use flag, reference period, laid-open substance keyword, season keyword and event keyword in the search condition lists 46A and 46B as a different search condition.

Thereupon, the searching section 45 uses also the time zone keyword, weather keyword, birthday keyword, prefecture name and relationship keyword in the search condition lists 46A and 46B as a different search condition.

Thus, the searching section 45 decides whether or not the ranking use flag is registered in the search condition lists 46A and 46B.

If the ranking use flag is used in the search condition lists 46A and 46B, then the searching section 45 searches the attribute information of the plural searched-out sound data for attribute information of sound data indicated by the ranking information in the present information provision data.

Consequently, the searching section 45 suitably searches the plural searched-out sound data so as to narrow down them to one or a plurality of searched-out sound data indicated by the ranking information.

Further, the searching section 45 decides whether or not the recommendation use flag is registered in the search condition lists 46A and 46B. If the recommendation use flag is registered in the search condition lists 46A and 46B, then the searching section 45 searches the attribute information of the plural searched-out sound data for attribute information of sound data indicated by the recommendation information in the present information provision data.

Consequently, the searching section 45 suitably searches the plural searched-out sound data to narrow down them to one or a plurality of searched-out sound data indicated by the recommendation information.

Furthermore, the searching section 45 decides based on the reference time registered in the search condition lists 46A and 46B whether or not the reproduction history within the reference period regarding one or plural specified persons is included in the provision person information data.

If the reproduction history within the reference period regarding one or plural specified persons is included in the provision person information data, then the searching section 45 searches the attribute information of the plural searched-out sound data for attribute information of sound data indicated by the one or plural reproduction histories within the reference period.

Consequently, the searching section 45 searches the plural searched-out sound data to suitably narrow down them to one or plural searched-out sound data indicated by the one or plural reproduction histories within the search period.

Further, the searching section 45 decides whether or not one or a plurality of laid-open substance keywords are registered in the search condition lists 46A and 46B.

If one or a plurality of laid-open substance keywords are registered in the search condition lists 46A and 46B, then the searching section 45 searches the attribute information of the plural searched-out sound data for attribute information including a sound substance keyword or a sound impression keyword which coincides with any of the laid-open substance keywords.

Consequently, the searching section 45 searches the plural searched-out sound data to suitably narrow down them to one or a plurality of searched-out sound data conforming to the substance of the laid-open information.

Further, the searching section 45 searches, based on the plural season keywords registered in the search condition lists 46A and 46B, the attribute information of the plural searched-out sound data for attribute information including a sound substance keyword or a sound impression keyword coincident with the season keywords.

Consequently, the searching section 45 searches the plural searched-out sound data to suitably narrow down them to one or a plurality of searched-out sound data conforming to the present season.

Further, the searching section 45 searches, based on the plural event keywords registered in the search condition lists 46A and 46B, the attribute information of the plural searched-out sound data for attribute information which includes a sound substance keyword or a sound impression keyword which coincides with the event keyword.

Consequently, the searching section 45 searches the plural searched-out sound data to suitably narrow down them to one or a plurality of searched-out sound data conforming to the present event period.

Furthermore, the searching section 45 searches, based on the plural time zone keywords registered in the search condition lists 46A and 46B, the attribute information of the plural searched-out sound data for attribute information which includes a sound substance keyword or a sound impression keyword which coincides with the time zone keywords.

Consequently, the searching section 45 searches the plural searched-out sound data to suitably narrow down them to one or a plurality of searched-out sound data conforming to the present time zone.

Further, the searching section 45 searches, based on the plural weather keywords registered in the search condition lists 46A and 46B, the attribute information of the plural searched-out sound data for attribute information which includes a sound substance keyword or a sound impression keyword which coincides with the weather keywords.

Consequently, the searching section 45 searches the plural searched-out sound data to suitably narrow down them to one or a plurality of searched-out sound data conforming to the present weather.

Furthermore, the searching section 45 decides whether or not a plurality of birthday keywords are registered in the search condition lists 46A and 46B.

If a plurality of birthday keywords are registered in the search condition lists 46A and 46B, then the searching section 45 searches the plural searched-out sound data for attribute information including a sound substance keyword or a sound impression keyword coincident with the birthday keyword.

Consequently, the searching section 45 searches the plural searched-out sound data to suitably narrow down them to one or a plurality of searched-out sound data conforming to the birthday.

Furthermore, the searching section 45 decides whether or not a plurality of names of different prefectures are registered in the search condition lists 46A and 46B.

If a plurality of names of different prefectures are registered in the search condition lists 46A and 46B, then the searching section 45 searches the attribute information of the plural searched-out sound data for attribute information including a sound substance keyword or a sound impression keyword coincident with the names of the prefectures.

Consequently, the searching section 45 searches the plural searched-out sound data to suitably narrow down them to one or a plurality of searched-out sound data conforming to the user and the specified persons or to that the plural specified persons live at remote places.

Further, the searching section 45 searches, based on a plurality of relationship keywords registered in the search condition lists 46A and 46B, the attribute information of the plural searched-out sound data for attribute information including a sound substance keyword or a sound impression keyword coincident with the relationship keywords.

Consequently, the searching section 45 searches the plural searched-out sound data to suitably narrow down them to one or a plurality of searched-out sound data conforming to the relationships.

In this manner, the searching section 45 executes the first stage searching process to search for a plurality of searched-out sound data conforming to likings of one or a plurality of specified persons.

The searching section 45 subsequently executes the second stage searching process to search a plurality of searched-out sound data conforming to the likings of the one or plural specified persons to suitably narrow down them to one or a plurality of searched-out sound data conforming to other search conditions.

In particular, if the searching section 45 can execute the second stage searching process to search out one or a plurality of searched-out sound data satisfying the different search conditions, then it determines the searched out one or plural searched-out sound data as a final search result.

Incidentally, if, when a plurality of searched-out sound data are narrowed down with the different search conditions, two or more other search conditions conform to the same searched-out sound data, then the searching section 45 searches out the same searched-out sound data avoiding overlapping while grasping the two or more different search conditions conforming to this.

On the other hand, even if the second stage searching process is executed, if any searched-out sound data conforming to the different search conditions cannot be searched out at all, then the searching section 45 determines the plural searched-out sound data searched out by the first stage searching process as a final search result.

Then, if the searching section 45 searches out one or a plurality of searched-out sound data in this manner, then it uses the added liking person list 43 and the search condition lists 46A and 46B together with the attribute information of the one or plural searched-out sound data to create a searched-out sound list indicative of the searched-out sound data.

Here, a searched-out sound list 47A created by the searching section 45 when a plurality of searched-out sound data searched out by the first stage searching process in accordance with the search condition list 46A described hereinabove with reference to FIG. 11 are determined as a final search result is described with reference to FIG. 14.

In this instance, the searching section 45 takes out, as information relating to a specified person photograph image to be displayed, for example, when a plurality of searched-out sound data are reproduced, image identification information and image pickup date and time information from the added liking person list 43A.

Then, the searching section 45 registers the image identification information and the image pickup date and time information in an associated relationship with each other into the searched-out sound list 47A.

Further, the searching section 45 takes out, from various kinds of attribute information for each of the searched-out sound data searched out then, for example, at least the sound identification information, title, artist, genre, year of release and release time as searched-out sound attribute information indicative of the searched-out sound data.

Then, the searching section 45 registers the searched-out sound attribute information of each of the one or plural searched-out sound data in an associated relationship with the image identification information and the image pickup date and time information into the searched-out sound list 47A.

Further, the searching section 45 registers information indicative of a search reason for each of the searched-out sound data (such information is hereinafter referred to also as search reason information) in an associated relationship with the searched-out sound attribute information of the searched-out sound data into the searched-out sound list 47A.

Here, the searching section 45 adopts, as a search reason for searched-out sound data, for example, a liking, laid-open information, a birthday, an address and a relationship with the user of a specified person corresponding to "liking," "laid-open information," "birthday," "address" and "relationship" as condition items for search with priority ranks applied thereto.

It is to be noted, however, that the searching section 45 in this instance determines a plurality of searched-out sound data searched out based on a liking of a specified person as a final search result.

Therefore, the searching section 45 in this instance takes out the liking information representative of the liking of the specified person used for the search of the searched-out sound data as search reason information from the search condition list 46. Then, the searching section 45 registers the search reason information which is the liking information into the searched-out sound list 47A.

Further, the searching section 45 takes out the name, telephone number, mail address and comment of the specified person as specified person information representative of the specified person from the added liking person list 43A.

Furthermore, the searching section 45 takes out face region position information representative of the position of the face region in which the face of the specified person specified in the specified person photograph image is captured from the added liking person list 43A.

Then, the searching section 45 registers the specified person information and the face region position information in an associated relationship with each other and also with the searched-out sound attribute information and the search reason information into the searched-out sound list 47A.

In this manner, the searching section 45 creates a searched-out sound list 47A in which all searched-out sound data searched out using the liking information as a search condition are registered as searched-out sound attribute information.

Now, a searched-out sound list 47B created by the searching section 45 when a plurality of searched-out sound data searched out by the second stage searching process in accordance with the search condition list 46A described hereinabove with reference to FIG. 11 are determined as a final search result is described with reference to FIG. 15.

In this instance, the searching section 45 takes out image identification information and image pickup date and time information from the added liking person list 43A similarly as described hereinabove and registers the taken out information into the searched-out sound list 47B.

Further, the searching section 45 takes out searched-out sound attribute information from various attribute information for each of the searched-out sound data searched out at this time as described above.

Then, the searching section 45 registers the searched-out sound attribute information of each of the one or plural searched-out sound data in an associated relationship with the image identification information and the image pickup date and time information into the searched-out sound list 47B.

Further, the searching section 45 selects, for each of the searched-out sound data, one search reason corresponding to a condition item obtained by the search of the searched-out sound data in response to the condition item in accordance with the priority rank of the same.

Then, the searching section 45 determines a liking, laid-open information, a birthday, an address and a relationship to the user representing the search reason in response to the one search reason set for each searched-out sound data as search reason information.

Actually, when the liking is selected as the search reason, the searching section 45 takes out the liking information representative of a liking of the specified person from the search condition list 46A similarly as described above and determines the liking information as search reason information.

However, if the laid-open information is selected as the search reason, then the searching section 45 takes out the provision person information of the specified person indicated by the laid-open information and the laid-open date and time information corresponding to the laid-open information keyword with which the searched-out sound data is searched out successfully and determines the provision person information as search reason information.

Further, if the birthday is selected as the search reason, then the searching section 45 takes out the provision person information indicative of the birthday, that is, the date of birth, of the specified person from the provision person information data and determines the provision person information as search reason information.

Further, if the address is selected as the search reason, then the searching section 45 takes out, for example, the provision person information representative of an address of the specified person from the provision person information data and takes out the information indicative of the address of the user from the present information provision data. Then, the searching section 45 determines the address of the specified person and the address of the user as search reason information.

Further, if the relationship with the user is selected as the search reason, then the searching section 45 takes out the comment, that is, a comment indicative of a relationship with the user, from the added liking person list 43A and determines the comment as search reason information.

If the searching section 45 acquires search reason information in this manner, then it registers the search reason information in an associated relationship with the searched-out sound attribute information of the searched-out sound data into the searched-out sound list 47B.

Further, the searching section 45 takes out the specified person information and the face region position information from the added liking person list 43A similarly as in the case described hereinabove.

Then, the searching section 45 registers the specified person information and the face region position information in an associated relationship with each other and also with the searched-out sound attribute information and the search reason information into the searched-out sound list 47B.

In this manner, the searching section 45 creates a searched-out sound list 47B in which all searched-out sound data searched out using the different search conditions together with the liking information as the particular search condition are registered as searched-out sound attribute information.

Now, successive execution of the first stage searching process and the second stage searching process by the searching section 45 using a plurality of search condition lists 46A (FIG. 11) whose number is equal to the number of specified persons in response to one specified person photograph image in which the plural specified persons are specified is described.

In this instance, the searching section 45 successively uses one search condition list 46A to successively execute the first stage searching process and the second stage searching process similarly as described hereinabove.

Consequently, the searching section 45 searches, for each of the search condition lists 46A, a plurality of searched-out sound data conforming to a liking of each of the specified persons or searches a plurality of searched-out sound data conforming to the liking so as to narrow down them to search for one or a plurality of searched-out sound data.

Then, the searching section 45 creates, for each of the search condition lists 46A, a searched-out sound list of a configuration similar to that of the searched-out sound lists 47A and 47B described hereinabove with reference to FIGS. 14 and 15 based on a search result for each search condition list 46A.

In particular, the searching section 45 creates a number of searched-out sound lists 47A and 47B equal to the number of specified persons in each of which specified person information and face region position information of one specified person, that is, of one specified person having the liking used for the search of the sound data are registered.

Now, successive execution by the searching section 45 of the first stage searching process and the second stage searching process using one search condition list 46C (FIG. 13) produced in response to one specified object photograph image is described.

In this instance, when the first stage searching process is executed, the searching section 45 determines one or a plurality of image pickup object names and place names in the search condition list 46C individually as particular search conditions.

Therefore, the searching section 45 searches a plurality of pieces of attribute information for a piece of attribute information which includes a genre or an artist which coincides with at least one of the one or plural image pickup object names and place names registered in the search condition list 46C.

Consequently, the searching section 45 searches a plurality of sound data for a plurality of searched-out sound data conforming to the one or plural specified image pickup objects or the place name of the location of the specified image pickup object or objects.

When the searching section 45 thereafter executes the second stage searching process, it determines the ranking use flag, recommendation use flag, reference period, season keyword, event keyword, time zone keyword and weather keyword in the search condition list 46C as the different search conditions.

Thus, the searching section 45 decides whether or not a ranking use flag is registered in the search condition list 46C similarly as in the foregoing description.

If a ranking use flag is registered in the search condition list 46C, then the searching section 45 searches the plural searched-out sound data to suitably narrow down them to search for one or a plurality of searched-out sound data indicated by the ranking information.

Further, the searching section 45 decides whether or not a recommendation use flag is registered in the search condition list 46C similarly as in the foregoing description. If a recommendation use flag is registered in the search condition list 46C, then the searching section 45 searches the plural searched-out sound data to suitably narrow down the same to search for one or a plurality of searched-out sound data indicated by the recommendation information.

Further, the searching section 45 decides, based on the reference period registered in the search condition list 46C similarly as described hereinabove, whether or not a reproduction history within the reference period regarding the specified person is included in the provision person information data.

If a reproduction history within the reference period regarding the specified person is included in the provision person information data, then the searching section 45 searches the plural searched-out sound data to suitably narrow down the same to search for one or a plurality of searched-out sound data indicated by the reproduction history.

Further, the searching section 45 searches, based on a plurality of season keywords similarly as in the foregoing description, the plural searched-out sound data to suitably narrow down them to search for one or a plurality of searched-out sound data conforming to the present season.

Furthermore, the searching section 45 searches, based on a plurality of event keywords similarly as in the foregoing description, the plural searched-out sound data to suitably narrow down them to search for one or a plurality of searched-out sound data conforming to the present event period.

Further, the searching section 45 searches, based on a plurality of time zone keywords similarly as in the foregoing description, the plural searched-out sound data to suitably narrow down them to search for one or a plurality of searched-out sound data conforming to the present time zone.

Furthermore, the searching section 45 searches, based on a weather keyword similarly as in the foregoing description, the plural searched-out sound data to suitably narrow down them to search for one or a plurality of searched-out sound data conforming to the present weather.

In this manner, the searching section 45 searches for one or a plurality of specified image pickup objects or a plurality of searched-out sound data relating to the location of the specified image pickup object or objects by executing the first stage searching process.

It is to be noted that, if two or more particular search conditions, that is, one or a plurality of image pickup object names and place names, conform thereupon to the same searched-out sound data, then the searching section 45 searches out the same searched-out sound data avoiding overlapping while grasping the two or particular search conditions conforming to this.

The searching section 45 subsequently executes the second stage searching process to search a plurality of searched-out sound data relating to the location of the specified image pickup object to suitably narrow down them thereby to search out one or a plurality of searched-out sound data conforming to the different search conditions.

In particular, also in this instance, if one or more searched-out sound data satisfying the different search conditions can be searched out by executing the second stage searching process, then the searching section 45 determines the searched out one or plural searched-out sound data as a final search result.

Incidentally, also in the case where a plurality of searched-out sound data are to be narrowed down with the different search conditions, if two or more ones of the different search conditions are satisfied by the same searched-out sound data, then the searching section 45 searches out the same searched-out sound data avoiding overlapping while grasping the two or more different search conditions satisfying the same.

On the other hand, even if the second stage searching process is executed, if searched-out sound data which satisfies the different search conditions cannot be searched out at all, then the searching section 45 determines the plural searched-out sound data searched out in the first stage searching process as a final search result.

After the searching section 45 searches out one or a plurality of searched-out sound data in this manner, it uses the specified object list 42 and the search condition list 46C together with the attribute information of the one or plural searched-out sound data to create such a searched-out sound list 47C as illustrated in FIG. 16.

In this instance, the searching section 45 takes out the image identification information and the image pickup date and time information from the specified object list 42 as information relating to a specified object photograph image to be displayed, for example, when one or a plurality of searched-out sound data are reproduced.

Then, the searching section 45 registers the image identification information and the image pickup date and time information in an associated relationship with each other into the searched-out sound list 47C.

Further, the searching section 45 takes out the searched-out sound attribute information from within the various kinds of attribute information for each of the searched-out sound data searched out in this instance.

Then, the searching section 45 registers the searched-out sound attribute information of the one or plural searched-out sound data in an associated relationship with the image identification information and the image pickup date and time information into the searched-out sound list 47C.

Furthermore, the searching section 45 registers the search reason information for each of the searched-out sound data in an associated relationship with the searched-out sound attribute information of the searched-out sound data into the searched-out sound list 47C.

In this instance, the searching section 45 adopts, as search reasons for searched-out sound data, for example, an image pickup object name of a specified image pickup object and a place name of the specified image pickup object corresponding to "image pickup object" and "place name" as the condition items for the search with priority ranks applied thereto.

Therefore, the searching section 45 selects, for each of the searched-out sound data, in response to a condition item obtained by search of the searched-out sound data, one search reason corresponding to the condition item in accordance with the priority rank.

Then, the searching section 45 determines the image pickup object name or the place name actually indicative of a search reason as search reason information in response to the one search reason selected for each searched-out sound data.

Actually, when the image pickup object name is selected as a search reason, the searching section 45 takes out the image pickup object name of the specified image pickup object obtained by the search of the searched-out sound data from the search condition list 46C and determines the image pickup object name as search reason information.

On the other hand, if the place name is selected as a search reason, then the searching section 45 takes out the place name of the location of the specified image pickup object obtained by the search of the searched-out sound data from the search condition list 46C and determines the place name as search reason information.

In this manner, when search reason information is obtained, the searching section 45 registers the search reason information in an associated relationship with the searched-out sound attribute information of the searched-out sound data into the searched-out sound list 47C.

Furthermore, the searching section 45 takes out the image pickup object name and the place name of the location of the specified image pickup object as specified object information representative of the specified image pickup object from the specified object list 42.

Then, the searching section 45 registers the specified object information in an associated relationship with the searched-out sound attribute information and the search reason information into the searched-out sound list 47C.

In this manner, the searching section 45 creates a searched-out sound list 47C in which all searched-out sound data searched out using the image pickup object name and the place name as the search conditions and the different search conditions are registered as searched-out sound attribute information.

It is to be noted that, in the case where there is no necessity to particularly distinguish the searched-out sound lists 47A to 47C described hereinabove with reference to FIGS. 14 to 16 and the other searched-out sound lists described hereinabove without referring to the drawings, they are collectively referred to as searched-out sound list 47 with the reference numeral 47 added.

After the searching section 45 creates one or a plurality of searched-out sound lists 47 through the search of one or a plurality of searched-out sound data in this manner, it signals the created one or plural searched-out sound lists 47 to a playlist creation section 50.

Thereupon, the playlist creation section 50 executes a sound playlist creation process of creating a sound playlist. When the sound playlist creation process is executed, the playlist creation section 50 reads out, as information representative of a situation at present of the photograph image displaying apparatus 11, the selection time information stored in the setting information storage section 27 together with the image playlist 26.

Then, if one or a plurality of searched-out sound lists 47 are supplied from the searching section 45, then the playlist creation section 50 creates a sound playlist based on the one or plural searched-out sound lists 47 and the selection display time represented by the selection time information.

Here, the sound playlist creation process when the single searched-out sound lists 47A and 47B in which one or a plurality of searched-out sound data conforming to a liking of one specified person is supplied to the playlist creation section 50 is described particularly.

In this instance, the playlist creation section 50 selects and takes out the searched-out sound attribute information of searched-out sound data to be reproduced upon display of a specified person photograph image from the searched-out sound lists 47A and 47B based on the selection display time and the reproduction time included in the searched-out sound attribute information.

Actually, if the total of the reproduction time of all searched out (registered in the searched-out sound lists 47A and 47B) sound data (reproduction time included in the searched-out sound attribute information) is equal to or shorter than the selection display time, then the playlist creation section 50 selects all searched-out sound data as a reproduction object.

On the other hand, if the total of the reproduction time of all searched-out sound data is longer than the selection display time, then the playlist creation section 50 arbitrarily selects one or a plurality of searched-out sound data with which the total of the reproduction time is equal to or shorter than selection display time.

In this manner, the playlist creation section 50 selects one or a plurality of searched-out sound data of a reproduction object from the searched-out sound lists 47A and 47B so that the total time of the reproduction time of the one or plural searched-out sound data is equal to or shorter than the selection display time at a maximum.

Then, the playlist creation section 50 takes out the searched-out sound attribute information of the one or plural searched-out sound data selected as a reproduction object from the searched-out sound lists 47A and 47B.

However, if all of the reproduction time of all searched-out sound data is longer than the selection display time, then the playlist creation section 50 selects, for example, that one of the searched-out sound data whose reproduction time is shortest as a reproduction object.

Thus, the playlist creation section 50 takes out the searched-out sound attribute information of the one searched-out sound data selected as a reproduction object from the searched-out sound lists 47A and 47B.

Then, the playlist creation section 50 creates, for example, such a sound playlist 51A as illustrated in FIG. 17 in which the pieces of searched-out sound attribute information of the one or plural searched-out sound data selected as a reproduction object are arranged in an arbitrary order.

However, the playlist creation section 50 thereupon takes out also the search reason information associated with the searched-out sound attribute information of the one or plural searched-out sound data selected as a reproduction object from the searched-out sound lists 47A and 47B.

Then, the playlist creation section 50 registers the search reason information in an associated relationship with the searched-out sound data into the sound playlist 51A.

Further, the playlist creation section 50 takes out also the specified person information and the face region position information regarding the specified person from the searched-out sound lists 47A and 47B.

Then, the playlist creation section 50 registers the specified person information and the face region position information in an associated relationship with the searched-out sound attribute information and the search reason information into the sound playlist 51A.

Furthermore, the playlist creation section 50 takes out also the image identification information and the image pickup date and time information relating to the specified person photograph image from the searched-out sound lists 47A and 47B. Then, the playlist creation section 50 also registers the image identification information and the image pickup date and time information into the sound playlist 51A.

In this manner, the playlist creation section 50 creates a sound playlist 51A in which one or a plurality of searched-out sound data of a reproduction object are indicated by searched-out sound attribute information and a reproduction order of the one or plural searched-out sound data is defined as an arrangement order of the pieces of searched-out sound attribute information.

Now, the sound playlist creation process when one searched-out sound list 47 in which one or a plurality of searched-out sound data conforming to a liking common to a plurality of specified persons are registered is supplied to the playlist creation section 50 is described particularly.

Also in this instance, the playlist creation section 50 selects one or a plurality of searched-out sound data as a reproduction object similarly as in the foregoing description.

Then, the playlist creation section 50 takes out the searched-out sound attribute information of one searched-out sound data selected as a reproduction object from the searched-out sound list 47 together with corresponding search reason information.

Then, the playlist creation section 50 creates, for example, such a sound playlist 51B as illustrated in FIG. 18 in which the pieces of searched-out sound attribute information of the one or plural searched-out sound data selected as the reproduction object are arranged in an arbitrary order together with the corresponding search reason information.

It is to be noted, however, that the playlist creation section 50 thereupon takes out the specified person information and the face region position information relating to the plural specified persons from the searched-out sound list 47.

Then, the playlist creation section 50 registers the specified person information and the face region position information of the plural specified persons in an associated relationship with the searched-out sound attribute information and the search reason information into the sound playlist 51B.

Incidentally, also in this instance, the playlist creation section 50 takes out the image identification information and the image pickup date and time information relating to the specified person photograph image from the searched-out sound list 47. Then, the playlist creation section 50 registers also the image identification information and the image pickup date and time information into the sound playlist 51B.

Now, the sound playlist creation process when a number of searched-out sound lists 47 equal to a plural number of specified persons are supplied to the playlist creation section 50 is described particularly.

However, a number of searched-out sound lists 47 equal to the number of specified persons are created in response to detection of a liking for each of the specified persons when the selection display time is longer than the predetermined time selected in accordance with such a criterion that, for example, a plurality of sound data can be reproduced continuously as described hereinabove.

Therefore, the playlist creation section 50 thereupon selects and takes out searched-out sound attribute information of one or a plurality of searched-out sound data of a reproduction object from a plurality of searched-out sound lists 47 based on the selection display time and the reproduction time included in the searched-out sound attribute information of the searched-out sound lists 47.

Actually, if the total of the reproduction time of all searched out searched-out sound data (searched-out sound data regarding all of the plural searched-out sound lists 47) is equal to or shorter than the selection display time, then the playlist creation section 50 selects all of the searched-out sound data as a reproduction object.

On the other hand, if the total of the reproduction time of all searched out searched-out sound data is longer than the selection display time, then the playlist creation section 50 arbitrarily selects one or an equal plural number of searched-out sound data from the plural searched-out sound lists 47 such that the total of the reproduction time is equal to or shorter than the selection display time.

In this manner, the playlist creation section 50 selects one or a plurality of searched-out sound data from each of the plural searched-out sound lists 47 such that the total time of the reproduction time of the searched-out sound data is equal to or shorter than the selection display time at a maximum.

Then, the playlist creation section 50 takes out the searched-out sound attribute information of the one or plural searched-out sound data selected as the reproduction object from the plural searched-out sound lists 47 together with corresponding search reason information.

Then, the playlist creation section 50 creates, for example, such a sound playlist 51C as illustrated in FIG. 19 in which the pieces of searched-out sound attribute information of the one or plural searched-out sound data of the reproduction object are arranged in an arbitrary order together with the search reason information.

However, the playlist creation section 50 thereupon takes out the specified person information and the face region position information regarding the specified persons from the plural searched-out sound lists 47.

Then, the playlist creation section 50 registers the specified person information and the face region position information of each specified person in an associated relationship with the searched-out sound attribute information and the search reason information of the searched-out sound data of the reproduction object which have been searched out based on the liking of the specified person into the sound playlist 51C.

In particular, the playlist creation section 50 registers the specified person information and the face region position information of each specified person in an associated relationship with the searched-out sound attribute information and the search reason information of the searched-out sound data of the reproduction object conforming to the liking of the specified person into the sound playlist 51C.

Also in this instance, the playlist creation section 50 takes out the image identification information and the image pickup date and time information regarding the specified person photograph image from the searched-out sound list 47. Then, the playlist creation section 50 registers also the image identification information and the image pickup date and time information into the sound playlist 51C.

Now, the sound playlist creation process when one searched-out sound list 47C in which one or plurality of searched-out sound data relating to one or a plurality of specified image pickup objects or the place name of the location are registered is supplied to the playlist creation section 50 is described particularly.

Also in this instance, the playlist creation section 50 selects one or a plurality of searched-out sound data as a reproduction object from the searched-out sound list 47C similarly as in the foregoing description.

Then, the playlist creation section 50 takes out the searched-out sound attribute information of the one or plural searched-out sound data selected as a reproduction object from the searched-out sound list 47C together with corresponding search reason information.

Then, the playlist creation section 50 creates, for example, such a sound playlist 51D as illustrated in FIG. 20 in which the pieces of searched-out sound attribute information of the one or plural searched-out sound data selected as a reproduction object are arranged in an arbitrary order together with the corresponding search reason information.

It is to be noted, however, that the playlist creation section 50 takes out the image identification information and the image pickup date and time information relating to the specified object photograph image from the searched-out sound list 47C. Then, the playlist creation section 50 registers the image identification information and the image pickup date and time information into the sound playlist 51D.

In this manner, the playlist creation section 50 creates a sound playlist 51D in which the one or plural searched-out sound data of a reproduction object are indicated by the searched-out sound attribute information and the reproduction order of the one or plural searched-out sound data is defined as an arrangement order of the searched-out sound attribute information.

It is to be noted that, in the following description, in the case where there is no necessity to particularly distinguish the sound playlists 51A to 51D described hereinabove with reference to FIGS. 17 to 20, they are collectively referred to also as a sound playlist 51 with the reference numeral 51 added.

After the playlist creation section 50 creates a sound playlist 51 in this manner, it signals the created sound playlist 51 to the main controlling section 20.

When the sound playlist 51 is supplied from the playlist creation section 50, the main controlling section 20 signals the sound playlist 51 to the setting information storage section 27 so as to be stored in an associated relationship with the image playlist 26 into the setting information storage section 27.

In this manner, every time a sound playlist 51 is supplied from the playlist creation section 50, the main controlling section 20 stores the sound playlist 51 in an associated relationship with the image playlist 26 into the setting information storage section 27.

Then, after the sound playlists 51 corresponding to all photograph images, that is, all specified person photograph images and specified object photograph images registered in the image playlist 26 are stored, for example, into the setting information storage section 27, the main controlling section 20 starts reproduction of the photograph image data and the searched-out sound data.

In particular, the main controlling section 20 thereupon reads out the image playlist 26 and corresponding selection time information from the setting information storage section 27 and reads out also the sound playlist 51 corresponding to the photograph image data registered in the image playlist 26 and having the reproduction order number 1.

Then, the main controlling section 20 reads out an image file in which the photograph image data having the reproduction order number 1 is stored from the image storage section 22 in accordance with the image playlist 26.

Further, the main controlling section 20 takes out the photograph image data from the image file and signals the taken out photograph image data to the display section 25 through the display controlling section 24.

Consequently, the main controlling section 20 controls the display section 25 to display a specified person photograph image or a specified object photograph image based on the photograph image data.

Also in this instance, the main controlling section 20 further starts time counting by means of the internal timer in response to the start of display of a specified person photograph image or a specified object photograph image similarly as in the foregoing description.

Then, the main controlling section 20 continues the display of the one specified person photograph image or specified object photograph image on the display section 25 for a period of time until the counted time reaches the selection display time.

Furthermore, the main controlling section 20 decides based on the searched-out sound attribute information of the searched-out sound data whose reproduction order number registered in the sound playlist 51 is 1 whether or not the searched-out sound data is stored in the sound storage section 28.

If the searched-out sound data whose reproduction order number is 1 is stored in the sound storage section 28, then the main controlling section 20 reads out a sound file in which the searched-out sound data is stored from the sound storage section 28.

Then, the main controlling section 20 takes out the searched-out sound data from the sound file and signals the taken out searched-out sound data to the reproduction section 32 through the reproduction controlling section 31. Consequently, the reproduction section 32 carries out a predetermined reproduction process for the searched-out sound data and outputs resulting sound.

It is to be noted, however, that, if the searched-out sound data having the reproduction order number 1 is not stored in the sound storage section 28, then the main controlling section 20 creates sound request data in which the searched-out sound attribute information of the searched-out sound is stored.

Then, the main controlling section 20 transmits the sound request data to the information providing apparatus 13 on the network 12 successively through the communication controlling section 29 and the network interface 30.

Thereupon, in response to reception of the sound request data, the information providing apparatus 13 transmits searched-out sound data identified with the searched-out sound attribute information in the search request data in a streaming form to the photograph image displaying apparatus 11.

Consequently, the main controlling section 20 thereupon receives the searched-out sound data transmitted from the information providing apparatus 13 successively through the network interface 30 and the communication controlling section 29 and then signals the searched-out sound data to the reproduction section 32 through the reproduction controlling section 31.

Consequently, the reproduction section 32 takes in the searched-out sound data supplied thereto from the main controlling section 20, carries out a predetermined reproduction process for the searched-out sound data and outputs resulting sound.

Then, when the reproduction process of the searched-out sound data by the reproduction section 32 comes to an end, the main controlling section 20 decides whether or not searched-out sound data to be reproduced next, that is, the searched-out sound attribute information of the searched-out sound data to be reproduced next, is registered in the sound playlist 51.

If searched-out sound data to be reproduced next is registered in the sound playlist 51, then the main controlling section 20 decides whether or not the searched-out sound data to be reproduced next is stored in the sound storage section 28 similarly as in the foregoing description.

Then, in response to a result of the decision, the main controlling section 20 acquires the searched-out sound data to be reproduced next from the sound storage section 28 or the information providing apparatus 13 and signals the acquired searched-out sound data to the reproduction section 32 through the reproduction controlling section 31.

Consequently, the reproduction section 32 carries out a predetermined reproduction process for the searched-out sound data to be reproduced next and outputs resulting sound, that is, sound based on the searched-out sound data to be reproduced next, continuously to the sound having been outputted till then.

On the other hand, if searched-out sound data to be reproduced next is not registered in the sound playlist 51, then the main controlling section 20 decides whether or not the display time of the specified person photograph image or specified object photograph image by the display section 25, that is, the counted time by the timer, reaches the selection display time.

If the display time of the specified person photograph image or specified object photograph image by the display section 25, that is, the counted time by the timer, does not reach the selection display time, then the main controlling section 20 reproduces searched-out sound data having the reproduction order number 1 similarly as in the foregoing description in accordance with the sound playlist 51.

In this manner, while one specified person photograph image or specified object photograph image is displayed on the display section 25, the main controlling section 20 continuously reproduces one or a plurality of searched-out sound data suitably repetitively in accordance with the corresponding sound playlist 51.

Then, when the display time of the specified person photograph image or specified object photograph image by the display section 25, that is, the counted time by the timer, reaches the selection display time, the main controlling section 20 ends the reproduction process of the searched-out sound data in this instance thereby to end the outputting of sound based on the searched-out sound data.

Further, the main controlling section 20 decides whether or not photograph image data to be reproduced next, that is, image identification information of the photograph image data to be reproduced next, is registered in the image playlist 26.

If photograph image data to be reproduced next is registered in the image playlist 26, then the main controlling section 20 reads out the sound playlist 51 corresponding to the photograph image data to be reproduced next from the setting information storage section 27.

Then, the main controlling section 20 reads out an image file in which the photograph image data to be reproduced next is stored from the image storage section 22 in accordance with the image playlist 26 similarly as in the foregoing description.

Then, the main controlling section 20 takes out the photograph image data from the image file and signals the taken out photograph image data to the display section 25 through the display controlling section 24.

Consequently, the main controlling section 20 controls the display section 25 to display a specified person photograph image or a specified object photograph image based on the newly signaled photograph image data in place of the specified person photograph image or specified object photograph image having been displayed till then.

Then, while the specified person photograph image or specified object photograph image remains displayed on the display section 25, the main controlling section 20 carries out, in accordance with a new sound playlist 51 which corresponds to the specified person photograph image or specified object photograph image, a reproduction process of one or a plurality of searched-out sound data and causes corresponding sound to be outputted similarly as in the foregoing description.

On the other hand, if photograph image data to be reproduced next is not registered in the image playlist 26, then the main controlling section 20 stops the signaling of photograph image data to the display section 25 thereby to end the display of a specified person photograph image or specified object photograph image on the display section 25.

Further, in accordance with the end of the display of a specified person photograph image or specified object photograph image, the main controlling section 20 ends also the reproduction process of searched-out sound data thereby to end the outputting of sound based on the searched-out sound data.

In this manner, while the main controlling section 20 causes one or a plurality of specified person photograph images or specified object photograph images to be successively displayed in accordance with the image playlist 26, it causes one or a plurality of searched-out sound data to be reproduced in accordance with the sound playlist 51 to output sound. Thus, the main controlling section 20 can allow the user to enjoy sound together with a specified person photograph image or specified object photograph image.

Then, during display of a specified person photograph image on the display section 25, the main controlling section 20 allows one or a plurality of specified persons captured in the specified person photograph image to enjoy sound conforming to the liking of them.

On the other hand, during display of a specified object photograph image on the display section 25, the main controlling section 20 can provide sound relating to a specified image pickup object captured in the specified object photograph image or the place name of the location of the same.

Incidentally, if, during display of a specified person photograph image, a request to present a search reason for searched-out sound data is issued by the user through the operation section 23, then the main controlling section 20 takes out search reason information corresponding to the searched-out sound data being currently reproduced from the sound playlist 51.

Thereupon, the main controlling section 20 takes out also face region position information of the specified person having the liking used in the search for the searched-out sound data being currently reproduced.

Then, the main controlling section 20 processes the photograph image data of the specified person photograph image being currently display based on the search reason information and the face region position information and signals resulting photograph image data to the display section 25 through the display controlling section 24.

Consequently, the main controlling section 20 displays the search reason of the searched-out sound data being currently reproduced and a framework line surrounding the face of the specified person having the liking used for the search for the searched-out sound data in a superposed relationship on the specified person photograph image being currently displayed on the display section 25.

Figure 21:
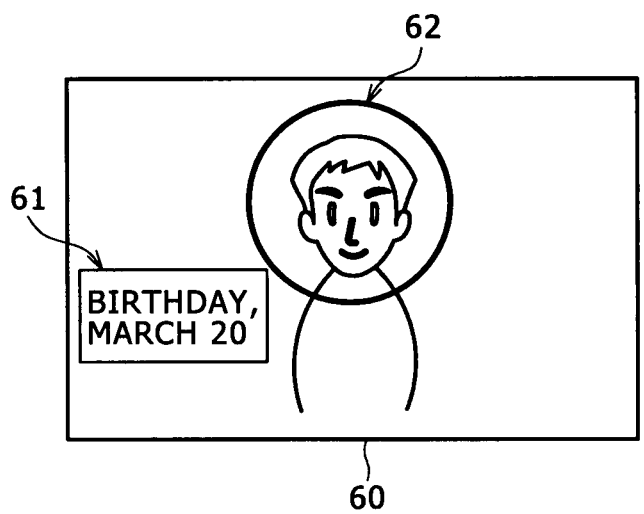
FIGS. 21, 22 and 23 are schematic views illustrating different presentations of a search reason of searched-out sound data being currently reproduced.

In particular, if one specified person is specified in a specified person photograph image being currently displayed and searched-out sound data conforming to a liking of the specified person is being currently reproduced, then the main controlling section 20 changes the display state of a specified person photograph image 60, for example, as illustrated in FIG. 21.

In this instance, on the specified person photograph image 60 being currently displayed, for example, a text 61 representing the birthday of the specified person as a search reason for the searched-out sound data being currently reproduced and a framework line 62 surrounding the face of the specified person are displayed in a superposed manner.

Figure 22:
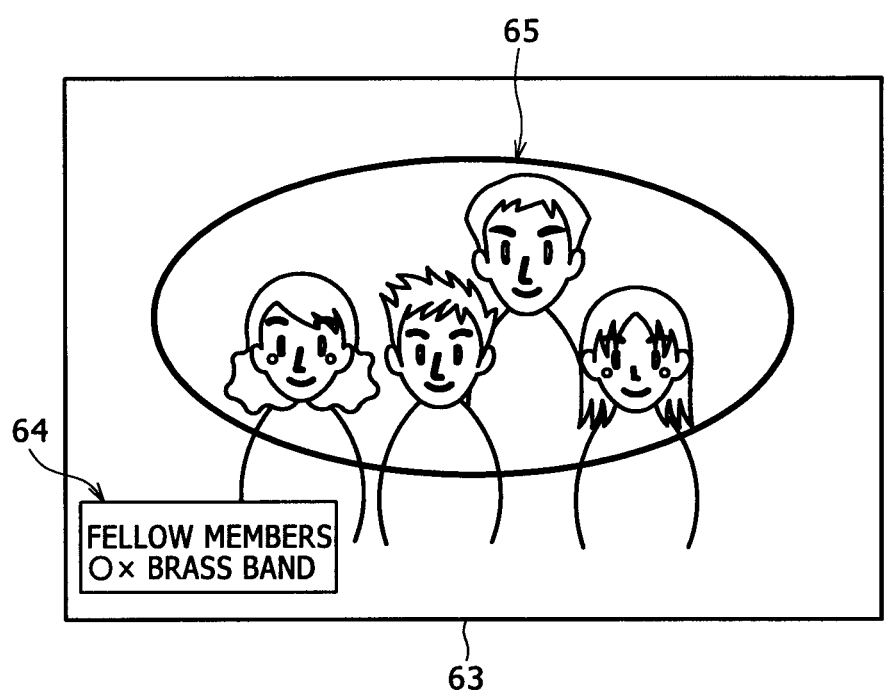

Further, if a plurality of specified persons are specified in a specified person photograph image being currently displayed and searched-out sound data conforming to a common liking of the specified persons is being currently reproduced, then the main controlling section 20 changes the display state of a specified person photograph image 63, for example, as illustrated in FIG. 22.

In this instance, on the specified person photograph image 63 being currently displayed, for example, a text 64 representing a relationship of the specified persons as a search reason for the searched-out sound data being currently reproduced and a framework line 65 collectively surrounding the faces of the specified persons are displayed in a superposed manner.

Figure 23:
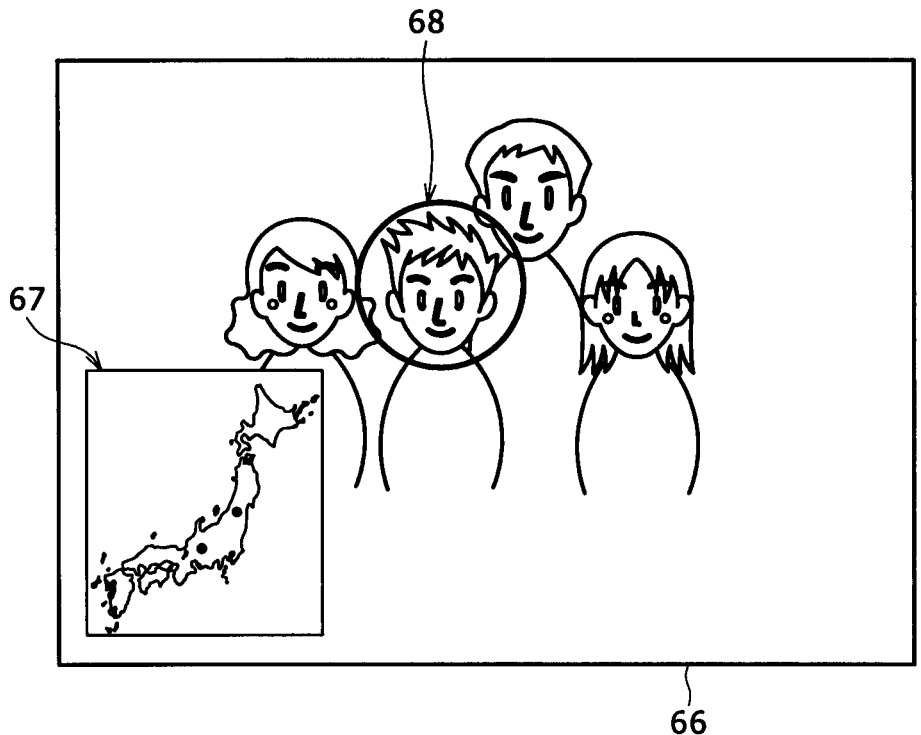

Furthermore, although a plurality of specified persons are specified in a specified person photograph image being currently displayed, if searched-out sound data conforming to a liking of one of the specified persons is being currently reproduced, then the main controlling section 20 changes the display state of a specified person photograph image 66, for example, as illustrated in FIG. 23.

In this instance, on the specified person photograph image 66 being currently displayed, for example, a framework line 67 which indicates the address of the one specified person having the liking used for the search for the searched-out sound data as a search reason for the searched-out sound data being currently reproduced on a map together with the address of the user is displayed in a superposed manner.

On the specified person photograph image 66, also a framework line 68 surrounding the face of the one specified person, that is, the one specified person having the liking used for the search for the searched-out sound data being currently reproduced is displayed in a superposed manner.

In this manner, if a request for presentation of a search reason for searched-out sound data being currently reproduced is issued by the user during display of a specified person photograph image, then the main controlling section 20 can display the search reason on the specified person photograph image being currently displayed.

Thereupon, the main controlling section 20 can additionally present, on the specified person photograph image being currently displayed, also to the liking of which specified person the searched-out sound data being currently reproduced conforms by means of a framework line surrounding the specified person.

Incidentally, the setting information storage section 27 has stored therein in advance an executable process list in which, for each search reason for searched-out sound data, the search reason and executable process information representative of one or a plurality of processes which can be executed in response to presentation of the search reason are indicated in an associated relationship with each other.

It is to be noted that such a process which can be executed in response to presentation of a search reason as described above may be a process of originating a telephone call to a specified person or a process of creating an e-mail to the specified person.

Further, the process which can be executed in response to presentation of a search reason may be a process of creating new laid-open information and uploading the same to a community site.

Furthermore, the process which can be executed in response to presentation of a search reason may be a process of acquiring and presenting ranking information indicative of ranking of distribution of sound data by the information providing apparatus 13 in the age including the image pickup date and time of a specified person photograph image or a specified object photograph image being currently displayed.

Further, the process which can be executed in response to presentation of a search reason may be a process of acquiring and presenting recommendation information indicative of sound data which is currently recommended by the information providing apparatus 13.

Furthermore, the process which can be executed in response to presentation of a search reason may be a process of acquiring information indicative of a weather or an event or the like being currently held in regard to both of the proximity of the address of the user and the proximity of the address of the specified person from the information providing apparatus 13 and presenting the acquired information.

Further, the process which can be executed in response to presentation of a search reason may be a process of acquiring and presenting various kinds of information regarding a specified image pickup object or the place name of the location of the same from the information providing apparatus 13.

Therefore, if, in a state in which a search reason is presented to the user, a request for presentation of executable processes is issued by the user through the operation section 23, then the main controlling section 20 reads out executable process information corresponding to the search reason being presented from the setting information storage section 27.

Then, the main controlling section 20 further processes the photograph image data of the specified person photograph image being currently displayed based on the executable process information and signals resulting photograph image data to the display section 25 through the display controlling section 24.

Figure 24:
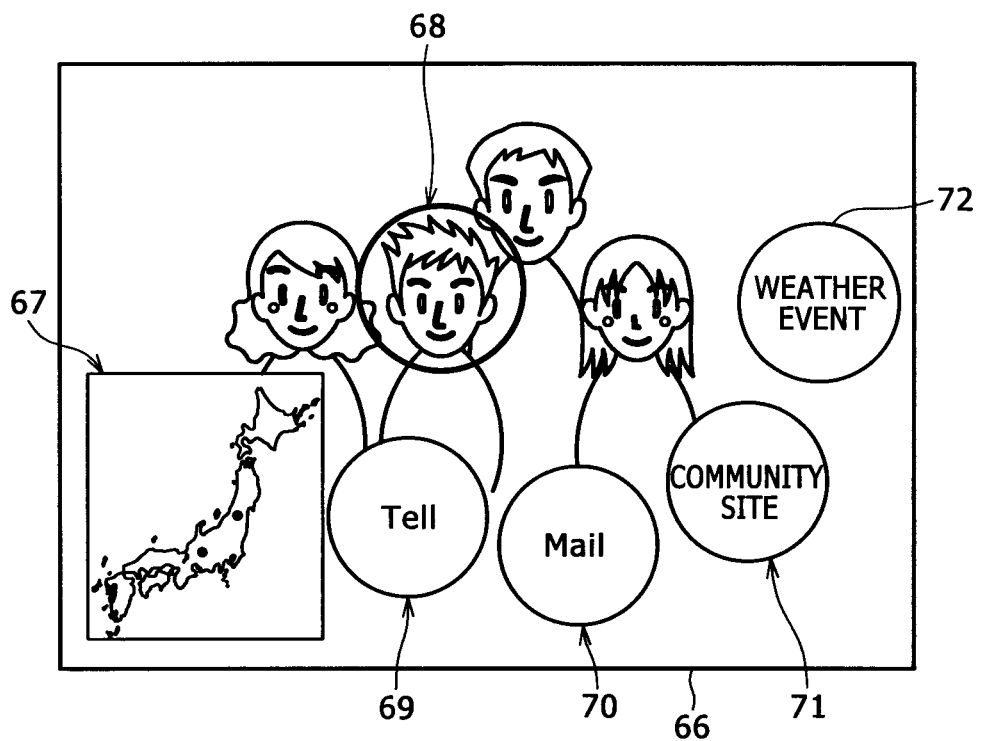
FIG. 24 is a schematic view illustrating presentation of executable processes in response to presentation of a search reason.

Consequently, the main controlling section 20 displays, for example, as shown in FIG. 24, icons 69 to 72 representative of one or a plurality of processes which can be executed in response to presentation of the search reason being currently displayed in a superposed relationship with the specified person photograph image 66 being currently displayed.

Then, if one of the icons 69 to 72 is selected on the specified person photograph image 66 by the user through the operation section 23, then the main controlling section 20 executes a process indicated by the selected one of the icons 69 to 72.

In this manner, when a search reason is presented on a specified person photograph image being currently displayed, the main controlling section 20 can urge the user to communicate with a specified person in response to presentation of the search reason or can urge the user to execute such a process as to present a feeling of the user itself as laid-open information to the public.

On the other hand, if, also during display of a specified object photograph image, a request for presentation of a search reason of searched-out sound data being currently reproduced is issued by the user through the operation section 23, then the main controlling section 20 takes out search reason information corresponding to the searched-out sound data being currently reproduced from the sound playlist 51.

Then, the main controlling section 20 prodesses photograph image data of the specified object photograph image being currently displayed based on the search reason information and signals resulting photograph image data to the display section 25 through the display controlling section 24.

Consequently, the main controlling section 20 controls the display section 25 to display the search reason for the searched-out sound data being currently reproduced, that is, a text or the like representing the image pickup object name or the place name, in a superposed relationship with the specified object photograph image being currently displayed on the display section 25.

In this manner, also if a request for presentation of a search reason for searched-out sound data being currently reproduced is issued by the user during display of a specified object photograph image, the main controlling section 20 can present the search reason on the specified object photograph image being currently displayed.

Then, if, in the state in which a search reason is presented to the user, a request for presentation of an executable process is issued by the user through the operation section 23, then the main controlling section 20 reads out executable process information corresponding to the search reason being currently displayed from the setting information storage section 27.

Then, the main controlling section 20 further prodesses photograph image data of the specified object photograph image being currently displayed based on the executable process information and signals resulting photograph image data to the display section 25 through the display controlling section 24.

Consequently, the main controlling section 20 causes an icon or icons indicative of one or a plurality of executable processes in response to presentation of a search reason being currently presented to be displayed in a superposed relationship on the specified object photograph image being currently displayed.

Then, if one of the icons is selected on the specified object photograph image by the user through the operation section 23, then the main controlling section 20 executes the process indicated by the selected icon.

In this manner, also while a specified object photograph image is displayed, the main controlling section 20 can execute such a process as to acquire and present various kinds of information relating to a specified image pickup object or the place name of the location of the specified image pickup object in response to presentation of a search reason.

Incidentally, for example, in the case where the operation section 23 is a touch panel provided on the display screen of the display section 25, if the touch panel is touched at any place thereof by the user while a specified person photograph image or a specified object photograph image is displayed, then the main controlling section 20 presents a search reason.

Further, where the configuration just described is adopted, in a state in which a search reason is presented on a specified person photograph image, for example, if the touch panel is touched at a face part of the specified person which is surrounded by a frame line by the user, then the main controlling section 20 displays icons indicative of executable processes.

Furthermore, where the configuration described above is adopted, in a state in which a search reason is presented on a specified object photograph image, for example, if the touch panel is touched at any place thereof by the user, then the main controlling section 20 displays icons indicative of executable processes.

2-3. Hardware Configuration According to the Functional Circuit Blocks of the Information Providing Apparatus Now, a hardware configuration according to functional circuit blocks of the information providing apparatus 13 is described with reference to FIG. 25.

The information providing apparatus 13 includes a main controlling section 80 which executes various processes and controls the entire information providing apparatus 13 in response to the processes.

If registration request data is transmitted from the photograph image displaying apparatus 11, then the main controlling section 80 receives the registration request data successively through a network interface 81 and a communication controlling section 82.

Thereupon, the main controlling section 80 reads out personal information input screen data stored in advance in a personal information storage section 83 from the personal information storage section 83 in response to reception of the registration request data.

Then, the main controlling section 80 transmits the personal information input screen data to the photograph image displaying apparatus 11 successively through the communication controlling section 82 and the network interface 81.

Then, if user registration data is transmitted from the photograph image displaying apparatus 11, then the main controlling section 80 receives the user registration data successively through the network interface 81 and the communication controlling section 82.

Consequently, the main controlling section 80 signals personal information of the user included in the user registration data to the personal information storage section 83 so as to be stored into the personal information storage section 83 thereby to register the user of the photograph image displaying apparatus 11.

Then, after the user registration of the user is completed, the main controlling section 80 transmits registration completion notification data to the photograph image displaying apparatus 11 successively through the communication controlling section 82 and the network interface 81.

In this manner, the main controlling section 80 authorizes the user of the photograph image displaying apparatus 11 to utilize the information providing apparatus 13, that is, to utilize various kinds of information which can be provided by the information providing apparatus 13.

Further, after the user registration of the user is completed, if update request data is transmitted from the photograph image displaying apparatus 11, then the main controlling section 80 receives the update request data successively through the network interface 81 and the communication controlling section 82.

Then, the main controlling section 80 discriminates and reads out the personal information of the user from the personal information storage section 83 based on the user identification information and the password in the update request data.

Then, the main controlling section 80 creates personal information change screen data based on the personal information of the user and transmits the created personal information change screen data to the photograph image displaying apparatus 11 successively through the communication controlling section 82 and the network interface 81.

Then, if personal information update data is transmitted from the photograph image displaying apparatus 11, then the main controlling section 80 receives the personal information update data successively through the network interface 81 and the communication controlling section 82.

Consequently, the main controlling section 80 discriminates the personal information of the user in the personal information storage section 83 based on the user identification information and the password in the personal information update data.

Then, the main controlling section 80 signals the update information in the personal information update data to the personal information storage section 83 so as to be stored into the personal information storage section 83, whereupon changeable information from among the various kinds of personal information of the user is replaced with the update information to update the personal information.

Further, after the user registration of the user is completed, if personal information update data is transmitted from the photograph image displaying apparatus 11 without transmission of personal information change screen data, then the main controlling section 80 receives the personal information update data successively through the network interface 81 and the communication controlling section 82.

Then, the main controlling section 80 discriminates the personal information of the user in the personal information storage section 83 based on the user identification information and the password in the personal information update data.

Then, the main controlling section 80 signals the additional information in the personal information update data to the personal information storage section 83 so as to be stored into the personal information storage section 83 thereby to add the additional information to the personal information of the user to update the personal information of the user.

Incidentally, the information providing apparatus 13 includes a dictionary storage section 84. In the dictionary storage section 84, morpheme dictionary data created by associating a plurality of morphemes of various parts of speech such as noun, verb, adjective and adverb and reading, a part of speech and so forth with each other are stored in advance.

Incidentally, a morpheme is a minimum unit having some meaning as a language, and may be of a type wherein it solely configures a word, another type wherein it configures a word by a combination with another morpheme or a further type wherein it does not solely configure a word nor configure by a combination with another morpheme.

Also word dictionary data indicative of a particular word of a part of speech like a noun or a verb is stored in advance in the dictionary storage section 84.

Therefore, if the main controlling section 80 stores laid-open information of a user in an associated relationship with laid-open date and time of the laid-open information as personal information into the personal information storage section 83, then it reads out morpheme dictionary data and word dictionary data from the dictionary storage section 84.

Then, the main controlling section 80 uses the morpheme dictionary data and the word dictionary data to execute a natural language process of laid-open information.

When the main controlling section 80 executes the natural language process, it carries out a morpheme analysis of the laid-open information, that is, a character string, based on the morpheme dictionary data.

Consequently, the main controlling section 80 delimits the laid-open information into a plurality of morphemes and specifies the part of speech of each of the morphemes.

Further, the main controlling section 80 carries out a word analysis of the laid-open information based on a result of the morpheme analysis of the laid-open information and the word dictionary data.

The main controlling section 80 thereby discriminates one or a plurality of morphemes which configure a predetermined word of such a part of speech as a noun or a verb from among the plural morphemes of the laid-open information.

Further, the main controlling section 80 carries out a syntax analysis of the laid-open information based on results of the morpheme analysis and the word analysis of the laid-open information.

Consequently, the main controlling section 80 specifies a grammatical role of each morpheme included in the laid-open information and specifies dependency of the morpheme with respect to another morpheme.

Furthermore, the main controlling section 80 extracts, from within the laid-open information, one or a plurality of laid-open substance keywords which represent the substance of the laid-open information based on results of the morpheme analysis, word analysis and syntax analysis of the laid-open information.

Then, the main controlling section 80 determines the one or plural laid-open substance keywords extracted from the laid-open information as additional information to the personal information of the user and adds the laid-open substance keywords in an associated relationship with the laid-open information and the laid-open date and time into the personal information of the user.

In this manner, the main controlling section 80 can suitably update the personal information of the user after the user of the photograph image displaying apparatus 11 is registered.

The main controlling section 80 can similarly carry out user registration also of some different person including an acquaintance of the user than the user of the photograph image displaying apparatus 11 and can suitably update the personal information of the different person after the user registration.

Incidentally, every time a sound file in which sound data is stored is received for distribution, for example, from a sound data production company, the main controlling section 80 stores the sound file into a sound storage section 85. Consequently, the main controlling section 80 accumulates a plurality of sound data for distribution as a sound file in the sound storage section 85.

The main controlling section 80 stores also page image data of a sound purchase page image in the sound storage section 85. Therefore, when the main controlling section 80 receives page image request data transmitted from the photograph image displaying apparatus 11 successively through the network interface 81 and the communication controlling section 82, it reads out the page image data from the sound storage section 85.

Then, the main controlling section 80 transmits the page image data to the photograph image displaying apparatus 11 successively through the communication controlling section 82 and the network interface 81.

Then, if the main controlling section 80 receives purchase request data transmitted from the photograph image displaying apparatus 11 successively through the network interface 81 and the communication controlling section 82, then it executes an accounting process for the sound data whose purchase request is received from the user based on the purchase request data.

Then, after the accounting process is completed, the main controlling section 80 reads out a sound file of the sound data requested for purchase by the user from the sound storage section 85 and transmits the sound file to the photograph image displaying apparatus 11 successively through the communication controlling section 82 and the network interface 81.

In this manner, the main controlling section 80 can sell various sound data to the user of the photograph image displaying apparatus 11 in a manner similar to that of distribution.

Incidentally, if the main controlling section 80 receives person information request data transmitted from the photograph image displaying apparatus 11 successively through the network interface 81 and the communication controlling section 82, then it discriminates with regard to what number of specified persons person discrimination information is stored in the person information request data.

If person discrimination information with regard to one specified person is stored in the person information request data, then the main controlling section 80 discriminates, from the person discrimination information, personal information of the one specified person and reads out provision person information which is part of the personal information from the personal information storage section 83.

Then, the main controlling section 80 creates provision person information data in which the provision person information of the one specified person is stored and transmits the created provision person information data to the photograph image displaying apparatus 11 successively through the communication controlling section 82 and the network interface 81.

On the other hand, if person discrimination information with regard to a plurality of specified persons is stored in the person information request data, then the main controlling section 80 discriminates, from the person discrimination information, personal information of the plural specified persons and reads out provision person information which is part of the personal information from the personal information storage section 83.

Thereupon, the main controlling section 80 reads out personal information indicative of the owned number by kind for each kind of sound data of all of the users including the user and the acquaintances having user registrations up to the present time from the personal information storage section 83.

Further, the main controlling section 80 uses the owned number by kind for each kind of sound data for all users to calculate an average owned number by kind for each kind of sound data.

Thus, the main controlling section 80 creates provision person information data in which the provision person information of the plural specified persons is stored together with the average owned number information by kind indicative of average owned numbers by kind for the different kinds of sound data.

Then, the main controlling section 80 transmits the created provision person information data to the photograph image displaying apparatus 11 successively through the communication controlling section 82 and the network interface 81.

In this manner, when provision person information is requested from the photograph image displaying apparatus 11, the main controlling section 80 can provide the provision person information as provision person information data to the photograph image displaying apparatus 11 in accordance with the request.

Further, the main controlling section 80 stores present weather information wherein the address of the user and the weather at present in the proximity of the address are associated with the user identification information of the user in a present information storage section 86.

Then, the main controlling section 80 periodically acquires weather information indicative of the weather, for example, in the whole country from the outside and suitably updates the weather at present indicated by the present weather information in the present information storage section 86 based on the acquired weather information.

Further, the main controlling section 80 periodically aggregates the distribution number of sound data of a distribution object and creates ranking information indicative of ranking of a predetermined number of comparatively higher ranks from among a number of distributions at present.

Then, the main controlling section 80 stores the ranking information into the present information storage section 86 such that, every time the distribution number of sound data of a distribution object is aggregated, the ranking information in the present information storage section 86 is updated to the latest ranking information.

Further, the main controlling section 80 acquires recommendation information provided from the outside and indicative of sound data recommended, for example, by a management company of the information providing apparatus 13 and stores the acquired recommendation information into the present information storage section 86.

Then, every time recommendation information is provided, the main controlling section 80 acquires the recommendation information and updates the recommendation information in the present information storage section 86 with the acquired recommendation information.

Therefore, if present information request data transmitted from the photograph image displaying apparatus 11 is received successively through the network interface 81 and the communication controlling section 82, then the main controlling section 80 takes out, from the present information request data, the user identification information of the user stored in the present information request data.

Further, the main controlling section 80 reads out, based on the user identification information, the present weather information identified from the user identification information from the present information storage section 86.

Further, the main controlling section 80 thereupon reads out also the ranking information and the recommendation information from the present information storage section 86. Furthermore, the main controlling section 80 creates present information provision data in which the present weather information, ranking information and recommendation information are stored as present information.

Then, the main controlling section 80 transmits the present information provision data to the photograph image displaying apparatus 11 through the communication controlling section 82 and the network interface 81.

In this manner, if present information is requested from the photograph image displaying apparatus 11, then the main controlling section 80 can provide the present information as present information provision data to the photograph image displaying apparatus 11 in accordance with the request.

Incidentally, if a sound file is received for distribution from a production company of sound data, then the main controlling section 80 receives also text data of words of sound such as lyrics, script or read statement from the production company.

Therefore, the main controlling section 80 stores the text data in an associated relationship with the sound file into the sound storage section 85.

Then, for example, when the sound file and the text data are stored into the sound storage section 85, the main controlling section 80 reads out the text data from the sound storage section 85 together with the sound file. Further, the main controlling section 80 takes out the sound data and the attribute information from the sound file.

Thereupon, the main controlling section 80 carries out a natural language process for the text data similarly as described above. Then, the main controlling section 80 extracts one or a plurality of sound substance keywords which represent the substance of sound (words) from the text data based on a processing result of the natural language process, that is, a result of a morpheme analysis, a word analysis and a syntax analysis of the text data.

Further, the main controlling section 80 carries out a similar natural language process for the title of the sound data included as attribute information and extracts one or a plurality of sound substance keywords from the title based on a result of the analysis.

In addition, the main controlling section 80 carries out a frequency analysis of the sound data to divide the sound data into predetermined unit process parts, for example, parts corresponding to sound for one second, along the time axis.

Further, the main controlling section 80 extracts energy of each frequency band corresponding to 12-tone of one octave from each unit process part of the sound data.

After energy of each frequency band is extracted over the overall sound data, the main controlling section 80 extracts such information as a chord, a tempo and so forth in the sound from the sound data based on a result of the extraction.

Further, the main controlling section 80 creates, based on a result of the detection, characteristic values in a plurality of items (hereinafter referred to as characteristic items) numerically representative of characteristics of the sound.

For example, the characteristic items representative of characteristics of sound data may include "lively," "happy,"

"sad," "bright," "delightful," "fresh" and so forth which represent impressions of sound based on the sound data.

If the main controlling section 80 analyzes characteristics of sound based on the sound data to obtain characteristic values of the individual characteristic items, then it compares the characteristic values of the individual characteristic items individually with lower threshold values and upper threshold values selected in advance.

Then, the main controlling section 80 selects, based on a result of the comparison and selection conditions of the characteristic items selected in advance for the individual characteristic items, those characteristic items which satisfy the selection conditions.

Incidentally, as a selection condition of a characteristic item, a condition that, for example, when a characteristic value equal to or higher than the lower threshold value therefor is obtained, the characteristic item is selected may be available.

Meanwhile, as another selection condition of a characteristic item, a condition that, when a characteristic value lower than the upper threshold value therefor is obtained, the characteristic item is selected may be available. As further selection condition of a characteristic item, a condition that, when a characteristic value equal to or higher than the lower threshold value therefor and lower than the upper threshold value therefor is obtained, the characteristic item is selected may be available.

Then, the main controlling section 80 determines a characteristic or characteristics represented by one or a plurality of characteristic items selected in this manner, that is, text data representing impressions of the sound, as sound impression keywords which precisely represent impressions of the sound based on the sound data.

In this manner, the main controlling section 80 analyzes sound data and extracts one or a plurality of sound impression keywords representative of impressions of sound from the sound data based on a result of the analysis.

Further, the main controlling section 80 thereupon adds such one or a plurality of sound substance keywords or one or a plurality of sound impression keywords to the attribute information of the sound data to create attribute information for provision to the photograph image displaying apparatus 11. Then, the main controlling section 80 signals and stores the attribute information for provision to and into the sound storage section 85.

In this instance, if the main controlling section 80 receives attribute information request data transmitted from the photograph image displaying apparatus 11 successively through the network interface 81 and the communication controlling section 82, then it reads out a plurality of pieces of the attribute information for provision from the sound storage section 85 in response to the attribute information request data.

The main controlling section 80 creates attribute information provision data in which a plurality of pieces of the attribute information for provision are stored and signals the created attribute information provision data to the photograph image displaying apparatus 11 successively through the communication controlling section 82 and the network interface 81.

In this manner, if attribute information of a plurality of sound data is requested from the photograph image displaying apparatus 11, then the main controlling section 80 provides the plural pieces of attribute information as attribute information provision data to the photograph image displaying apparatus 11 in accordance with the request.

Further, if the main controlling section 80 receives sound request data transmitted from the photograph image displaying apparatus 11 successively through the network interface 81 and the communication controlling section 82, then it reads out searched-out sound data identified with the searched-out sound attribute information in the sound request data from the sound storage section 85.

Then, the main controlling section 80 transmits the searched-out sound data in a streaming format to the photograph image displaying apparatus 11 successively through the communication controlling section 82 and the network interface 81.

In this manner, if a request for streaming reproduction of searched-out sound data is received from the photograph image displaying apparatus 11 during display of a specified person photograph image or a specified object photograph image, then the main controlling section 80 can provide the searched-out sound data in a streaming format to the photograph image displaying apparatus 11.

2-4. Image and Sound Reproduction Processing Procedure

Now, an image and sound reproduction processing procedure RT1 executed by the main controlling section 20 of the photograph image displaying apparatus 11 is described with reference to flow charts shown in FIGS. 26 to 34.

Figure 26:
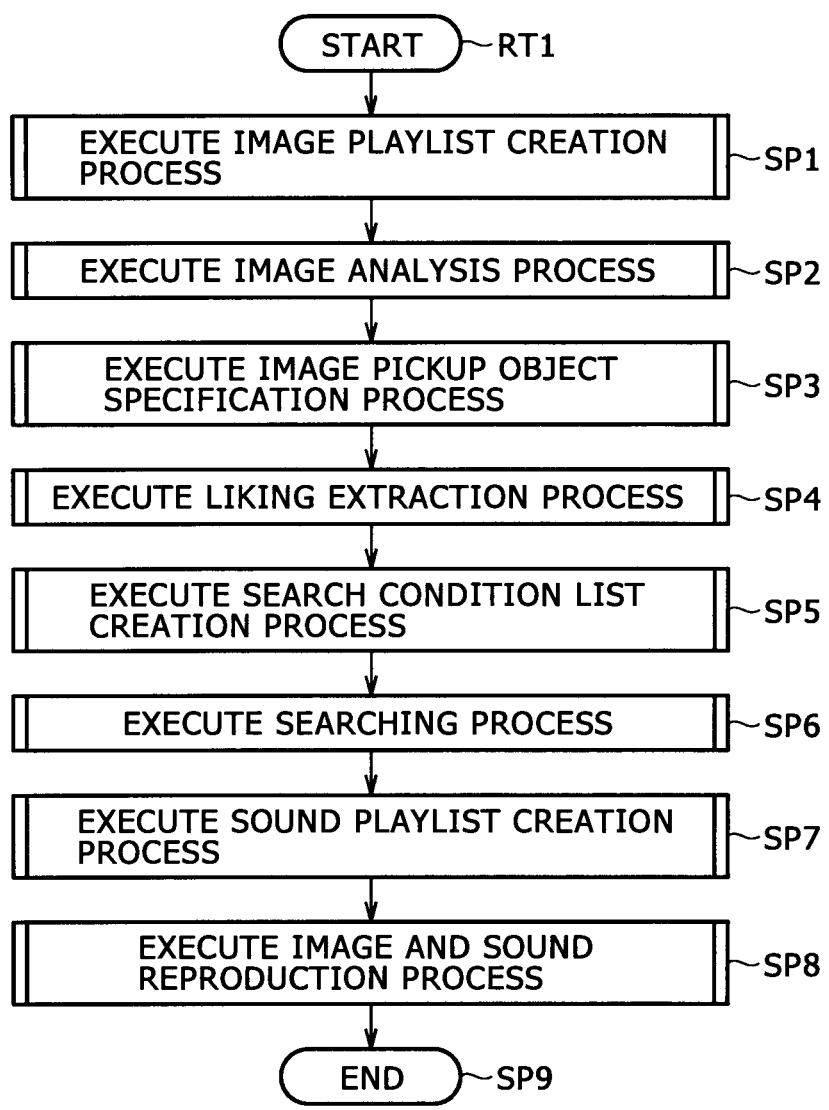
FIG. 26 is a flow chart illustrating an image and sound reproduction processing procedure.

If the main controlling section 20 enters the image and sound reproduction mode in response to an instruction of the user, then it starts the image and sound reproduction processing procedure RT1 illustrated in FIG. 26.

After the image and sound reproduction processing procedure RT1 is started, the main controlling section 20 executes an image playlist creation process at step SP1 and then advances its processing to step SP2.

At step SP2, main controlling section 20 executes an image analysis process. Then, the main controlling section 20 advances the processing to step SP3, at which it executes an image pickup object specification process, whereafter it advances the processing to step SP4.

At step SP4, the main controlling section 20 executes a liking extraction process. Then, the main controlling section 20 advances the processing to step SP5, at which it executes a search condition list creation process, and then advances the processing to step SP6.

At step SP6, the main controlling section 20 executes the search process. Then, the main controlling section 20 advances the processing to step SP7, at which it executes a sound playlist creation process, and then advances the processing to step SP8.

At step SP8, the main controlling section 20 executes an image and sound reproduction process. Then, the processing advances to step SP9, at which the main controlling section 20 ends the image and sound reproduction processing procedure RT1.

Figure 27:
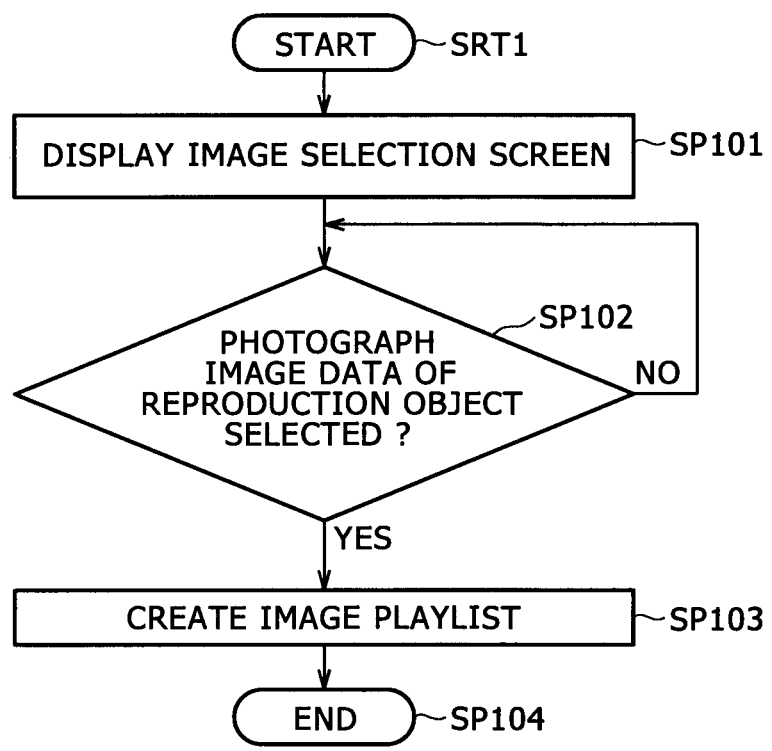
FIG. 27 is a flow chart illustrating an image playlist creation processing subroutine.

Actually, when the main controlling section 20 executes the image playlist creation process at step SP1, it starts an image playlist creation processing subroutine SRT1 illustrated in FIG. 27.

After the image playlist creation processing subroutine SRT1 is started, the main controlling section 20 displays an image selection screen on the display section 25 at step SP101, and then advances the processing to step SP102.

At step SP102, the main controlling section 20 waits that photograph image data of a reproduction object is selected on the image selection screen through the operation section 23 by the user. Then, after one or a plurality of photograph image data of the reproduction object are selected, the processing advances to step SP103.

At step SP103, the main controlling section 20 creates a image playlist 26 in which the one or plural photograph image data of the reproduction object selected by the user are registered. Then, the processing advances to step SP104.

At step SP104, the main controlling section 20 ends the image playlist creation processing subroutine SRT1 and advances the processing to step SP2 described hereinabove with reference to FIG. 26.

Figure 28:
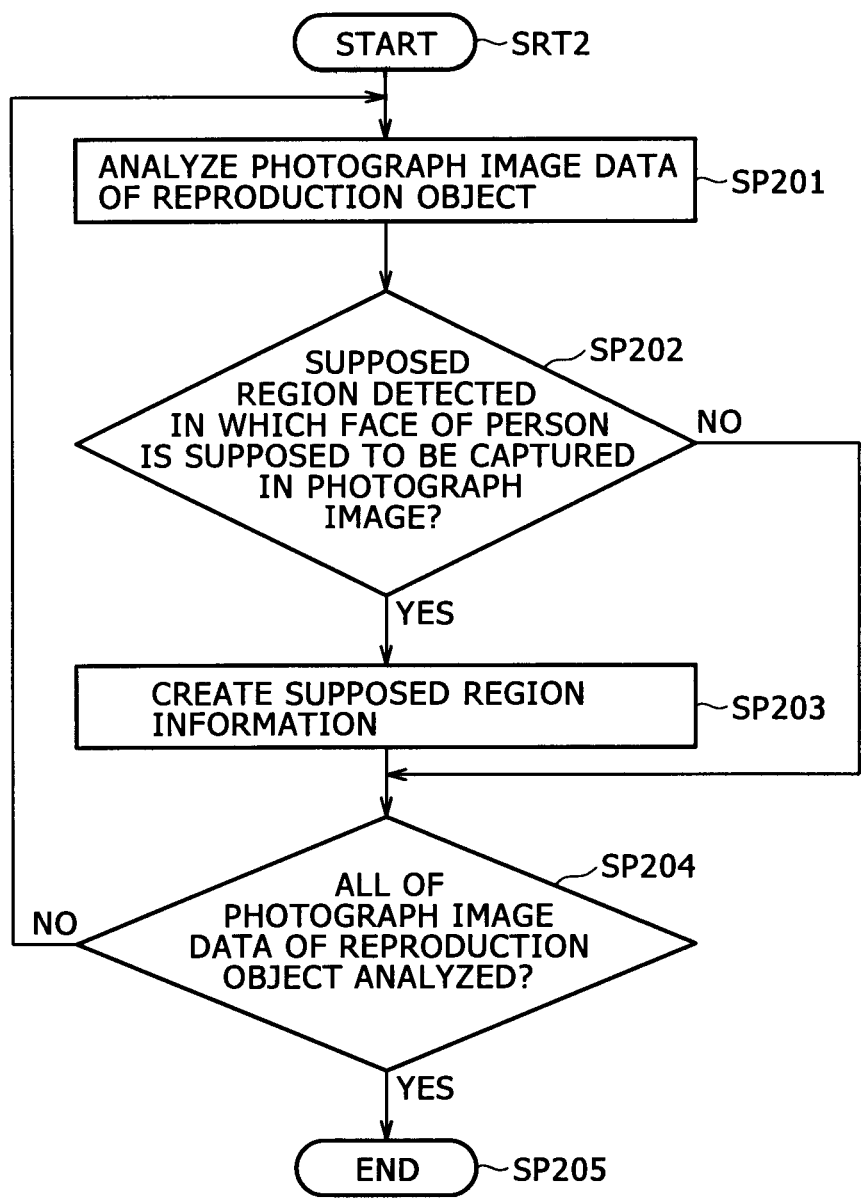
FIG. 28 is a flow chart illustrating an image analysis processing subroutine.

When the main controlling section 20 executes the image analysis process at step SP2, it controls the image analysis section 34 to start an image analysis processing subroutine SRT2 illustrated in FIG. 28.

After the image analysis section 34 starts the image analysis processing subroutine SRT2 under the control of the main controlling section 20, it analyzes photograph image data of a reproduction object at step SP201 and then advances its processing to step SP202.

At step SP202, the image analysis section 34 discriminates based on a result of the analysis of the photograph image data whether or not a supposed region in which it is supposed that the face of a person is captured in a photograph image based on the photograph image data is detected.

If an affirmative result is obtained at step SP202, then this represents that there is the possibility that the face of one or a plurality of persons may be captured in the photograph image. If such an affirmative result is obtained at step SP202, then the image analysis section 34 advances the processing to step SP203.

At step SP203, the main controlling section 20 creates supposed region information in which the supposed region characteristic amounts of the supposed region detected in the photograph image and the region position information are associated with each other. Then, the processing advances to step SP204.

Incidentally, if a negative result is obtained at step SP202 described hereinabove, then this represents that the face of a person is not captured in the photograph image. If such a negative result is obtained at step SP202, then the image analysis section 34 advances the processing to step SP204.

At step SP204, the image analysis section 34 discriminates whether or not all of the photograph image data of the reproduction object are analyzed. If photograph image data which is not analyzed as yet remains, then the processing returns to step SP201.

Therefore, the image analysis section 34 thereafter executes the processes at steps SP201 to SP204 cyclically and repetitively until after an affirmative result is obtained at step SP204.

Consequently, the image analysis section 34 thereupon analyzes the plural photograph image data of the reproduction objects selected by the user successively to suitably detect a supposed region in the photograph image.

If an affirmative result is obtained at step SP204, then this represents that the analysis of all of the one or plural photograph image data of the reproduction object is completed.

If such an affirmative result is obtained at step SP204, then the image analysis section 34 advances the processing to step SP205, at which the image analysis processing subroutine SRT2 is ended. Consequently, the main controlling section 20 advances the processing to step SP3 described hereinabove with reference to FIG. 26.

Figure 29:
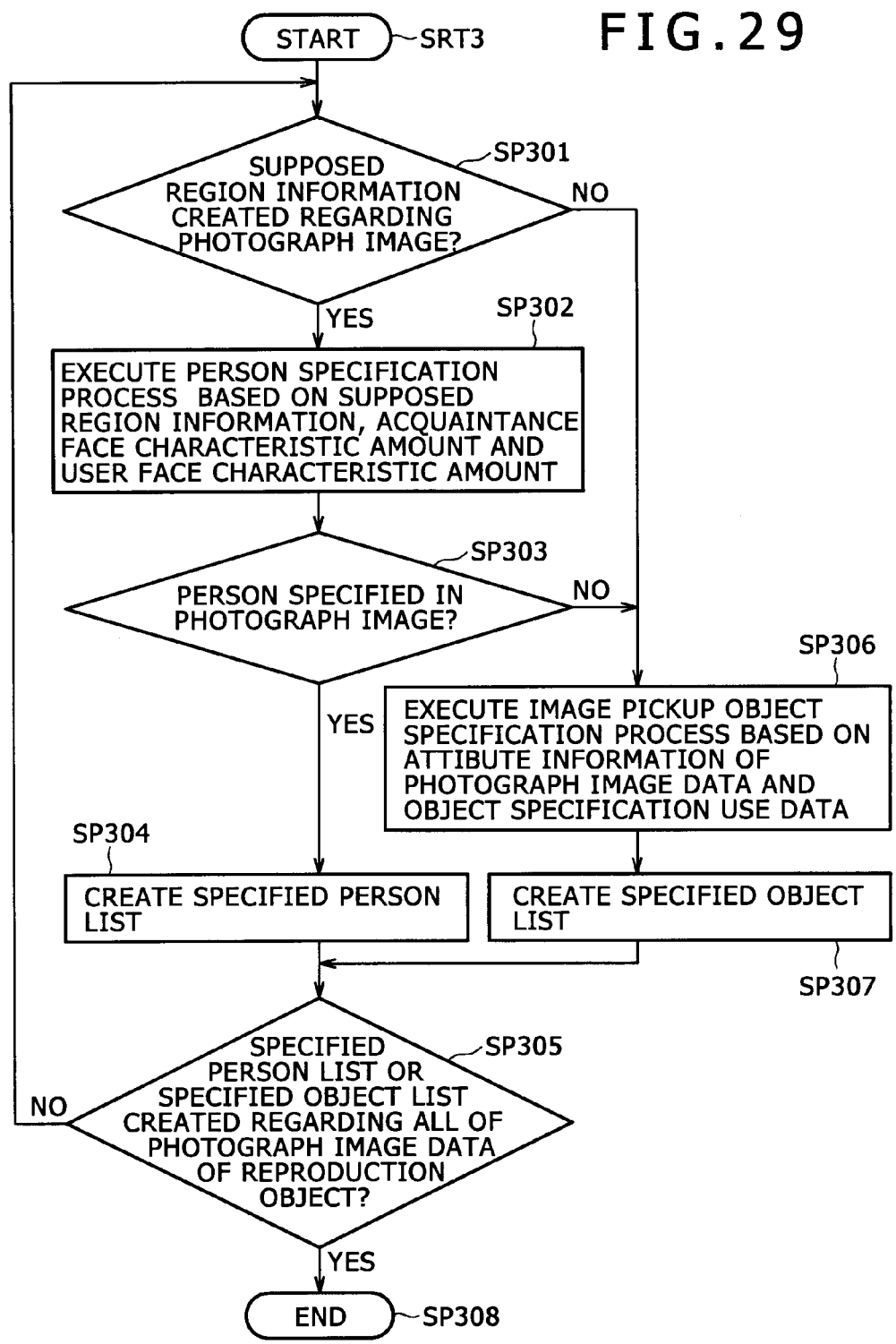
FIG. 29 is a flow chart illustrating an image pickup object specification processing subroutine.

When the image pickup object specification process is executed at step SP3, the main controlling section 20 controls the person specification section 36 to start an image pickup object specification processing subroutine SRT3 illustrated in FIG. 29.

After the image pickup object specification processing subroutine SRT3 is started, the person specification section 36 first discriminates at step SP301 whether or not supposed region information is created in regard to one photograph image data of a reproduction object by the image analysis section 34.

If an affirmative result is obtained at step SP301, then this represents that one or a plurality of supposed regions are detected in a photograph image based on the photograph image data of the reproduction object and are received from the image analysis section 34. If such an affirmative result is obtained at step SP301, then the person specification section 36 advances its processing to step SP302.

At step SP302, the person specification section 36 executes a person specification process based on the information of the one or plural supposed regions, acquaintance face characteristic amounts and user face characteristic amounts.

The person specification section 36 thereby calculates the degree of certainty representative of to which degree the face of a person supposed to be captured in the one or plural supposed regions of the photograph image is probable as the face of an acquaintance or the user. Then, the processing advances to step SP303.

At step SP303, the person specification section 36 discriminates whether or not one or a plurality of persons are successfully specified in the photograph image based on a result of the person specification process, that is, based on the degree of certainty.

If an affirmative result is obtained at step SP303, then this represents that the one or plural persons captured in the photograph image are successfully specified as an acquaintance or the user based on the face captured in the one or plural supposed regions of the photograph image. If such an affirmative result is obtained at step SP303, then the person specification section 36 advances the processing to step SP304.

At step SP304, the person specification section 36 creates a specified person list 40 in which the one or plural specified persons specified in the photograph image are registered, and then advances the processing to step SP305.

On the other hand, if a negative result is obtained at step SP301 described hereinabove, then this represents that supposed region information is not received from the image analysis section 34 because a supposed region is not detected in the photograph image. If such a negative result is obtained at step SP301, then the person specification section 36 advances the processing to step SP306.

Further, if a negative result is obtained at step SP303 described hereinabove, then this represents that the face supposed to be captured in the one or plural supposed regions of the photograph image is not the face of any acquaintance or the user. Also when a negative result is obtained at step SP303, the person specification section 36 advances the processing to step SP306.

At step SP306, the person specification section 36 executes an image pickup object specification process based on the attribute information of the photograph image data of the reproduction object and the object specification use data to specify an image pickup object captured in the photograph image based on the photograph image data. Thereafter, the processing advances to step SP307.

At step SP307, the person specification section 36 creates a specified object list 42 in which the specified image pickup object specified in the photograph image is registered. Then, the processing advances to step SP305.

At step SP305, the person specification section 36 discriminates whether or not an image pickup object captured in the photograph image is specified in all of the photograph image data of the reproduction object, that is, whether or not a specified person list 40 or a specified object list 42 is created.

If a result of the discrimination indicates that photograph image data from which an image pickup object captured in the photograph image is not specified, that is, from which a specified person list 40 or a specified object list 42 is not created, remains, then the person specification section 36 returns the processing to step SP301.

Therefore, the person specification section 36 thereafter executes the processes at steps SP301 to SP307 cyclically and repetitively until after an affirmative result is obtained at step SP305.

Consequently, the person specification section 36 thereupon executes the person specification process and/or the image pickup object specification process successively using a plurality of photograph image data of the reproduction object selected by the user.

As a result, the person specification section 36 specifies an image pickup object captured in photograph images based on the plural photograph image data of the reproduction object to suitably create a specified person list 40 or a specified object list 42.

If an affirmative result is obtained at step SP305, then this represents that the specification of an image pickup object captured in the photograph image is completed with regard to all of the one or plural photograph image data of the reproduction object.

Thus, such an affirmative result as mentioned above represents that a specified person list 40 or a specified object list 42 is created with regard to all of the one or plural photograph image data of the reproduction object.

If such an affirmative result is obtained at step SP305, then the person specification section 36 advances the processing to step SP308, at which the image pickup object specification processing subroutine SRT3 is ended. Consequently, the main controlling section 20 advances the processing to step SP4 described hereinabove with reference to FIG. 26.

Figure 30:
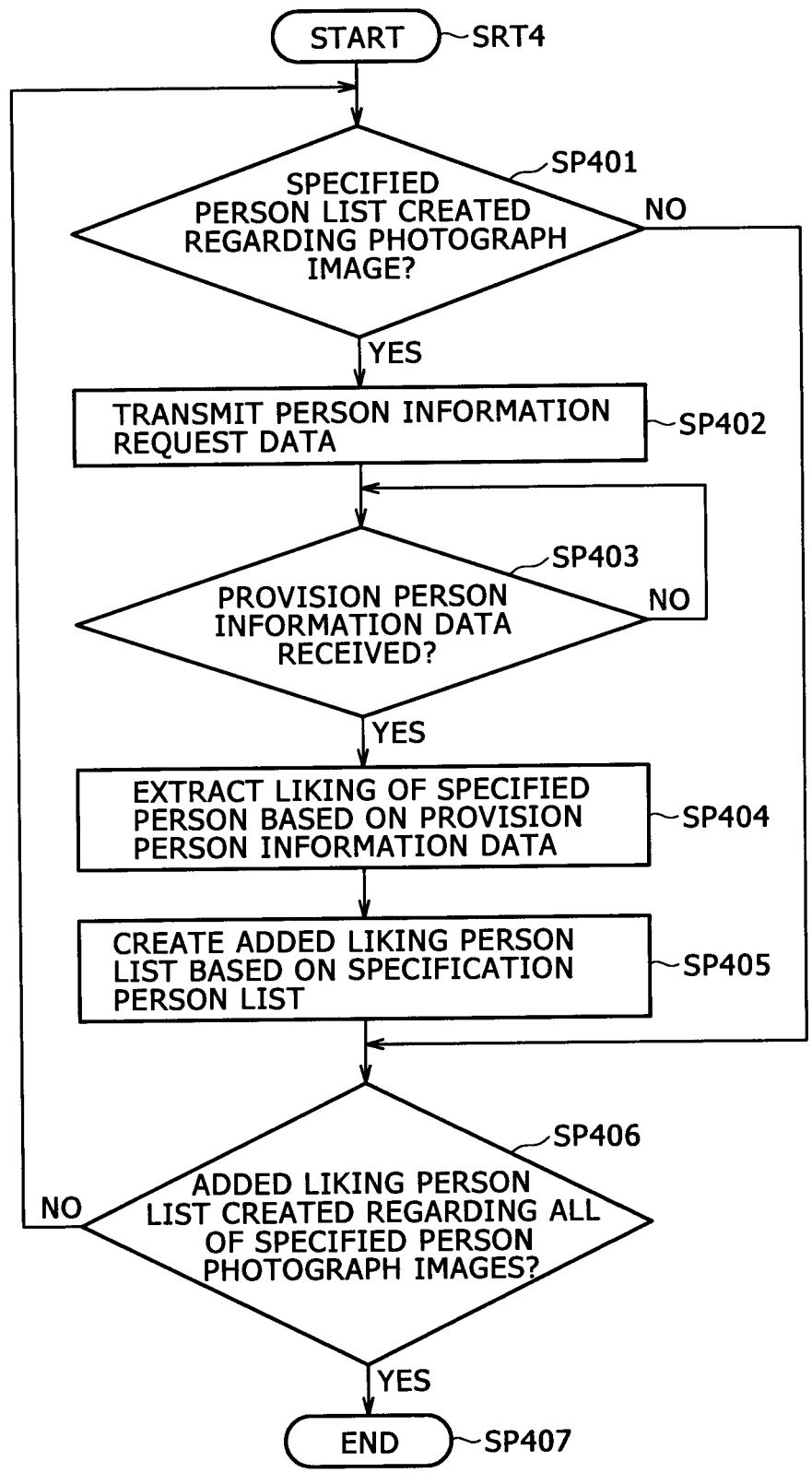
FIG. 30 is a flow chart illustrating a liking extraction processing subroutine.

When the main controlling section 20 executes the liking extraction process at step SP4, it controls the liking extraction section 41 to start a liking extraction processing subroutine SRT4 illustrated in FIG. 30.

After the liking extraction processing subroutine SRT4 is started, the liking extraction section 41 discriminates at step SP401 whether or not a specified person list 40 is created with regard to one photograph image data of a reproduction object by the person specification section 36.

If an affirmative result is obtained at step SP401, then this represents that one or a plurality of persons are specified in the photograph image based on the photograph image data of the reproduction object and a specified person list 40 is received from the person specification section 36. If such an affirmative result is obtained at step SP401, then the processing advances to step SP402.

At step SP402, the liking extraction section 41 transmits person information request data to the information providing apparatus 13 through the main controlling section 20. Then, the processing advances to step SP403.

At step SP403, the liking extraction section 41 waits that provision person information data transmitted back from the information providing apparatus 13 in response to the transmission of the person information request data is received by the main controlling section 20.

Then, if provision person information data is received by the main controlling section 20 and then acquired from the main controlling section 20, then the liking extraction section 41 advances the processing to step SP404.

At step SP404, the liking extraction section 41 extracts a liking of one or a plurality of specified persons specified in the photograph image based on the provision person information data. Then, the processing advances to step SP405.

At step SP405, the liking extraction section 41 adds the liking information indicative of the liking of the one or plural specified persons to the specified person list 40 to create an added liking person list 43. Then, the processing advances to next step SP406.

Incidentally, if a negative result is obtained at step SP401 described hereinabove, then this represents that a specified person list 40 is not received from the person specification section 36 because an image pickup object is not specified in the photograph image based on the photograph image data of the reproduction object. If such a negative result is obtained at step SP401, then the liking extraction section 41 advances the processing to step SP406.

At step SP406, the liking extraction section 41 discriminates whether or not a liking of all specified persons specified in the one or plural specified person photograph images is extracted, that is, whether or not an added liking person list 43 is created with regard to all of the specified person photograph images.

If it is discriminated at step SP406 that a specified person photograph image in which a specified person with regard to which a liking is not extracted remains, that is, a specified person photograph image with regard to which an added liking person list 43 is not created as yet remains, then the liking extraction section 41 returns the processing to step SP401.

Therefore, the liking extraction section 41 thereafter executes the processes at steps SP401 to SP406 cyclically and repetitively until after an affirmative result is obtained at step SP406.

The liking extraction section 41 thereby extracts a liking of the specified persons with regard to the plural specified person photograph images to create an added liking person list 43.

If an affirmative result is obtained at step SP406, then this represents that a liking of a specified person is extracted to create an added liking person list 43 completely with regard to all of the one or plural specified person photograph images.

If such an affirmative result is obtained at step SP406, then the liking extraction section 41 advances the processing to step SP407, at which it ends the liking extraction processing subroutine SRT4. The main controlling section 20 thereafter advances the processing to step SP5 described hereinabove with reference to FIG. 26.

Figure 31:
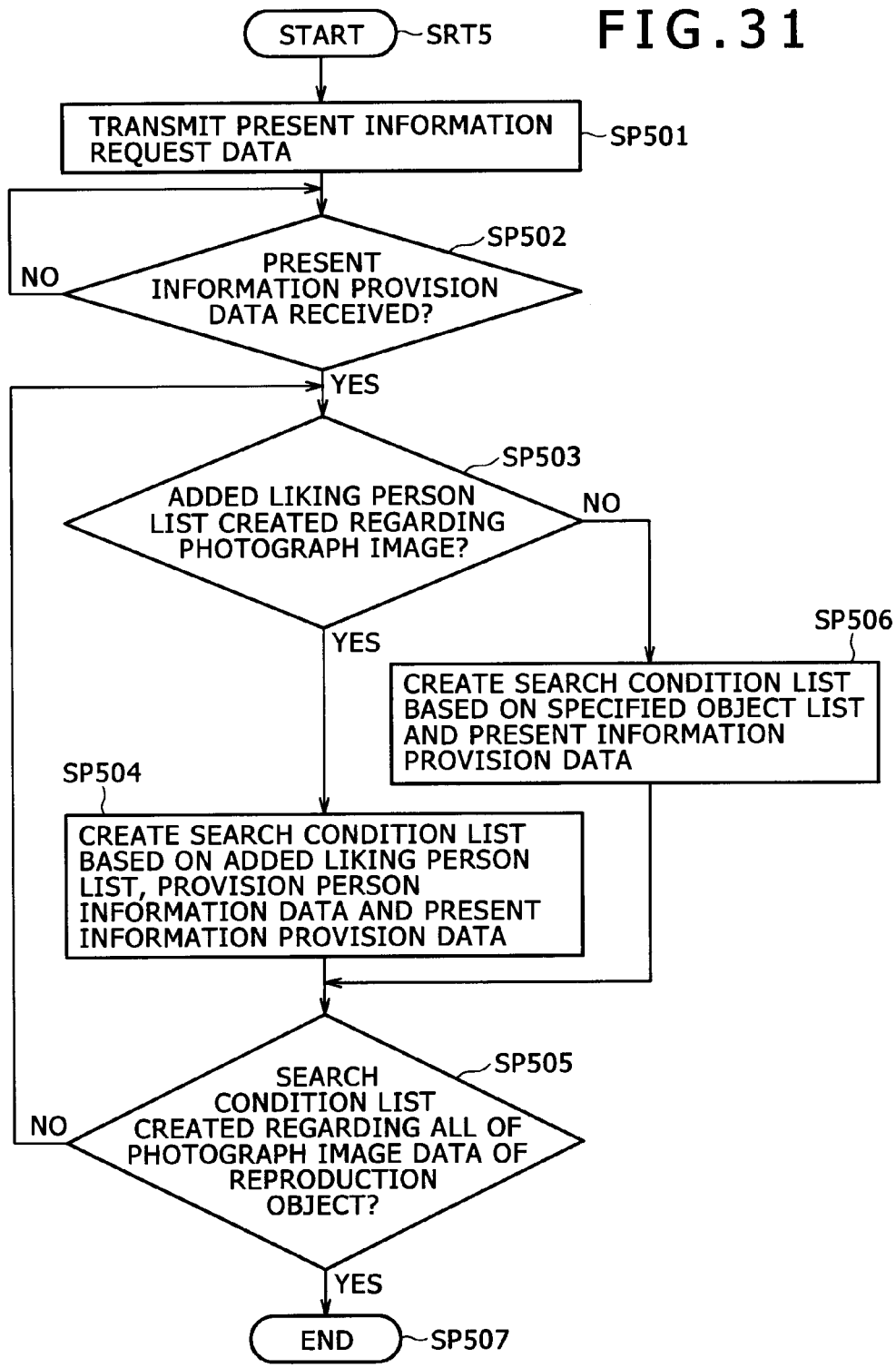
FIG. 31 is a flow chart illustrating a search condition list creation processing subroutine.

Then, when the main controlling section 20 executes the search condition list creation process at step SP5, it controls the searching section 45 to start a search condition list creation processing subroutine SRT5 illustrated in FIG. 31.

After the search condition list creation processing subroutine SRT5 is started, the searching section 45 transmits present information request data to the information providing apparatus 13 through the main controlling section 20 at step SP501 and then advances its processing to step SP502.

At step SP502, the searching section 45 waits that present information provision data sent back from the information providing apparatus 13 in response to the transmission of the present information request data is received by the main controlling section 20.

If present information provision data is received by the main controlling section 20 and is then acquired from the main controlling section 20, then the searching section 45 advances the processing to step SP503.

At step SP503, the searching section 45 discriminates whether or not an added liking person list 43 is created with regard to one photograph image data of the reproduction object by the liking extraction section 41.

If an affirmative result is obtained at step SP503, then this represents that a liking of one or a plurality of specified persons is extracted from the liking extraction section 41 and an added liking person list 43 is received. If such an affirmative result is obtained at step SP503, then the searching section 45 advances the processing to step SP504.

At step SP504, the searching section 45 creates a search condition list 46A or 46B based on the added liking person list 43, provision person information data and present information provision data. Then, the processing advances to step SP505.

Incidentally, if a negative result is obtained at step SP503 described above, then this represents that a specified object list 42 is received from the liking extraction section 41. If such a negative result is obtained at step SP503, then the searching section 45 advances the processing to step SP506.

Then at step SP506, the searching section 45 creates a search condition list 46C based on the specified object list 42 and the present information provision data. Then, the processing advances to step SP505.

At step SP505, the searching section 45 discriminates whether or not a search condition list 46 is created with regard to all of the photograph image data of the reproduction object.

Then, if it is discriminated at step SP505 that photograph image data with regard to which a search condition list 46 is not created as yet remains, then the searching section 45 returns the processing to step SP503.

Consequently, the searching section 45 thereafter executes the processes at steps SP503 to SP506 cyclically and repetitively until after an affirmative result is obtained at step SP505. The searching section 45 thereby creates a search condition list 46 with regard to the plural photograph image data of the reproduction object.

On the other hand, if an affirmative result is obtained at step SP505, then this represents that a search condition list 46 is created completely with regard to all of the one or plural photograph image data of the reproduction object.

If such an affirmative result is obtained at step SP505, then the searching section 45 advances the processing to step SP507, at which it ends the search condition list creation processing subroutine SRT5. The main controlling section 20 thereafter advances the processing to step SP6 described hereinabove with reference to FIG. 26.

Figure 32:
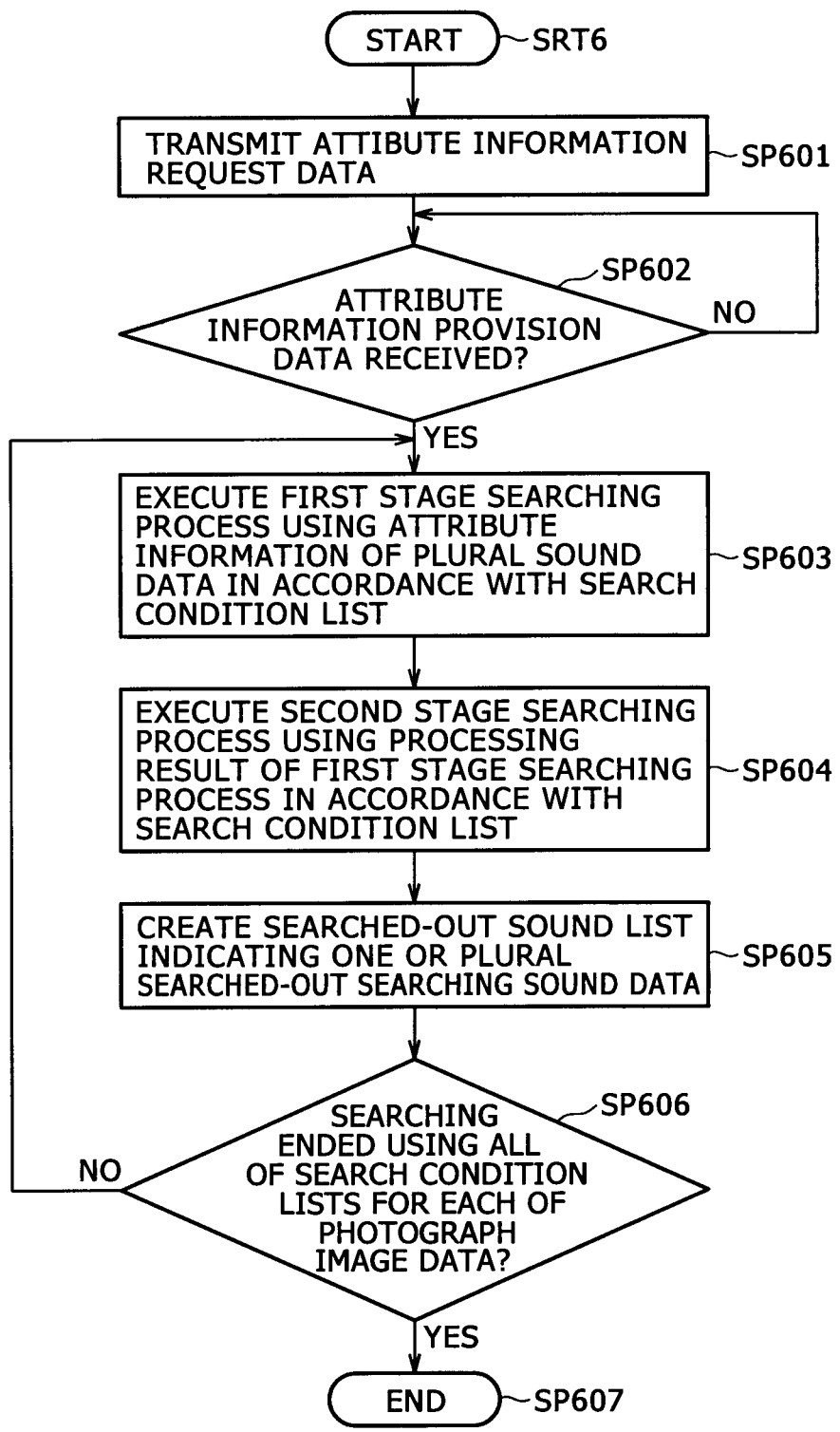
FIG. 32 is a flow chart illustrating a searching processing subroutine.

Then, when the main controlling section 20 executes the search process at step SP6, it controls the searching section 45 to start a searching process subroutine SRT6 illustrated in FIG. 32.

After the searching process subroutine SRT6 is started, the searching section 45 transmits attribute information request data to the information providing apparatus 13 through the main controlling section 20 at step SP601 and then advances its processing to step SP602.

At step SP602, the searching section 45 waits that attribute information provision data sent back from the information providing apparatus 13 in response to the transmission of the attribute information request data is received by the main controlling section 20.

Then, if attribute information provision data is received by the main controlling section 20 and then acquired from the main controlling section 20, then the searching section 45 advances the processing to step SP603.

At step SP603, the searching section 45 executes the first stage searching process using the attribute information of the plural sound data in accordance with the one or plural search condition lists 46 created with regard to one photograph image data of the reproduction object. Then, the processing advances to step SP604.

At step SP604, the searching section 45 executes the second stage searching process using a result of the processing by the first stage searching process in accordance with the one or plural search condition lists 46 created with regard to one photograph image data of the reproduction object. Then, the processing advances to step SP605.

At step SP605, the searching section 35 creates a searched-out sound list 47 indicative of one or a plurality of searched-out sound data searched through successive execution of the first stage searching process and the second stage searching process. Then, the processing advances to step SP606.

At step SP606, the searching section 45 discriminates whether or not the search of searched-out sound data is completed using all of the one or plural search condition lists 46 created individually for the photograph image data of the reproduction object.

If it is discriminated at step SP606 that a search condition list 46 which is not used for search remains in the one or plural search condition lists 46 created for the individual photograph image data of the reproduction object, then the processing returns to step SP603.

Consequently, the searching section 45 thereafter executes the processes at steps SP603 to SP606 cyclically and repetitively until after an affirmative result is obtained at step SP606.

Consequently, the searching section 45 creates a searched-out sound list 47 for each of the photograph image data of the reproduction object using all of the one or plural search condition lists 46 created for the individual photograph image data of the reproduction object.

On the other hand, if an affirmative result is obtained at step SP606, then this represents that a searched-out sound list 47 is created completely with regard to all of the one or plural photograph image data of the reproduction object.

If such an affirmative result is obtained at step SP606, then the searching section 45 advances the processing to step SP607, at which it ends the searching process subroutine SRT6. Then, the main controlling section 20 advances the processing to step SP7 described hereinabove with reference to FIG. 26.

Figure 33:
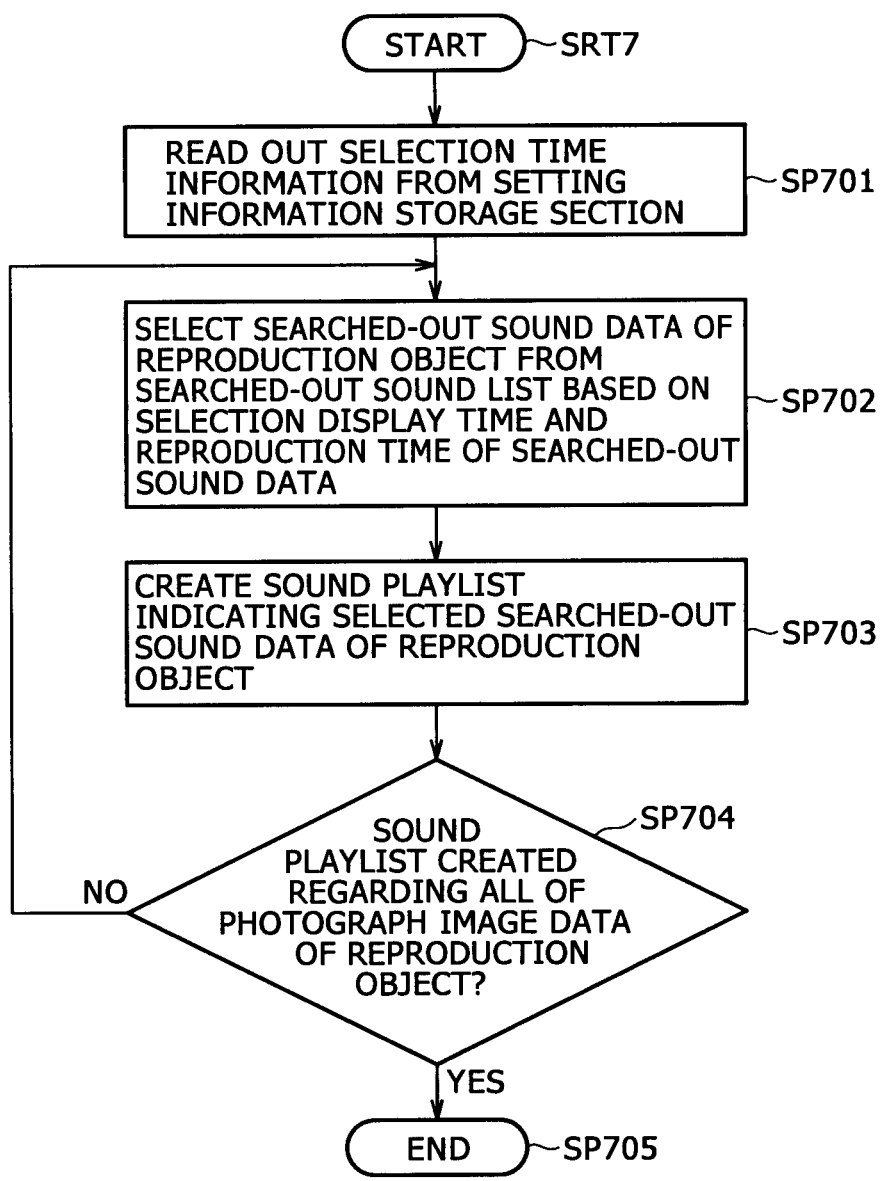
FIG. 33 is a flow chart illustrating a sound playlist creation processing subroutine.

Further, when the sound playlist creation process is executed at step SP7, the main controlling section 20 controls the playlist creation section 50 to start a sound playlist creation processing subroutine SRT7 illustrated in FIG. 33.

After the sound playlist creation processing subroutine SRT7 is started, the playlist creation section 50 reads out selection time information indicative of selection display time from the setting information storage section 27 at step SP701 and the advances its processing to step SP702.

At step SP702, the playlist creation section 50 selects one or a plurality of searched-out sound data of a reproduction object from the searched-out sound list 47 based on the selection display time and the reproduction time of the one or plural searched-out sound data. Then, the processing advances to step SP703.

At step SP703, the playlist creation section 50 creates a sound playlist 51 indicative of the selected one or plural searched-out sound data of the reproduction object. Then, the processing advances to step SP704.

At step SP704, the playlist creation section 50 discriminates whether or not a sound playlist 51 to be used during display of a photograph image based on photograph image data of the reproduction object is created with regard to all of the photograph image data.

If it is discriminated at step SP704 that photograph image data with regard to which a sound playlist 51 to be used during display of the photograph image is not created as yet remains among the plural photograph image data of the reproduction object, then the playlist creation section 50 returns the processing to step SP702.

Therefore, the playlist creation section 50 executes the processes at steps SP702 to SP704 cyclically and repetitively until after an affirmative result is obtained at step SP704. The playlist creation section 50 thereby creates a sound playlist 51 with regard to all photograph image data of the reproduction object.

If an affirmative result is obtained at step SP704, then this represents that a sound playlist 51 to be used for display of a photograph image is created completely with regard to all of the one or plural photograph image data of the reproduction object.

If such an affirmative result is obtained at step SP704, then the playlist creation section 50 advances the processing to step SP705, at which it ends the sound playlist creation processing subroutine SRT7. The main controlling section 20 thereafter advances the processing to step SP8 described hereinabove with reference to FIG. 26.

Figure 34:
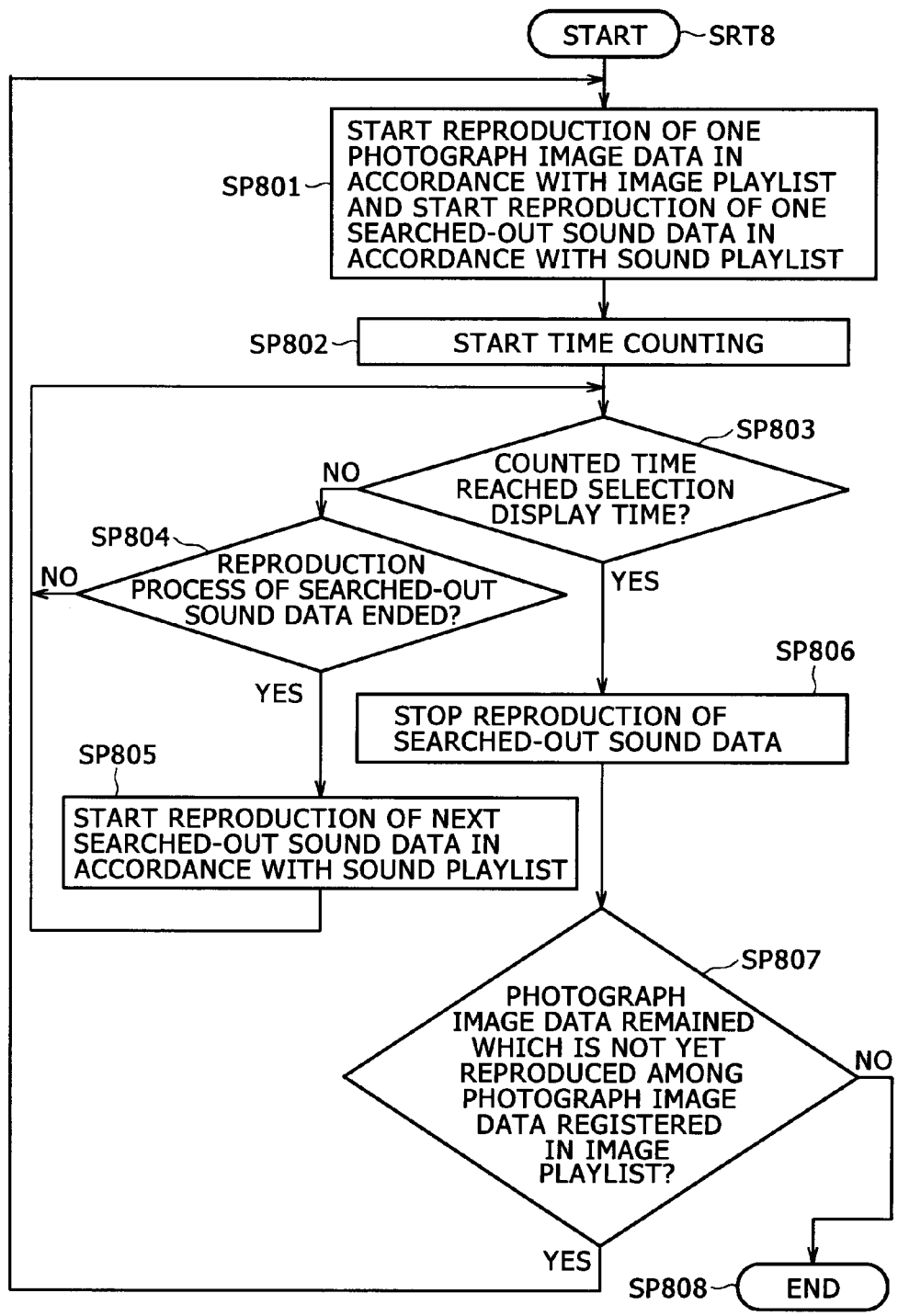
FIG. 34 is a flow chart illustrating an image and sound reproduction processing subroutine.

Further, when the image and sound reproduction process is executed at step SP8, the main controlling section 20 causes an image and sound reproduction processing subroutine SRT8 illustrated in FIG. 34 to be started.

When the image and sound reproduction processing subroutine SRT8 is started, the main controlling section 20 starts reproduction of one photograph image data in accordance with the image playlist 26 at step SP801.

Consequently, the main controlling section 20 begins to display a specified person photograph image or a specified object photograph image based on the photograph image data on the display section 25.

Further, the main controlling section 20 starts also reproduction of one searched-out sound data in accordance with the sound playlist 51 corresponding to the photograph image data whose reproduction is started and begins to output sound based on the searched-out sound data from the reproduction section 32. Then, the main controlling section 20 advances the processing to step SP802.

At step SP802, the main controlling section 20 starts time counting by means of the internal timer. Then, the processing advances to step SP803.

At step SP803, the main controlling section 20 discriminates whether or not the counted time of the timer reaches the selection display time. If a negative result is obtained at step SP803, then this represents that, since the counted time of the timer does not reach the selection display time, the display of the specified object photograph image or the specified object photograph image which is currently displayed should still be continued. If such a negative result is obtained at step SP803, then the main controlling section 20 advances the processing to step SP804.

At step SP804, the main controlling section 20 discriminates whether or not the reproduction process of the searched-out sound data comes to an end. If a negative result is obtained at step SP804, then this represents that, in the state in which the display of the specified person photograph image or the specified object photograph image continues, the one searched-out sound date still remains under the reproduction process. If such a negative result is obtained at step SP804, then the main controlling section 20 returns the processing to step SP803.

Consequently, the main controlling section 20 thereafter executes the processes at steps SP803 and SP804 cyclically and repetitively until after an affirmative result is obtained at step SP804 or step SP803.

The main controlling section 20 can thereby reproduce, while it continues the display of the specified person photograph image or the specified object photograph image, one searched-out sound data so that sound based on the searched-out sound data can be reproduced for enjoyment.

On the other hand, if an affirmative result is obtained at step SP804, then this represents that the reproduction of the one searched-out sound data comes to an end during the display of the specified person photograph image or the specified object photograph image. Thus, if such an affirmative result is obtained at step SP804, then the main controlling section 20 advances the processing to step SP805.

At step SP805, the main controlling section 20 starts reproduction of next searched-out sound data in accordance with the sound playlist 51 and begins to output sound based on the next searched-out sound data continuously to the end of the outputting of the sound based on the immediately preceding searched-out sound data. Thereafter, the processing returns to step SP803.

Therefore, the main controlling section 20 thereafter executes the processes at steps SP803 to SP805 cyclically and repetitively until after an affirmative result is obtained at step SP803.

Consequently, the main controlling section 20 can successively reproduce, while continuing the display of the specified person photograph image or the specified object photograph image so as to be enjoyed, searched-out sound data in accordance with the sound playlist 51 so that the one sound or the plural sounds can be continuously reproduced so as to be enjoyed.

On the other hand, if an affirmative result is obtained at step SP803 described hereinabove, then this represents that the counted time of the timer reaches the selection display time and the display of the specified person photograph image or the specified object photograph image which has been displayed till this point of time should be ended. If such an affirmative result is obtained at step SP803, then the main controlling section 20 advances the processing to step SP806.

At step SP806, the main controlling section 20 stops the reproduction of the searched-out sound data in accordance with the sound playlist 51 corresponding to the specified person photograph image or the specified object photograph image which has been displayed till this point of time. Thereafter, the processing advances to step SP807.

At step SP807, the main controlling section 20 discriminates whether or not photograph image data which is not reproduced as yet remains in the photograph image data registered in the image playlist 26.

If an affirmative result is obtained at step SP807 because photograph image data which is not reproduced as yet remains in the photograph image data registered in the image playlist 26, then the main controlling section 20 returns the processing to step SP801.

Consequently, the main controlling section 20 thereafter executes the processes at steps SP801 to SP807 cyclically and repetitively until after a negative result is obtained at step SP807.

The main controlling section 20 thereby can reproduce, while a plurality of specified person photograph images and specified object photograph images are successively and switchably displayed, searched-out sound data in accordance with the sound playlist 51 so that the sound can be enjoyed during display of the specified person photograph images and the specified object photograph images.

Then, if a negative result is obtained at step SP807, then this represents that all of the specified person photograph images and the specified object photograph images based on the one or plurality of photograph image data registered in the image playlist 26 are displayed completely each for the selection display time.

If such a negative result is obtained at step SP807, then the main controlling section 20 advances the processing to step SP808, at which it ends the image and sound reproduction processing subroutine SRT8.

Then, the main controlling section 20 advances the processing to step SP9 described hereinabove with reference to FIG. 26 and ends all of the image and sound reproduction processing procedure RT1 as described above.

2-5. Search Reason Presentation Processing Procedure

Figure 35:
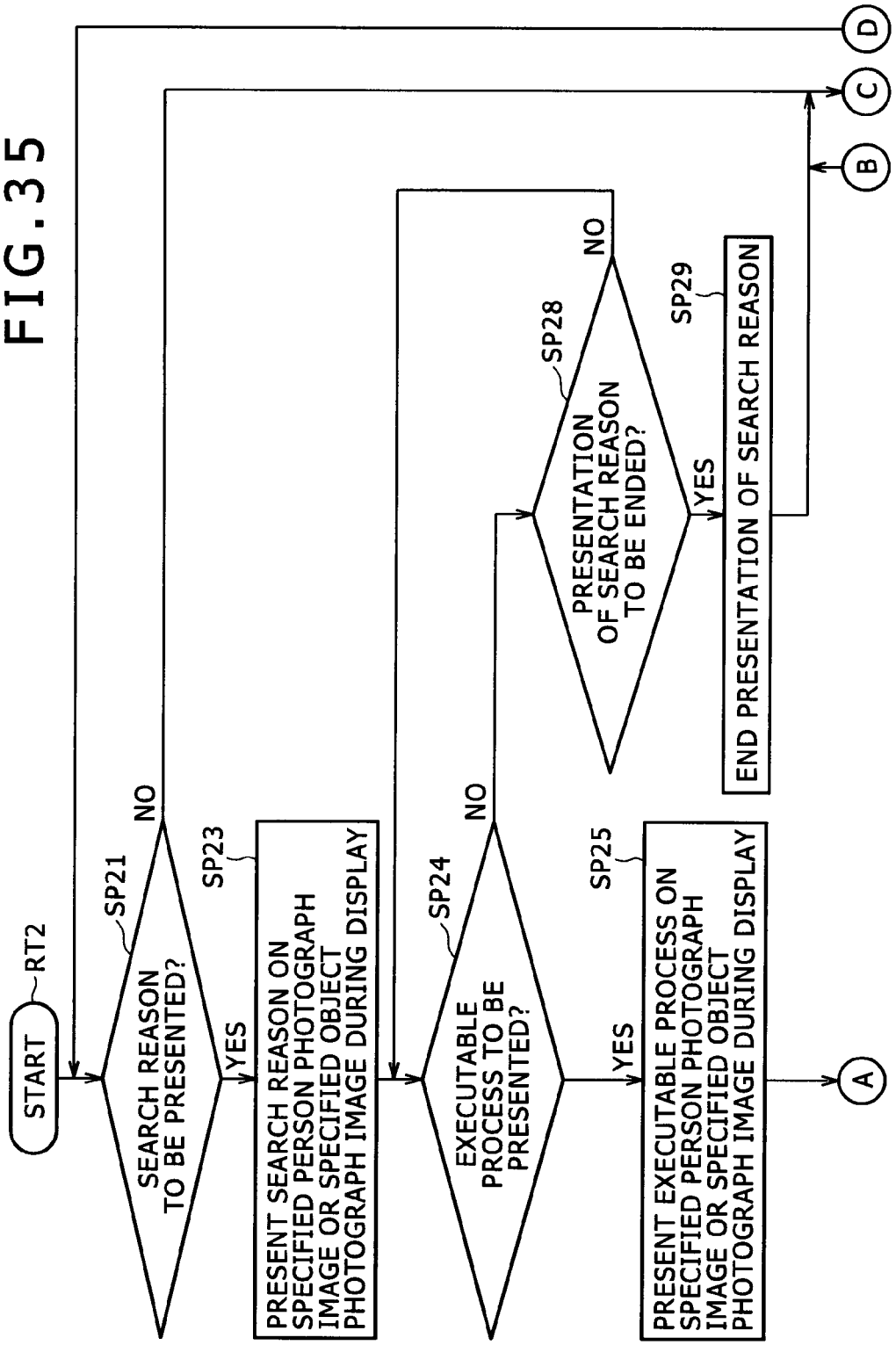
FIGS. 35 and 36 are flow charts illustrating a search reason presentation processing procedure.
Figure 36:
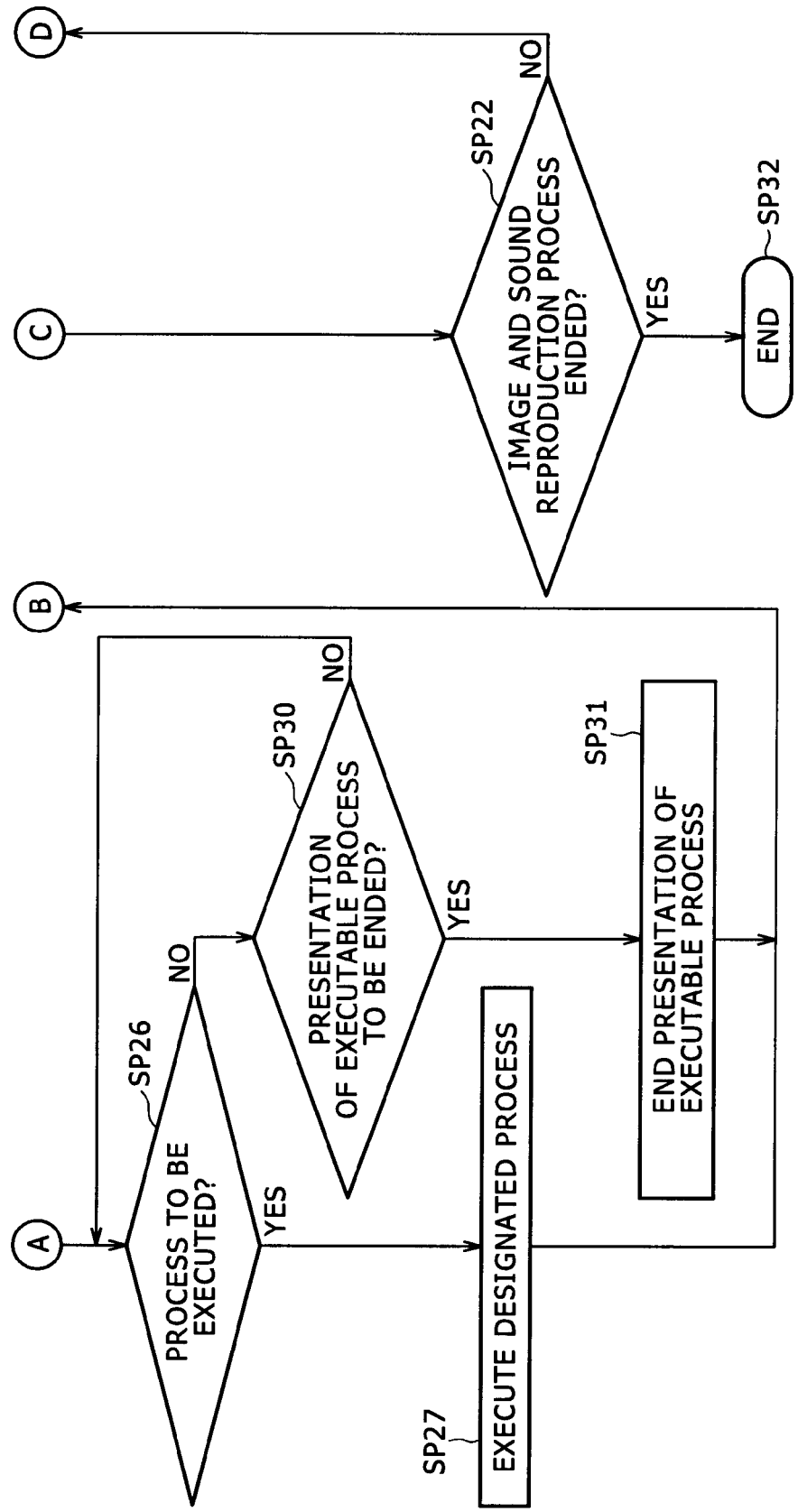

Now, a search reason presentation processing procedure RT2 which is executed in parallel to the image and sound reproduction processing subroutine SRT8 described hereinabove with reference to FIG. 34 by the main controlling section 20 of the photograph image displaying apparatus 11 is described with reference to flow charts of FIGS. 35 and 36.

When the image and sound reproduction processing subroutine SRT8 described hereinabove is started, the main controlling section 20 starts the search reason presentation processing procedure RT2 illustrated in FIGS. 35 and 36 in response to the start of the image and sound reproduction processing subroutine SRT8.

After the search reason presentation processing procedure RT2 is started, the main controlling section 20 discriminates at step SP21 whether or not a search reason for searched-out sound data of sound being currently outputted is to be presented.

If a negative result is obtained at step SP21, then this represents that, for example, while the user watches a specified person photograph image or a specified object photograph image being currently displayed, the user enjoys sound being currently outputted and presentation of a search reason is not requested by the user. If such a negative result is obtained at step SP21, then the main controlling section 20 advances its processing to step SP22.

At step SP22, the main controlling section 20 discriminates whether or not the image and sound reproduction process comes to an end. If a negative result is obtained at step SP22, then this represents that photograph image data still remains reproduced in accordance with the image playlist 26 to display the specified person photograph image or the specified object photograph image. If such a negative result is obtained at step SP22, then the main controlling section 20 returns the processing to step SP21.

Therefore, the main controlling section 20 thereafter executes the processes at steps SP21 and SP22 cyclically and repetitively until after an affirmative result is obtained at step SP21 or SP22.

The main controlling section 20 thereby waits that presentation of a search reason for the sound being currently outputted is requested by the user while the photograph image data is reproduced in accordance with the image playlist 26 to display the specified person photograph image or the specified object photograph image.

Then, if an affirmative result is obtained at step SP21, then this represents that, while the user watches the specified person photograph image or the specified object photograph image being currently displayed, the user comes to feel uneasy about a search reason of the sound and requests presentation during the enjoyment of the sound being currently outputted. If such an affirmative result is obtained at step SP21, then the main controlling section 20 advances the processing to step SP23.

At step SP23, the main controlling section 20 presents, on the specified person photograph image or the specified object photograph image being currently displayed, a search reason for the searched-out sound data being currently outputted. Then, the processing advances to step SP24.

At step SP24, the main controlling section 20 discriminates whether or not processes which can be executed in response to the presentation of the search reason should be presented subsequently to the presentation of the search reason.

If an affirmative result is obtained at step SP24, then this represents that it is requested by the user confirming the search reason for the searched-out sound data to present what processes are available as such processes which can be executed in response to the search reason. If such an affirmative result is obtained at step SP24, then the main controlling section 20 advances the processing to step SP25.

At step SP25, the main controlling section 20 presents one or a plurality of processes which can be executed in response to the search reason presented at this time as one or a plurality of icons on the specified person photograph image or the specified object photograph image being currently displayed. Then, the processing advances to step SP26.

At step SP26, the main controlling section 20 discriminates whether or not the one or plural executable processes presented to the user are to be executed.

If an affirmative result is obtained at step SP26, then this represents that an instruction to execute one of the processes is issued by the user confirming the one or plural executable processes. If such an affirmative result is obtained at step SP26, then the main controlling section 20 advances the processing to step SP27.

At step SP27, the main controlling section 20 executes the process designated by the user from among the one or plural executable processes. Thereafter, the processing advances to step SP22.

Incidentally, if a negative result is obtained at step SP24, then this represents that, although the search reason is presented to the user on the specified person photograph image or the specified object photograph image, a request to present an executable process in response to the search reason is not issued. If such a negative result is obtained at step SP24, then the main controlling section 20 advances the processing to step SP28.

At step SP28, the main controlling section 20 discriminates whether or not the presentation of the search reason presented on the specified person photograph image or the specified object photograph image is to be ended.

If a negative result is obtained at step SP28, then this represents that an instruction to stop the presentation of the search reason on the specified person photograph image or the specified object photograph image is not issued particularly by the user.

Such a negative result represents also that the one searched-out sound data searched out by the search reason being currently displayed still remains under the reproduction process. If such a negative result is obtained at step SP28, then the main controlling section 20 returns the processing step SP24.

Therefore, the main controlling section 20 thereafter executes the processes at steps SP24 and SP28 cyclically and repetitively until after an affirmative result is obtained at step SP24 or SP28.

Consequently, while the main controlling section 20 continues to display the specified person photograph image or the specified object photograph image on the display section 25 and carries out the reproduction process of the one searched-out sound data and then outputs sound, it continues the presentation of the search reason for the searched-out sound data on the specified person photograph image or the specified object photograph image.

Incidentally, if an affirmative result is obtained at step SP28, then this represents that an instruction to end the presentation of the search reason is issued by the user.

Such an affirmative result represents also that the outputting of sound based on the searched-out sound data comes to an end together with the reproduction process of one searched-out sound data searched out by the search reason being currently presented. If such an affirmative result is obtained at step SP28, then the main controlling section 20 advances the processing to step SP29.

At step SP29, the main controlling section 20 ends the presentation of the search reason in accordance with the instruction of the user or ends the presentation of the search reason in response to the end of the reproduction process of the one searched-out sound data searched out by the search reason. Then, the processing advances to step SP22.

On the other hand, if a negative result is obtained at step SP26 described hereinabove, then this represents that, although one or a plurality of processes which can be executed are presented to the user on the specified person photograph image or the specified object photograph image, any of the processes is designated for execution. If such a negative result is obtained at step SP26, then the main controlling section 20 advances the processing to step SP30.

At step SP30, the main controlling section 20 discriminates whether or not the presentation of the one or plural executable processes being currently presented on the specified person photograph image or the specified object photograph image is to be ended.

If a negative result is obtained at step SP30, then this represents that an instruction to particularly stop the presentation of the one or more processes on the specified person photograph image or the specified object photograph image is not issued by the user.

Such a negative result represents also that the one searched-out sound data searched out by the search reason being currently presented together with the one or plural executable processes still remains under the reproduction process. If such a negative result is obtained at step SP30, then the main controlling section 20 returns the processing to step SP26.

Therefore, the main controlling section 20 thereafter executes the processes at steps SP26 and SP30 cyclically and repetitively until after an affirmative result is obtained at step SP26 or SP30.

Consequently, while the main controlling section 20 displays the specified person photograph image or the specified object photograph image on the display section 25 and reproduces one searched-out sound data and then outputs sound, it continues the presentation of one or plural executable processes in response to the presentation of the search reason together with the presentation of the search reason of the searched-out sound data on the specified person photograph image or the specified object photograph image.

Incidentally, if an affirmative result is obtained at step SP30, then this represents that an instruction to end the presentation of the one or plural executable processes is issued by the user.

Such an affirmative result further represents also that the outputting of sound based on the searched-out sound data comes to an end together with the reproduction process of the one searched-out sound data searched out by the search reason presented together with the one or plural executable processes. If such an affirmative result is obtained at step SP30, then the main controlling section 20 advances the processing to step SP31.

At step SP31, the main controlling section 20 ends the presentation of the one or plural executable processes in accordance with the instruction of the user or ends the presentation of the one or plural executable processes in response to the end of the reproduction process of the one searched-out sound data. Then, the main controlling section 20 advances the processing to step SP22.

If an affirmative result is obtained at step SP22, then this represents that all of the presentation of the specified person photograph image or the specified object photograph image comes to an end together with the reproduction of all photograph image data in accordance with the image playlist 26.

If such an affirmative result is obtained at step SP22, then the main controlling section 20 advances the processing to step SP32 and ends the search reason presentation processing procedure RT2.

2-6. Operation and Effect of the First Embodiment

In the first embodiment having the configuration described above, if the image and sound reproduction function is selected through the operation section 23 by the user, then the photograph image displaying apparatus 11 enters the image and sound reproduction mode and urges the user to select photograph image data of a reproduction object through the operation section 23.

Thereupon, the photograph image displaying apparatus 11 specifies a person captured in a photograph image based on the photograph image data of the reproduction object.

Further, the photograph image displaying apparatus 11 extracts a liking of the specified person based on providing personal information relating to the specified person specified in the specified person photograph image.

Further, the photograph image displaying apparatus 11 searches for one or a plurality of sound data conforming to the liking of the specified person from among the plural sound data.

Then, the photograph image displaying apparatus 11 creates a sound playlist 51 which defines a reproduction order of the searched out one or plural searched-out sound data during displaying of the specified person photograph image based on the photograph image data of the reproduction object.

Accordingly, while the photograph image displaying apparatus 11 reproduces the photograph image data to display the specified person photograph image, it reproduces the searched-out sound data in accordance with the sound playlist 51 so that sound conforming to the liking of the specified person captured in the specified person photograph image can be enjoyed by the user.

In the photograph image displaying apparatus 11 having the configuration described above, a person captured in a photograph image based on photograph image data of a reproduction object is specified and a liking of the specified person is extracted. Then, one or a plurality of sound data conforming to the extracted liking are searched out, and a sound playlist 51 which defines a reproduction order of the searched out one or plural searched-out sound data during displaying of a specified person photograph image based on the photograph image data is created. Consequently, while the photograph image displaying apparatus 11 reproduces the photograph image data to display the specified person photograph image, it can reproduce searched-out sound data in accordance with the sound playlist 51 so that sound conforming to the liking of the specified person captured in the specified person photograph image can be enjoyed by the specified person. Therefore, the photograph image displaying apparatus 11 can provide a novel way of enjoyment of a photograph image and sound.

Further, when the photograph image displaying apparatus 11 specifies a plurality of persons captured in a photograph image based on photograph image data of a reproduction object, it extracts a liking common to the plural specified persons.

Then, the photograph image displaying apparatus 11 searches for one or a plurality of sound data conforming to the liking common to the plural specified persons to create a sound playlist 51 which indicates the searched out one or plural searched-out sound data.

Accordingly, if the photograph image displaying apparatus 11 specifies a plurality of persons who are captured in a photograph image and have a connection by sound of the same kind, then it allows enjoyment of sound of the same kind on which the connection of the plural specified persons is based as sound conforming to the liking common to the plural specified persons during displaying of the photograph image.

In particular, if the photograph image displaying apparatus 11 specifies a plurality of persons of a group in which those who are interested in sound of the same kind take part such as a brass band, a rock and roll band or a comic story circle in a photograph image, then it allows enjoyment of sound specialized for the group while conforming to the liking of the plural specified persons during displaying of the photograph image.

Further, even if a plurality of persons captured in a photograph image are specified, when the selection display time is comparatively long, the photograph image displaying apparatus 11 extracts a liking of each of the plural specified persons and searches for sound data conforming to the liking of the specified person.

Accordingly, during displaying of a specified person photograph image in which a plurality of specified person are captured, the photograph image displaying apparatus 11 allows enjoyment of sound conforming to each of the specified persons.

Consequently, while a specified person photograph image in which a plurality of specified persons are captured is displayed, the photograph image displaying apparatus 11 allows enjoyment of sound conforming to a liking which is not clear when the plural specified persons are grasped as a group but is clear when each of the specified persons is grasped as an individual.

Further, when sound is outputted while a specified person photograph image is displayed, if a request to present a search reason of the sound is issued, then the photograph image displaying apparatus 11 presents the search reason in response to the request.

Accordingly, the photograph image displaying apparatus 11 allows easy confirmation of in what manner sound currently enjoyed relates to a specified person photograph image being currently displayed.

Further, the photograph image displaying apparatus 11 thereupon displays also the specified person from whom the search is originated together with the search reason of the sound.

Accordingly, the photograph image displaying apparatus 11 allows easy confirmation of to the liking of which one of specified persons the sound currently enjoyed during displaying of a specified person photograph image conforms.

3. Second Embodiment 3-1. Configuration of the Content Reproduction System

Figure 37:
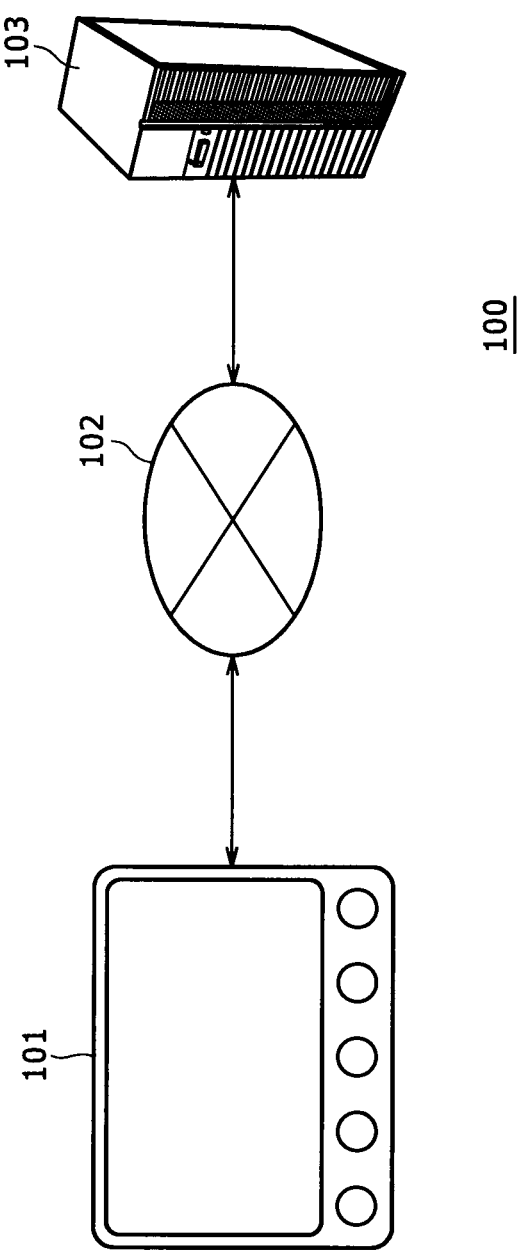
FIG. 37 is a block diagram showing a configuration of a content reproduction system according to a second embodiment of the disclosed technology.

Referring to FIG. 37, a content reproduction system according to a second embodiment is generally denoted by reference numeral 100. The content reproduction system 100 includes a photograph image displaying apparatus 101 called digital photo frame which is a particular example of the playlist creation apparatus 1 described hereinabove.

The content reproduction system 100 is configured such that the photograph image displaying apparatus 101 can communicate with the information providing apparatus 103 of a server configuration through the Internet or a network 102 such as a LAN (Local Area Network).

Figure 38:
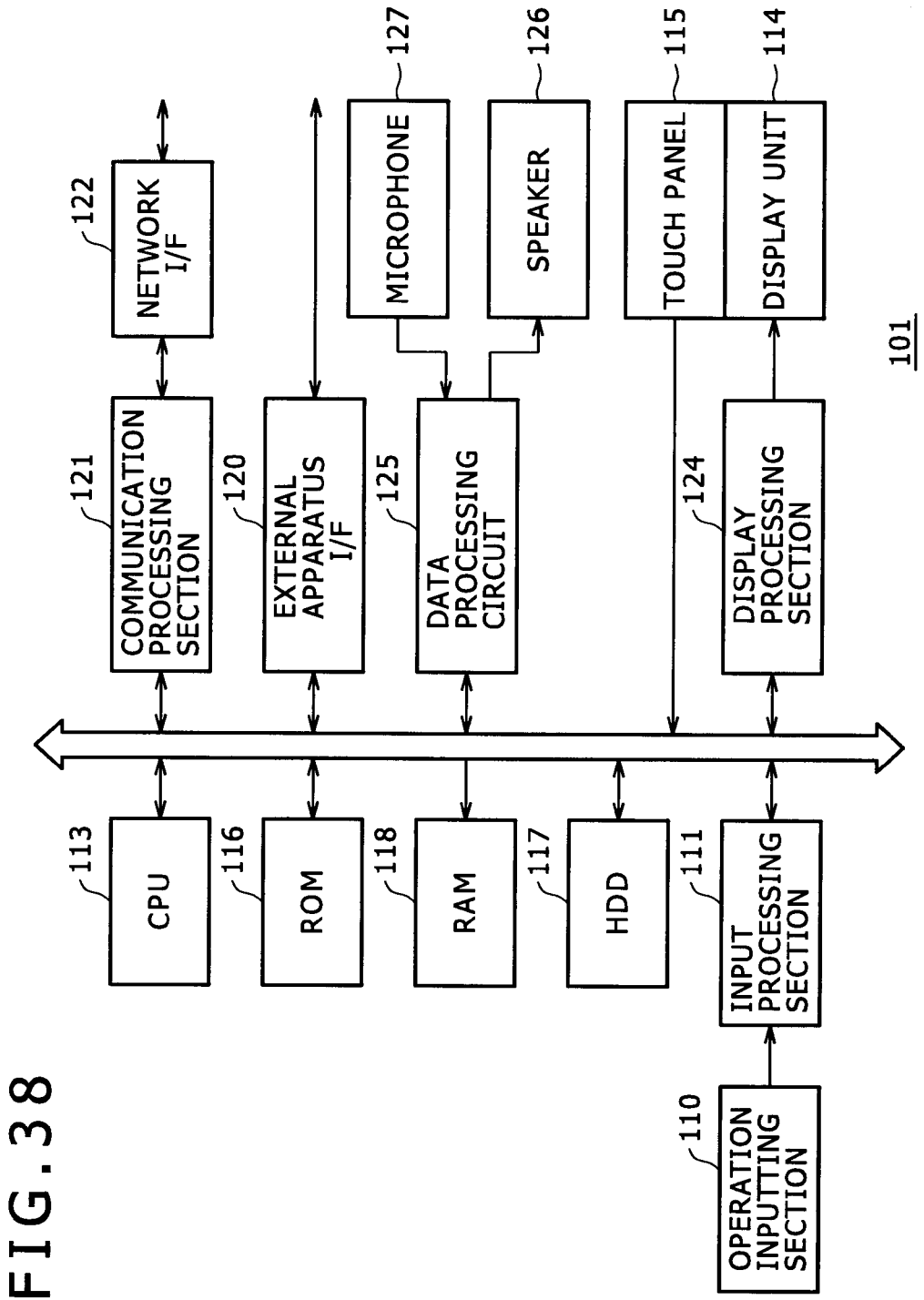
FIG. 38 is a block diagram showing a circuit configuration according to hardware circuit blocks of a photograph image displaying apparatus which is a particular example of a playlist creation apparatus.

3-2. Hardware Configuration According to the Hardware Circuit Blocks of the Photograph Image Displaying Apparatus Now, a hardware circuit configuration according to hardware circuit blocks of the photograph image displaying apparatus 101 is described with reference to FIG. 38.

When the operation inputting section 110 configured from various operation keys provided on a housing surface or a remote controller is operated by the user, the photograph image displaying apparatus 101 recognizes the input through the operation inputting section 110 and transmits an operation input signal corresponding to the operation to the inputting processing section 111.

The inputting processing section 111 carries out a predetermined process for the operation input signal supplied thereto from the operation inputting section 110 to convert the operation input signal into an operation command and transmits the operation command to the central processing unit (CPU) 113.

Further, in the photograph image displaying apparatus 101, a touch panel 115 is provided on the displaying face of a display unit 114 such as a liquid crystal display unit or an organic EL (Electro Luminescence) display unit.

If the surface of the touch panel 115 is operated by a touch, then the touch panel 115 detects, in response to the touch operation, a touched position by the touch operation and issues a notification of the touch position to the central processing unit 113.

The central processing unit 113 reads out various programs such as a basic program and an application program stored in advance in a ROM (Read Only Memory) 116 or a hard disk drive 117 into a RAM (Random Access Memory) 118.

Further, the central processing unit 113 carries out control of the entire system in accordance with the various programs developed on the RAM 118 and executes a predetermined calculation process and various processes in response to the operation command applied thereto from the inputting processing section 111 and the touched position on the surface of the touch panel 115.

Consequently, if an image file from an external equipment such as a personal computer or a digital camera connected to an external equipment interface 120 is transferred, then the central processing unit 113 takes in the image file through the external equipment interface 120. Then, the central processing unit 113 transmits and stores the image file to and into the hard disk drive 117.

Further, if a sound file is transferred from the external equipment connected to the external equipment interface 120, then the central processing unit 113 takes in the sound file through the external equipment interface 120. Then, the central processing unit 113 transmits and stores the sound file to and into the hard disk drive 117.

Further, the central processing unit 113 can connect to the network 102 successively through a communication processing section 121 and a network interface 122 to access the information providing apparatus 103 on the network 102.

Therefore, if acquisition of a sound purchase page image is requested through the operation inputting section 110 or the touch panel 115 by the user, then the central processing unit 113 transmits page image requesting data to the information providing apparatus 103 successively through the communication processing section 121 and the network interface 122.

Thus, if page image data is sent back from the information providing apparatus 103, then the central processing unit 113 receives the page image data successively through the network interface 122 and the communication processing section 121.

Then, the central processing unit 113 transmits the page image data to the display unit 114 through the display processing section 124 so that a sound purchase page image based on the page image data is displayed on the display unit 114.

In this state, for example, if sound data which the user wants to buy is selected on the sound purchase page image through the touch panel 115 by the user, then the central processing unit 113 creates purchase request data for requesting purchase of the selected sound data.

Then, the central processing unit 113 transmits the purchase request data to the information providing apparatus 103 successively through the communication processing section 121 and the network interface 122.

Then, if the sound data which the user wants to buy is transmitted as a sound file from the information providing apparatus 103, then the central processing unit 113 receives the sound file successively through the network interface 122 and the communication processing section 121. Then, the central processing unit 113 transmits and stores the sound file to and into the hard disk drive 117.

In this manner, the central processing unit 113 can accumulate a plurality of image files and a plurality of sound file into the hard disk drive 117.

If photograph image data which is a reproduction object is selected through the operation inputting section 110 or the touch panel 115 by the user, then the central processing unit 113 reads out an image file in which the selected photograph image data is stored from the hard disk drive 117.

In this instance, the central processing unit 113 extracts the photograph image data from the image file and transmits the photograph image data to the display unit 114 through the display processing section 124. Consequently, the central processing unit 113 displays a photograph image based on the photograph image data on the display unit 114.

Thereupon, if a plurality of photograph image data are selected as a reproduction object by the user, then the central processing unit 113 creates an image playlist in which the plural photograph image data are registered.

Also it is possible for the central processing unit 113 to successively reproduce the plural photograph image data in accordance with the image playlist so that the photograph images are displayed on the display unit 114 like slideshow.

In this manner, the central processing unit 113 can show one or a plurality of photograph images through the display unit 114 to the user.

On the other hand, if sound data which is a reproduction object is selected through the operation inputting section 110 or the touch panel 115 by the user, then the central processing unit 113 reads out a sound file in which the selected sound data is stored from the hard disk file 117.

In this instance, the central processing unit 113 extracts sound data from the sound file and carries out a reproduction process for the extracted sound data through the data processing circuit 125 so that the sound data is outputted as sound from the speaker 126.

Further, in this instance, if a plurality of sound data are selected as a reproduction object by the user, then the central processing unit 113 creates a sound playlist in which the plural sound data are registered.

Further, the central processing unit 113 can carry out also a reproduction process successively for the plural sound data through the data processing circuit 125 in accordance with the sound playlist so that resulting sound data are successively outputted as a plurality of kinds of sound from the speaker 126.

In this manner, the central processing unit 113 can provide one or a plurality of kinds of sound through the speaker 126 to the user.

Further, the central processing unit 113 stores telephone directory data in the hard disk drive 117. Further, the central processing unit 113 stores also own station data including a telephone number, a mail address and so forth allocated to the photograph image displaying apparatus 11 in the hard disk drive 117.

If the telephone number is selected, for example, utilizing the telephone directory data and then a call origination instruction is inputted through the operation inputting section 110 or the touch panel 115 by the user, then the central processing unit 113 creates call origination data using the telephone number together with the own station data.

Then, the central processing unit 113 transmits the call origination data to a telephoning unit (not shown) of an acquaintance successively through the communication processing section 121 and the network interface 122 so that a notification of the call from the user is issued through the telephoning unit to the acquaintance.

Then, if the acquaintance accepts the telephone call to establish communication with the telephoning unit of the acquaintance, then the central processing unit 113 collects sound of the user through the microphone 127 and carries out a process for a sound signal obtained by the sound collection by means of the data processing circuit 125 to create telephone conversation sound data.

Then, the central processing unit 113 transmits the telephone conversation sound data to the telephoning unit of the acquaintance successively through the communication processing section 121 and the network interface 122.

Further, in this instance, the central processing unit 113 receives the telephone conversation sound data transmitted from the telephoning unit of the acquaintance successively through the network interface 122 and the communication processing section 121.

Then, the central processing unit 113 processes the telephone conversation sound data through the data processing circuit 125 and outputs the processed data as sound of the acquaintance from the speaker 126.

In this manner, if communication with the telephoning unit of the acquaintance is established in response to the request for telephone conversation from the user, then the central processing unit 113 can transmit and receive the telephone conversation sound data of voice of the user and the acquaintance thereby to achieve telephone conversation between the user and the acquaintance.

On the other hand, if call termination data transmitted from the telephoning unit of the acquaintance is received successively through the network interface 122 and the communication processing section 121, then the central processing unit 113 outputs ringtone, for example, from the speaker 126 based on the call termination data.

Further, the central processing unit 113 displays the name, telephone number and so forth of the acquaintance who requests telephone call on the display unit 114 through the display processing section 124 based on the call termination data. Consequently, the central processing unit 113 issues a notification of call termination from the acquaintance to the user.

As a result, if telephone call is accepted through the operation inputting section 110 or the touch panel 115 by the user and communication with the telephoning unit of the acquaintance is established, then the central processing unit 113 creates telephone conversation sound data of voice of the user through the microphone 127 and the data processing circuit 125 similarly as in the case described above.

Then, the central processing unit 113 transmits the telephone conversation sound data to the telephoning unit of the acquaintance successively through the communication processing section 121 and the network interface 122.

Further, in this instance, the central processing unit 113 receives the telephone conversation sound data transmitted from the telephoning unit of the acquaintance successively through the network interface 122 and the communication processing section 121.

Then, the central processing unit 113 outputs the telephone conversation sound data as voice of the acquaintance successively through the data processing circuit 125 and the speaker 126 similarly as in the case described above.

In this manner, also where communication with the telephoning unit of the acquaintance is established in response to the request for telephone conversation from the acquaintance, the central processing unit 113 can transmit and receive the telephone conversation sound data of voice of the user and the acquaintance thereby to achieve telephone conversation between the user and the acquaintance.

Further, if creation of an electronic mail is requested through the operation inputting section 110 or the touch panel 115 by the user, then the central processing unit 113 reads out mail creation screen image data from the hard disk drive 117.

Then, the central processing unit 113 transmits the mail creation screen image data to the display unit 114 through the display processing section 124 to display an electronic mail creation screen image (not shown) on the display unit 114.

Consequently, the central processing unit 113 can urge the user to input a mail text on the electronic mail creation screen through the operation inputting section 110 or the touch panel 115 so that a mail address of the acquaintance which is a transmission destination of the electronic mail is inputted, for example, utilizing telephone directory data.

Further, if a transmission instruction of an electronic mail is inputted through the operation inputting section 110 or the touch panel 115 by the user, then the central processing unit 113 creates electronic mail data including a mail text and a mail address inputted on the electronic mail creation screen.

Then, the central processing unit 113 transmits the electronic mail data to the telephoning unit of the acquaintance through a mail server (not shown) successively through the communication processing section 121 and the network interface 122.

In this manner, the central processing unit 113 can transmit an electronic mail created by the user to the acquaintance so that the acquaintance can open and read the electronic mail.

On the other hand, if electronic mail data transmitted from the telephoning unit of the acquaintance through the mail server is received successively through the network interface 122 and the communication processing section 121, then the central processing unit 113 temporarily stores the received data into the hard disk drive 117.

Then, the central processing unit 113 issues a notification of reception of an electronic mail to the user, for example, through the display unit 114, the speaker 126 or the like.

Then, if an instruction to open the electronic mail is issued through the operation inputting section 110 or the touch panel 115 by the user, then the central processing unit 113 reads out the electronic mail data from the hard disk drive 117.

Further, the central processing unit 113 can transmit the electronic mail data to the display unit 114 through the display processing section 124 to display the mail text of the electronic mail transmitted from the acquaintance, the mail address of the acquaintance and so forth on the display unit 114 so that the user can read the mail text, the mail address and so forth.

Further, the central processing unit 113 can connect to the network 102 successively through the communication processing section 121 and the network interface 122 to access a community site or a public site on the network 102.

Therefore, if an instruction to upload various kinds of information is issued through the operation inputting section 110 or the touch panel 115 by the user, then the central processing unit 113 transmits the instruction to a community site successively through the communication processing section 121 and the network interface 122.

Consequently, the central processing unit 113 can utilize the community site on the network 102 to lay open a profile, a photograph, a diary and so forth of the user and transmit a message to the acquaintance.

Further, if an instruction to upload information for laying open to the public is issued through the operation inputting section 110 or the touch panel 115 by the user, then the central processing unit 113 accesses a public site successively through the communication processing section 121 and the network interface 122.

Consequently, the central processing unit 113 can lay open a diary, a memorandum, a comment and so forth of the user in the public site on the network 102.

Incidentally, if user registration into the information providing apparatus 103 is requested through the operation inputting section 110 or the touch panel 115 by the user, then the central processing unit 113 transmits registration request data to the information providing apparatus 103 successively through the communication processing section 121 and the network interface 122.

As a result, if personal information inputting screen data transmitted from the information providing apparatus 103 is received successively through the network interface 122 and the communication processing section 121, then the central processing unit 113 transmits the received data to the display unit 114 through the display processing section 124.

Consequently, the central processing unit 113 can display a personal information inputting screen (not shown) on the display unit 114 to urge the user to input personal information for user registration on the personal information inputting screen through the operation inputting section 110 or the touch panel 115.

Then, the central processing unit 113 transmits the personal information of the user inputted on the personal information inputting screen as user registration data to the information providing apparatus 103 successively through the communication processing section 121 and the network interface 122.

Consequently, the central processing unit 113 stores the personal information of the user into the information providing apparatus 103 to carry out user registration.

Further, if the user registration of the user is carried out into the information providing apparatus 103, then the central processing unit 113 can thereafter suitably change part of the substance of the personal information upon the user registration or suitably adds new personal information to update the registered personal information.

Then, if the user registration of the user is carried out, then where one or a plurality of sound data are to be reproduced to output sound while reproducing one or a plurality of photograph image data to display a photograph image, the central processing unit 113 can receive provision of various kinds of information from the information providing apparatus 103.

Consequently, in this instance, using various kinds of information provided from the information providing apparatus 103, the central processing unit 113 searches for one or a plurality of sound data to be reproduced during displaying of a photograph image and creates a sound playlist which indicates the searched out one or plural sound data.

Therefore, the central processing unit 113 can reproduce the sound data in accordance with the sound playlist to provide sound during reproduction of one or a plurality of photograph image data to display the photograph image.

Incidentally, in the photograph image displaying apparatus 101, basically the central processing unit 113 executes various processes in accordance with various programs stored in the ROM 116 or the hard disk drive 117 and controls the hardware as described above.

Figure 3:
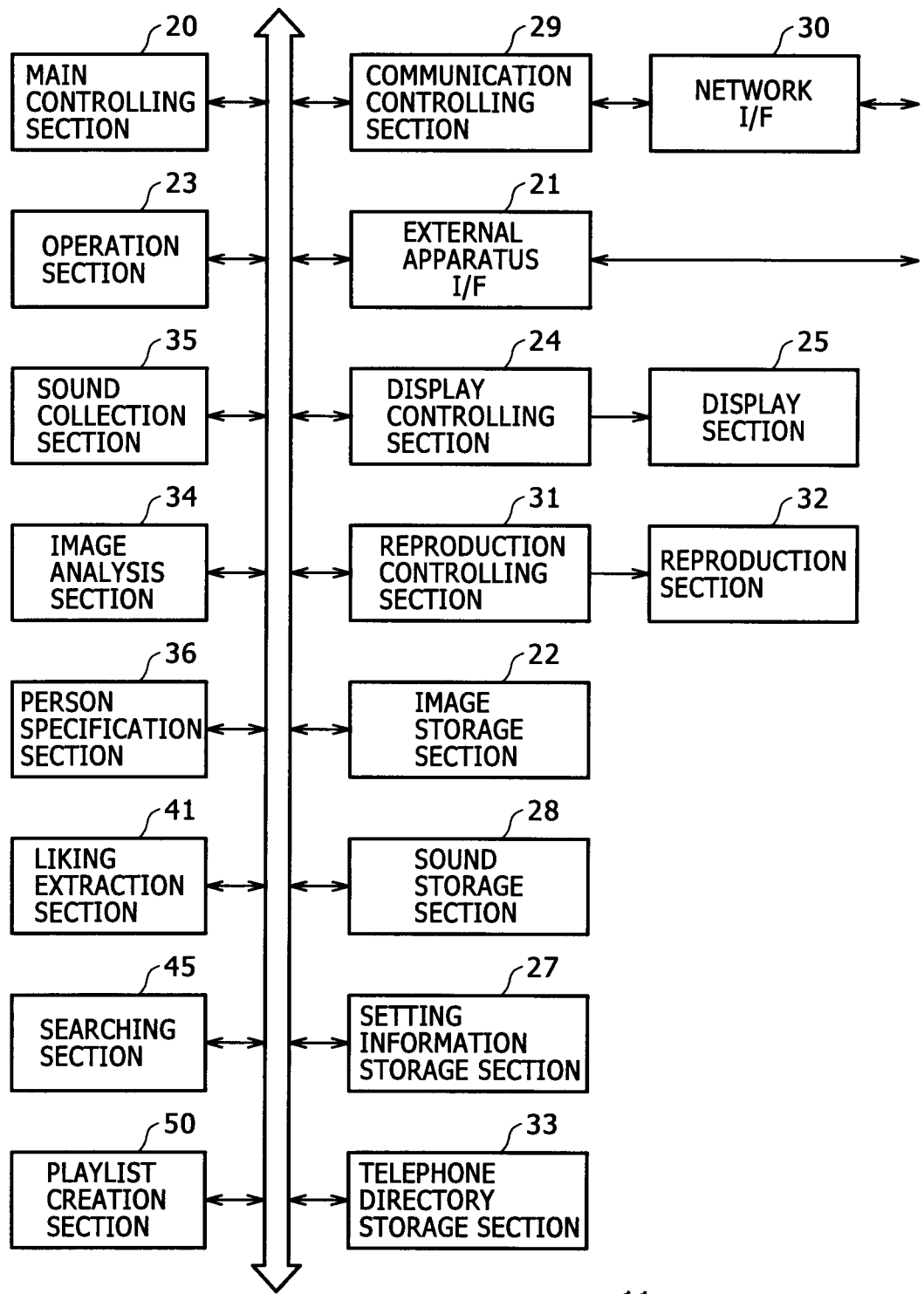
FIG. 3 is a block diagram showing a circuit configuration showing functional circuit blocks of a photograph image displaying apparatus which is a particular example of the playlist creation apparatus.

Therefore, in the photograph image displaying apparatus 101, various programs to be stored into the ROM 116 or the hard disk drive 117 are suitably selected in response to the function of the photograph image displaying apparatus 11 which has the hardware configuration according to the functional circuit blocks described hereinabove with reference to FIG. 3.

In particular, in the photograph image displaying apparatus 101, various programs are suitably selected like a playlist creation program for executing the image and sound reproduction process procedure RT1 and the search reason presentation processing procedure RT2 described hereinabove.

Consequently, in the photograph image displaying apparatus 101, the central processing unit 113 can function similarly to the main controlling section 20, image analysis section 34, person specification section 36, liking extraction section 41, searching section 45 and playlist creation section 50 described hereinabove.

Further, in the photograph image displaying apparatus 101, the operation inputting section 110, inputting processing section 111 and touch panel 115 can function similarly to the operation section 23 described hereinabove.

Further, in the photograph image displaying apparatus 101, the hard disk drive 117 can function similarly to the image storage section 22, setting information storage section 27, sound storage section 28 and telephone directory storage section 33 described hereinabove.

Further, in the photograph image displaying apparatus 101, the communication processing section 121 and the network interface 122 can function similarly to the communication controlling section 29 and the network interface 30 described hereinabove, respectively.

Further, in the photograph image displaying apparatus 101, the display processing section 124 can function similarly to the displaying controlling section 24 described hereinabove and the display unit 114 can function similarly to the display section 25 described hereinabove.

Further, in the photograph image displaying apparatus 101, the data processing circuit 125 and the speaker 126 can function similarly to the reproduction controlling section 31 and the reproduction section 32 described hereinabove.

Further, in the photograph image displaying apparatus 101, the data processing circuit 125 and the microphone 127 can function similarly to the sound collection section 35 described hereinabove and the external equipment interface 120 can function similarly to the external equipment interface 21 described hereinabove.

Accordingly, the photograph image displaying apparatus 101 can suitably select the various programs stored in the ROM 116 or the hard disk drive 117 in response to a function of the photograph image displaying apparatus 11 to execute the image and sound reproduction process procedure RT1 similarly to the photograph image displaying apparatus 11.

Further, the photograph image displaying apparatus 101 can suitably select the various programs stored in the ROM 116 or the hard disk drive 117 in response to another function of the photograph image displaying apparatus 11 to execute the search reason presentation process procedure RT2 similarly to the photograph image displaying apparatus 11.

Incidentally, in the photograph image displaying apparatus 101, the playlist creation program may be stored in advance in the ROM 116 or the hard disk drive 117.

Further, in the photograph image displaying apparatus 101, the playlist creation program may be installed utilizing a computer-readable storage medium in or on which the playlist creation program is stored.

Further, in the photograph image displaying apparatus 101, the playlist creation program may be installed from the outside utilizing a wire or wireless communication medium such as a local area network, the Internet, digital satellite broadcasting or the like.

It is to be noted that a computer-readable storage medium for installing the playlist creation program into the photograph image displaying apparatus 101 to place the apparatus into a state in which the program can be executed may be implemented by a package medium such as, for example, a flexible disk.

Further, the computer-readable storage medium for installing the playlist creation program into the photograph image displaying apparatus 101 to place the apparatus into a state in which the program can be executed may be implemented by such a package medium as a CD-ROM (Compact Disc-Read Only Memory) or the like.

Further, the computer-readable storage medium for installing the playlist creation program into the photograph image displaying apparatus 101 to place the apparatus into a state in which the program can be executed may be implemented by such a package medium as a DVD (Digital Versatile Disc) or the like.

Further, the computer-readable storage medium according to the present embodiment may be implemented not only by a package medium but also by a semiconductor memory, a magnetic disk or the like in which the various programs are temporarily or permanently stored.

Further, as a method for storing the playlist creation program into the computer-readable storage medium, a wire or wireless communication medium such as a local area network, the Internet, digital satellite broadcasting or the like may be utilized.

Further, the playlist creation program may be stored into the computer-readable storage medium through various communication interfaces such as a router and a modem.

Figure 39:
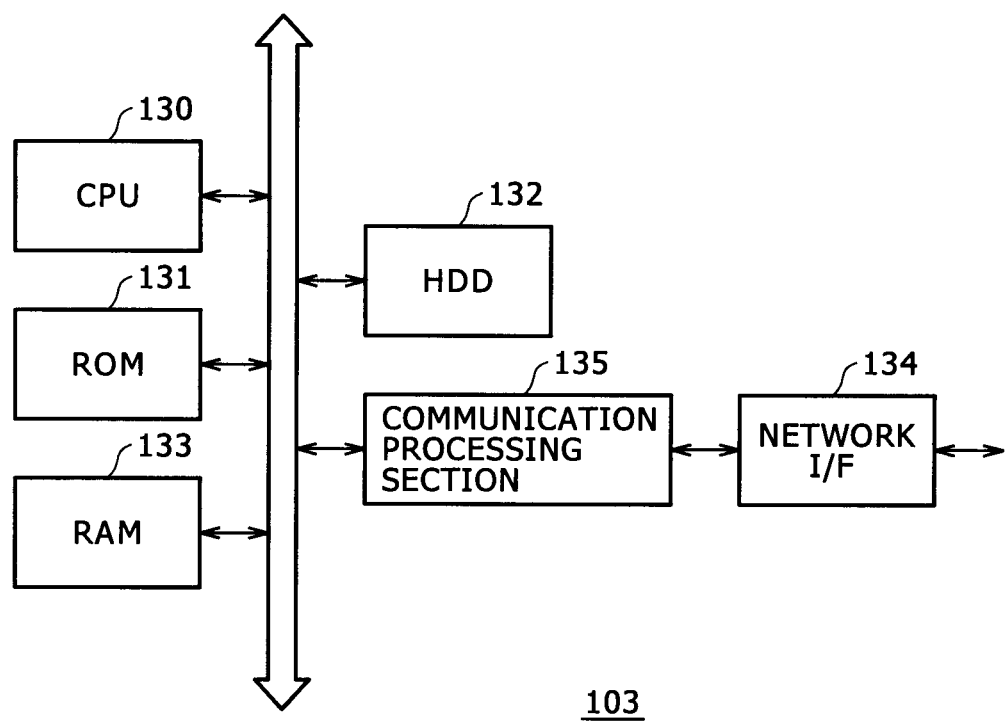
FIG. 39 is a block diagram showing a circuit configuration according to hardware circuit blocks of an information processing apparatus.

3-3. Hardware Configuration of the Information Providing Apparatus According to the Hardware Circuit Blocks Now, a hardware circuit configuration of the information providing apparatus 103 according to hardware circuit blocks is described with reference to FIG. 39.

In the information providing apparatus 103, a central processing unit 130 reads out various programs such as a basic program and an application program stored in advance in a ROM 131 or a hard disk drive 132 into a RAM 133.

The central processing unit 130 carries out control of the entire system in accordance with the various programs developed on the RAM 133 and executes various processes.

Consequently, if registration request data is transmitted from the photograph image displaying apparatus 101, then the central processing unit 130 receives the registration request data successively through a network interface 134 and a communication processing section 135.

In this instance, the central processing unit 130 reads out personal information inputting screen data from the hard disk drive 132 and transmits the personal information inputting screen data to the photograph image displaying apparatus 101 successively through the communication processing section 135 and the network interface 134.

As a result, if user registration data transmitted from the photograph image displaying apparatus 101 is received successively through the network interface 134 and the communication processing section 135, then the central processing unit 130 transmits and stores personal information included in the received data to and into the hard disk drive 132. Consequently, the central processing unit 130 carries out user registration of the user of the photograph image displaying apparatus 101.

After the user registration of the user of the photograph image displaying apparatus 101 is carried out, the central processing unit 130 can suitably change part of the substance of the personal information upon user registration or suitably add new personal information so that the personal information is updated.

Further, the central processing unit 130 can register a plurality of persons as the user in addition to the user of the photograph image displaying apparatus 101 similarly as in the case described above and can suitably update the personal information stored upon user registration.

Further, the central processing unit 130 stores a plurality of sound data for distribution as a sound file in the hard disk drive 132.

Then, if page image request data transmitted from the photograph image displaying apparatus 101 is received successively through the network interface 134 and the communication processing section 135, then the central processing unit 130 reads out page image data of a sound purchase page image from the hard disk drive 132.

Then, the central processing unit 130 transmits the page image data to the photograph image displaying apparatus 101 successively through the communication processing section 135 and the network interface 134.

Then, the central processing unit 130 receives purchase request data transmitted from the photograph image displaying apparatus 101 successively through the network interface 134 and the communication processing section 135, and reads out a sound file of sound data whose purchase is proposed from the hard disk drive 132.

Then, the central processing unit 130 transmits the sound file to the photograph image displaying apparatus 101 successively through the communication processing section 135 and the network interface 134. In this manner, the central processing unit 130 can distribute sound data.

Further, the central processing unit 130 stores, in the hard disk drive 132, various kinds of information such as sound image keywords extracted based on a result of analysis of sound data and sound substance keywords extracted based on a result of a natural language process of titles and words of sound based on sound data.

In the case where the central processing unit 130 is configured such that, while the photograph image displaying apparatus 101 reproduces photograph image data and displays a photograph image, one or a plurality of sound data can be reproduced to output sound, the central processing unit 130 can provide various kinds of information to the photograph image displaying apparatus 101.

Incidentally, in the information providing apparatus 103, basically the central processing unit 130 executes various processes and controls various hardware components in accordance with various programs stored in the ROM 131 or the hard disk drive 132 as described hereinabove.

Figure 25:
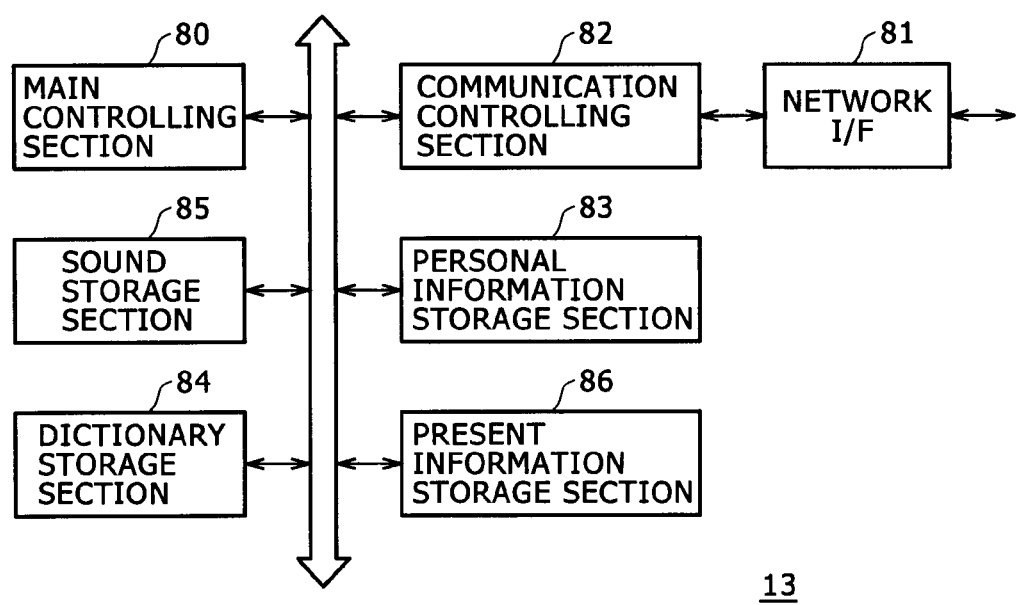
FIG. 25 is a block diagram showing a circuit configuration according to functional circuit blocks of an information providing apparatus.

Therefore, the information providing apparatus 103 suitably selects programs to be stored into the ROM 131 or the hard disk drive 132 in accordance with the functions of the information providing apparatus 13 of the hardware configurations according to the functional circuit blocks described hereinabove with reference to FIG. 25.

Consequently, in the information providing apparatus 103, the central processing unit 130 can function similarly to the main controlling section 80 described hereinabove.

Further, in the information providing apparatus 103, the hard disk drive 132 can function similarly to the personal information storage section 83, dictionary storage section 84, sound storage section 85 and present information storage section 86 described hereinabove.

Furthermore, in the information providing apparatus 103, the communication processing section 135 and the network interface 134 can function similarly to the communication controlling section 82 and the network interface 81 described hereinabove, respectively.

Accordingly, the information providing apparatus 103 can execute similar processing to that by the information providing apparatus 13 by suitably selecting programs to be stored into the ROM 131 or the hard disk drive 132 in accordance with the functions of the information providing apparatus 13.

Therefore, the information providing apparatus 103 can achieve effects similar to those by the information providing apparatus 13 according to the first embodiment described hereinabove.

Incidentally, in the information providing apparatus 103, the ROM 131 or the hard disk drive 132 may have a program stored in advance therein.

Further, in the information providing apparatus 103, a program may be installed by utilizing a computer-readable storage medium in or on which the program is stored.

Furthermore, in the information providing apparatus 103, a program may be installed from the outside utilizing a wire or wireless communication medium such as a local area network, the Internet or digital satellite broadcasting.

Incidentally, the computer-readable storage medium for installing a program into the information providing apparatus 103 to place the information providing apparatus 103 into a state in which it can execute the program may be implemented by a package medium such as, for example, a flexible disk, a CD-ROM or a DVD.

Or, the computer-readable storage medium may be implemented not only by a package medium but also by a semiconductor memory, a magnetic disk or the like in or on which various programs are stored temporarily or permanently.

Further, as means for storing a program into or on which a computer-readable storage medium, a wire or wireless communication medium such as a local area network, the Internet or digital satellite broadcasting may be utilized.

Furthermore, into a computer-readable storage medium, a program may be stored through various communication interfaces such as a router or a modem.

4. Modifications 4-1. Modification 1

It is to be noted that, in the first and second embodiments described above, the photograph image displaying apparatus 11 and 101 analyzes, in the image and sound reproduction mode, photograph image data of a reproduction object to detect a supposed region and specifies a person based on a result of the detection.

However, the disclosed technology is not limited to this, but the photograph image displaying apparatus 11 and 101 may analyze, when an image file is stored into the image storage section 22 or the hard disk drive 117, photograph image data to detect a supposed region and specify a person based on a result of the detection.

According to the configuration just described, there is no necessity to specify, in the image and sound reproduction mode, a person captured in a photograph image, and therefore, the processing load in the image and sound reproduction mode can be reduced as much.

Further, according to the disclosed technology, such analysis of photograph image data may be executed by the information providing apparatus 13 and 103 in response to a request from the photograph image displaying apparatus 11 and 101.

Further, in the first and second embodiments described hereinabove, only the user or an acquaintance of the user may be specified as a person captured in a photograph image.

However, the disclosed technology is not limited to this, but the information providing apparatus 13 may be used together with the face characteristic amounts of various persons having a user registration such that a person who is captured in a photograph but is not an acquaintance of the user, for example, such as a distinguished person like a player, a musician or a writer is specified.

According to the configuration just described, the photograph image displaying apparatus 11 and 101 can provide sound conforming to a liking of a person captured in a photograph image not only when a photograph image in which the user or an acquaintance is captured is to be displayed but also when photograph image data laid open to the public is acquired, for example, through the network 12 or 102 to display a photograph image.

4-2. Modification 2

Further, in the first and second embodiments described above, the photograph image displaying apparatus 11 and 101 extracts a kind of sound data owned by a specified person as a liking of the specified person.

However, the present disclosed technology is not limited to this, but, for each person, sound data owned by the person may be analyzed to detect a characteristic which precisely represents an impression of sound, that is, a characteristic represented by one or a plurality of characteristic items.

In this instance, according to the disclosed technology, for each person, the impression of sound based on sound data owned by the person, that is, the characteristic which represents the impression precisely, is totalized, and a result of the totalization is extracted as a liking.

Further, according to the disclosed technology, for each person, sound data owned by the person may be analyzed to detect a tune of sound. Then, the tune of sound based on the sound data owned by the person may be totalized such that a result of the totalization is extracted as a liking.

According to such a configuration as just described, sound data conforming to a liking of a specified person can be searched out widely from among various kinds of sound data without attaching the liking of the specified person to the kind of sound.

Further, according to the disclosed technology, in the case where only one person captured in a photograph image is specified, that one of different kinds of sound data of the one specified person with regard to which the number of owned sound data is greatest is extracted as a liking.

However, the disclosed technology may be modified in the following manner. In particular, in the case where only one person captured in a photograph image is specified, the owned number by kind of sound data of the one specified person is compared with an all average owned number by kind such that a liking is extracted based on a result of the comparison similarly as in the case of a group described hereinabove.

Further, in the disclosed technology, in the case where only one person captured in a photograph image is specified, a result of totalization of impressions or tunes of sound based on sound data owned by the specified person is compared with an average value of a totalization result of impressions or tunes of sound based on sound data owned individually by all persons who are registered as users. Thus, a liking of one specified person may be extracted based on a result of the comparison.

Further, in the disclosed technology, also in the case where a plurality of persons captured in a photograph image are specified, an average value of a totalization result of impressions or tunes of sound based on sound data owned individually by the plural specified persons is compared with an average value of a totalization result of impressions or tunes of sound based on sound data owned by all of the persons who are registered as users. Thus, a common liking of the plural specified persons may be extracted based on a result of the comparison.

4-3. Modification 3

Further, in the first and second embodiments described hereinabove, when the photograph image displaying apparatus 11 and 101 specifies a plurality of persons captured in a photograph image, if the selection display time is comparatively short, then a liking common to the plural specified persons is extracted.

On the other hand, in the first and second embodiments, when the photograph image displaying apparatus 11 and 101 specifies a plurality of persons captured in a photograph image, if the selection display time is comparatively long, then a liking of each of the plural specified persons is extracted.

However, the present disclosure is not limited to this, but when the photograph image displaying apparatus 11 and 101 specifies a plurality of persons captured in a photograph image, if the selection display time is comparatively short, then a liking of each of the plural specified persons may be extracted.

Or, when the photograph image displaying apparatus 11 and 101 specifies a plurality of persons captured in a photograph image, if the selection display time is comparatively long, then a liking common to the plural specified persons may be extracted.

Further, when the photograph image displaying apparatus 11 and 101 specifies a plurality of persons captured in a photograph image, only a liking common to the plural specified persons may be extracted irrespective of the length of the selection display time.

In contrast, when the photograph image displaying apparatus 11 and 101 specifies a plurality of persons captured in a photograph image, a liking of each of the plural specified persons may be extracted irrespective of the length of the selection display time.

Or else, when the photograph image displaying apparatus 11 and 101 specifies a plurality of persons captured in a photograph image, one of a liking common to the plural specified persons and a liking of each of the plural specified persons may be selectively extracted in response to the number of specified persons and the length of the selection display time.

Where the configuration just described is adopted, when the photograph image displaying apparatus 11 and 101 specifies a plurality of persons captured in a photograph image, if the number of specified persons is comparatively small although the selection display time is comparatively short, then a liking of each of the plural specified persons is extracted.

More particularly, even if the selection display time is comparatively short, if the selection display time is such long time that a number of searched-out sound data equal to the number of all of specified persons can be reproduced at least one by one, then a liking of each of the plural specified persons is extracted.

Or, where the configuration described above is adopted, when the photograph image displaying apparatus 11 and 101 specifies a plurality of persons captured in a photograph image, if the number of specified persons is comparatively great although the selection display time is comparatively long, then a liking common to the plural specified persons is extracted.

More particularly, even if the selection display time is comparatively long, if the selection display time is shorter than such a length that a number of searched-out sound data equal to the number of all of specified persons can be reproduced at least one by one, then a liking common to the plural specified persons is extracted.

In this manner, with the disclosed technology, when a plurality of persons captured in a photograph image are specified, various techniques can be applied to the method for extraction of a liking of the plural specified persons.

4-4. Modification 4

Further, in the first and second embodiments described hereinabove, the photograph image displaying apparatus 11 and 101 selects one or a plurality of searched-out sound data of a reproduction object based on the searched-out sound list 47 and the selection display time to create a sound playlist 51.

However, the disclosed technology is not limited to this, but every time the photograph image displaying apparatus 11 and 101 creates a image playlist 26 and a sound playlist 51, they may be stored into a creation history.

Then, when the photograph image displaying apparatus 11 and 101 creates a sound playlist 51 in the image and sound reproduction mode, it is discriminated based on the creation history whether or not a sound playlist 51 was created with regard to the same photograph image data in the past.

Then, if a sound playlist 51 was created in the past with regard to photograph image data same as that created in the past, then searched-out sound data for the present operation cycle are selected so that they do not overlap with the searched-out sound data registered in the sound playlist 51 in the past to create a sound playlist 51.

According to the configuration just described, even if photograph image data selected as a reproduction object in the past is selected again as a reproduction object in the image and sound reproduction mode, when the photograph image data is to be reproduced to display a photograph image, searched-out sound data different from that in the past can be reproduced.

Consequently, when the image and sound reproduction process is executed, such a situation that the same searched-out sound data is reproduced every time can be reduced significantly, and the user can sufficiently enjoy the new manner of enjoyment of an image and sound.

4-5. Modification 5

Further, in the first and second embodiments described hereinabove, the playlist creation apparatus is applied to the playlist creation apparatus 1 and the photograph image displaying apparatus 11 and 101 described hereinabove with reference to FIGS. 1 to 39.

However, the disclosed technology is not limited to this, but the disclosed technology can be applied to playlist creation apparatus of various other configurations like a personal computer, a portable telephone set, a PDA (Personal Digital Assistance), a game machine or the like.

Further, in the disclosed technology, the server apparatus on the network or the information providing apparatus 13 and 103 can be applied also to the playlist creation apparatus. In particular, the photograph image displaying apparatus 11 and 101 execute the image and sound reproduction processing procedure RT1 described hereinabove.

However, in the disclosed technology, when the photograph image displaying apparatus 11 and 101 is in the image and sound reproduction mode, it requests the server apparatus or the information providing apparatus 13 and 103 to execute the processes from the analysis of photograph image data to the creation of a sound playlist, that is, the processes from the step SP1 to the step SP7 of the image and sound reproduction processing procedure RT1 described hereinabove.

Further, in the disclosed technology, when the photograph image displaying apparatus 11 and 101 is in the image and sound reproduction mode, a sound playlist created by the information providing apparatus 13 and 103 may be acquired from the same.

4-6. Modification 6

Further, in the first and second embodiments described hereinabove, as a person specification section for specifying a person captured in an image based on image data, the person specification sections 2 and 36 and the central processing unit 113 which specify a person captured in a photograph image based on photograph image data described hereinabove with reference to FIGS. 1 to 39 are described.

However, the disclosed technology is not limited to this, but person specification sections of various other configurations can be applied widely like a person specification section which specifies a person captured in a three-dimensional stereoscopic image based on three-dimensional stereoscopic image data or a moving image based on moving image data or a person specification circuit of a hardware configuration which specifies a person captured in an image based on image data.

4-7. Modification 7

Further, in the first and second embodiments described hereinabove, as a liking extraction section for extracting a liking of a person specified by the person specification section, the liking extraction sections 3 and 41 and the central processing unit 113 described hereinabove with reference to FIGS. 1 to 39 are applied.

However, the disclosed technology is not limited to this, but liking extraction sections of various other configurations can be widely applied like a liking extraction circuit of a hardware configuration which extracts a liking of a person specified by the person specification section.

4-8. Modification 8

Further, in the first and second embodiments described hereinabove, as a searching section for searching, based on a liking extracted by the liking extraction section, for sound data of sound conforming to the liking, the search sections 4 and 45 and the central processing unit 113 described hereinabove with reference to FIGS. 1 to 39 are applied.

However, the disclosed technology is not limited to this, but searching sections of various other configurations can be applied widely like a searching circuit of a hardware configuration which searches, based on a liking extracted by the liking extraction section, for sound data of sound conforming to the liking.

4-9. Modification 9

Further, in the first and second embodiments described hereinabove, as a playlist creation section which creates a playlist which defines a reproduction order of sound data searched out by the searching section while an image based on image data is displayed, the playlist creation sections 5 and 50 and the central processing unit 113 described hereinabove with reference to FIGS. 1 to 39 are applied.

However, the disclosed technology is not limited this, but playlist creation sections of various other configurations can be applied widely like a playlist creation circuit of a hardware configuration which creates a playlist which defines a reproduction order of sound data searched out by the searching section while an image based on image data is displayed.

4-10. Modification 10

Further, in the first and second embodiments described hereinabove, as an operation section used to select display time of an image based on image data, the operation section 23, operation inputting section 110, input processing section 111 and touch panel 115 described hereinabove with reference to FIGS. 1 to 39 are applied.

However, the disclosed technology is not limited to this, but operation sections of various other configurations can be applied widely like a pointing device such as a mouse or a joystick or an operation dial.

4-11. Modification 11

Further, in the first and second embodiments described hereinabove, as a presentation section for presenting a search reason of sound data during reproduction of the sound data in accordance with a playlist, the main controlling section 20 and display section 25 and the central processing unit 113 and display unit 114 described hereinabove with reference to FIGS. 1 to 39 are applied.

However, the disclosed technology is not limited to this, but presentation sections of various other configurations can be applied widely like a presentation section which presents a search reason by sound or a presentation circuit of a hardware configuration which presents a search reason of sound data during reproduction of the sound data in accordance with a playlist.

The disclosed technology can be utilized for a playlist creation apparatus of a digital photo frame, a personal computer, a portable telephone set and so forth.

The present disclosure contains subject matter related to that disclosed in Japanese Priority Patent Application JP 2011-073282 filed in the Japan Patent Office on Mar. 29, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A playlist creation apparatus, comprising:
   a central processing unit (CPU) operable to:
   specify a plurality of persons captured in a plurality of images;
   extract individual likings of the plurality of specified persons captured in the plurality of images;
   search, based on the extracted individual likings, for sound data;
   present information representing present situation for searching the sound data, wherein the sound data is sound conforming to the extracted individual likings and the present information; and
   create a sound playlist which defines a reproduction order of the searched sound data during displaying of the plurality of images.

2. The playlist creation apparatus according to claim 1, wherein the CPU is operable to extract a liking common to the plurality of plurality of persons.

3. The playlist creation apparatus according to claim 2, wherein the CPU is operable to select a display time of an image from the plurality of images, wherein the liking common to the specified plurality of persons and the individual likings of each of the specified plurality of persons are extracted in response to the selected display time.

4. The playlist creation apparatus according to claim 1, wherein the CPU is operable to present a search reason of the sound data during reproduction of the sound data in accordance with the playlist, wherein the search reason comprises the extracted individual likings and the present situation used for searching the sound data.

5. The playlist creation apparatus according to claim 1, wherein the extracted individual likings relate to one or more of: quantity of the sound data, genre of the sound data, and/or artist of the sound data liked by the specified persons.

6. The playlist creation apparatus according to claim 1, wherein the individual likings are extracted from stored user registration data.

7. A playlist creation apparatus, comprising:
   a central processing unit (CPU) operable to:
   specifying a plurality of persons captured in a plurality of images;
   extracting individual likings of the plurality of specified persons captured in the plurality of images;
   searching, based on the extracted individual likings, for sound data;
   presenting information representing present situation for searching the sound data, wherein the sound data is sound conforming to the extracted individual likings and the present information; and
   creating a sound playlist which defines a reproduction order of the searched sound data during displaying of the plurality of images.

8. The method according to claim 7, further comprising: extracting a liking common to the specified plurality of persons.

9. The method according to claim 8, further comprising selecting a display time for each of the plurality of images, wherein the liking common to the specified plurality of persons and the individual likings of each of the specified plurality of persons are extracted in response to the selected display time.

10. The method according to claim 7, further comprising presenting a search reason of the sound data during reproduction of the sound data in accordance with the playlist, wherein the search reason comprises the extracted individual likings and the present situation used for searching the sound data.

11. The method according to claim 7, wherein the extracted individual likings relate to one or more of: quantity of the sound data, genre of the sound data, and/or artist of the sound data liked by the specified persons.

12. The method according to claim 7, wherein the individual likings are extracted from stored user registration data.

13. A playlist creation apparatus, comprising:
a central processing unit (CPU) operable to:
specifying a plurality of persons captured in a plurality of images;
extracting individual likings of the plurality of specified persons captured in the plurality of images;
searching, based on the extracted individual likings, for sound data;
presenting information representing present situation for searching the sound data, wherein the sound data is sound conforming to the extracted individual likings and the present information; and
creating a sound playlist which defines a reproduction order of the searched sound data during displaying of the plurality of images.

14. The non-transitory computer-readable storage medium according to claim 13, wherein a liking common to the plurality of persons is extracted.

15. The non-transitory computer-readable storage medium according to claim 14, wherein a display time of an image from the plurality of images is selected, wherein the liking common to the specified plurality of persons and the individual likings of each of the specified plurality of persons are extracted in response to the selected display time.

16. The non-transitory computer-readable storage medium according to claim 13, wherein a search reason of the sound data during reproduction of the sound data in accordance with the playlist is presented, wherein the search reason comprises the extracted individual likings and the present situation used for searching the sound data.

17. The non-transitory computer-readable storage medium according to claim 13, wherein the extracted individual likings relate to one or more of: quantity of the sound data, genre of the sound data, and/or artist of the sound data liked by the specified plurality of persons.

* * * * *